United States Patent
Cui et al.

(10) Patent No.: US 11,584,681 B2
(45) Date of Patent: Feb. 21, 2023

(54) ION EXCHANGEABLE ALKALI ALUMINOSILICATE GLASS COMPOSITIONS HAVING IMPROVED MECHANICAL DURABILITY

(71) Applicant: CORNING INCORPORATED, Corning, NY (US)

(72) Inventors: Shuo Cui, Burlington, MA (US); Xiaoju Guo, Pittsford, NY (US); Peter Joseph Lezzi, Corning, NY (US); Jian Luo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 9 days.

(21) Appl. No.: 17/100,293

(22) Filed: Nov. 20, 2020

(65) Prior Publication Data

US 2021/0155530 A1 May 27, 2021

Related U.S. Application Data

(60) Provisional application No. 63/055,274, filed on Jul. 22, 2020, provisional application No. 62/940,452, filed on Nov. 26, 2019.

(51) Int. Cl.
*C03C 3/097* (2006.01)
*C03C 21/00* (2006.01)
(Continued)

(52) U.S. Cl.
CPC .............. *C03C 3/097* (2013.01); *C03C 3/083* (2013.01); *C03C 3/091* (2013.01); *C03C 4/18* (2013.01);
(Continued)

(58) Field of Classification Search
CPC ......... C03C 3/097; C03C 3/083; C03C 3/091; C03C 4/18; C03C 21/002; C03C 2204/00
See application file for complete search history.

(56) References Cited

U.S. PATENT DOCUMENTS 3,513,004 A   5/1970 Kohut et al.
3,615,769 A   10/1971 Leitz et al.
(Continued)

FOREIGN PATENT DOCUMENTS

JP   05-744068 A   3/1993
JP   2001-134925 A   5/2001
(Continued)

OTHER PUBLICATIONS

"Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992)".
(Continued)

*Primary Examiner* — Alicia J Sawdon
*Assistant Examiner* — Laura B Figg
(74) *Attorney, Agent, or Firm* — John P. McGroarty

(57) ABSTRACT

A glass composition comprises: 50.0 mol % to 70.0 mol % $SiO_2$; 10.0 mol % to 25.0 mol % $Al_2O_3$; 0.0 mol % to 5.0 mol % $P_2O_5$; 0.0 mol % to 10.0 mol % $B_2O_3$; 5.0 mol % to 15.0 mol % $Li_2O$; 1.0 mol % to 15.0 mol % $Na_2O$; and 0.0 mol % to 1.0 mol % $K_2O$. The sum of all alkali oxides, $R_2O$, present in the glass composition may be in the range from greater than or equal to 11.0 mol % to less than or equal to 23.0 mol %. The sum of $Al_2O_3$ and $R_2O$ present in the glass composition may be in the range from greater than or equal (Continued)

to 26.0 mol % to less than or equal to 40.0 mol %. The glass composition may satisfy the relationship $-0.1 \leq (Al_2O_3-(R_2O+RO))/Li_2O \leq 0.3$.

20 Claims, 6 Drawing Sheets

(51) Int. Cl.
   $C03C\ 3/091$     (2006.01)
   $C03C\ 3/083$     (2006.01)
   $C03C\ 4/18$      (2006.01)

(52) U.S. Cl.
   CPC ........ $C03C\ 21/002$ (2013.01); $C03C\ 2204/00$ (2013.01)

(56) References Cited

U.S. PATENT DOCUMENTS

| | | |
|---|---|---|
| 3,785,836 A | 1/1974 | Bacon |
| 3,804,646 A | 4/1974 | Dumbaugh, Jr. |
| 3,811,901 A | 5/1974 | Bacon |
| 6,268,304 B1 | 7/2001 | Maeda et al. |
| 7,192,898 B2 | 3/2007 | Mori et al. |
| 7,659,222 B2 | 2/2010 | Shimizu |
| 8,304,078 B2 | 11/2012 | Varshneya |
| 8,361,917 B2 | 1/2013 | Li et al. |
| 8,652,978 B2 | 2/2014 | Dejneka et al. |
| 8,796,165 B2 | 8/2014 | Ellison et al. |
| 8,969,226 B2 | 3/2015 | Dejneka et al. |
| 9,096,460 B2 | 8/2015 | Brix et al. |
| 9,212,084 B2 | 12/2015 | Wang et al. |
| 9,682,885 B2 | 6/2017 | Gross |
| 9,695,081 B2 | 7/2017 | Bookbinder et al. |
| 10,280,112 B2 | 5/2019 | Gross |
| 2009/0239102 A1 | 9/2009 | Nagashima et al. |
| 2011/0207591 A1 | 8/2011 | Schreder et al. |
| 2012/0188663 A1 | 7/2012 | Osakabe et al. |
| 2014/0141226 A1 | 5/2014 | Bookbinder et al. |
| 2015/0140325 A1 | 5/2015 | Gross et al. |
| 2016/0122226 A1 | 5/2016 | Hunzinger et al. |
| 2016/0347651 A1 | 12/2016 | Beall et al. |
| 2016/0376186 A1 | 12/2016 | Gross |
| 2017/0174557 A1 | 6/2017 | Gross et al. |
| 2017/0197869 A1 | 7/2017 | Beall et al. |
| 2017/0273201 A1 | 9/2017 | Eckart |
| 2017/0295657 A1* | 10/2017 | Gross ................. C03C 3/093 |
| 2018/0327303 A1 | 11/2018 | Gross |
| 2019/0072469 A1 | 3/2019 | Chambliss et al. |
| 2019/0300422 A1 | 10/2019 | Guo et al. |

FOREIGN PATENT DOCUMENTS

| | | |
|---|---|---|
| WO | 2012/126394 A1 | 9/2012 |
| WO | 2017/177109 A1 | 10/2017 |

OTHER PUBLICATIONS

"Reddy, K.P.R. et al, "Fracture Toughness Measurement of Glass and Ceramic Materials Using Chevron-Notched Specimens," J. Am. Ceram. Soc., 71 [6], C-310-C-313 (1988)".
Eagan et al., "Effect of Composition on the Mechanical Properties of Aluminosilicate and Borosilicate Glasses". J. Am. Ceram. Soc., vol. 61, 1978, pp. 27-30.
Invitation to Pay Additional Fees of the International Searching Authority; PCT/US20/061814; dated Jan. 27, 2021; 3 Pages; Commissioner for Patents.
Luo et al., Structural origin of intrinsic ductility in binary aluminosilicate glasses, Journal of Non-Crystalline Solids, vol. 452, pp. 297-306.
Rosales-Sosa et al., "Crack-resistant Al2O3—SiO2 glasses". Sci Rep 6, 23620, 2016.
Rosales-Sosa, G. A. et al. High Elastic Moduli of a 54Al2O3—46Ta2O5 Glass Fabricated via Containerless Processing. Sci Rep 5, 15233.
Rouxel et al., "The Fracture Toughness of Inorganic Glasses". J. Am. Ceram. Soc. vol. 100, 2017, pp. 4374-4396.
Shi et al., "Intrinsic ductility of glassy solids". Journal of Applied Physics, vol. 115, 043528.
Zhang et al., "A novel upconversion TiO2—La2O3—Ta2O5 bulk glass co-doped with Er3+/Yb3+ fabricated by containerless processing". Materials Letters, vol. 66, pp. 367-369.
International Search Report and Written Opinion of the International Searching Authority; PCT/US2020/061814; dated Mar. 23, 2021, 17 pages; European Patent Office.

* cited by examiner

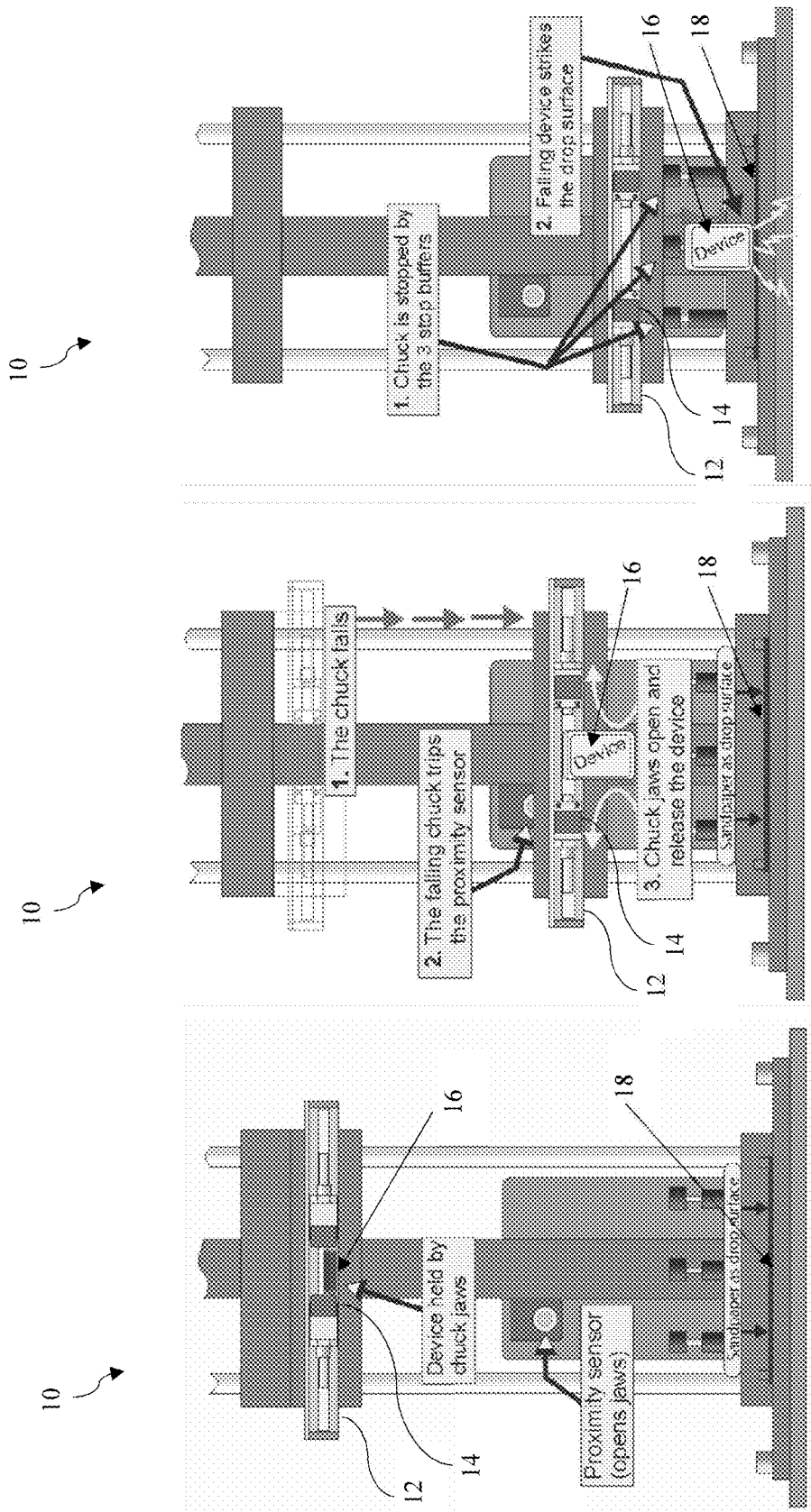

ION EXCHANGEABLE ALKALI ALUMINOSILICATE GLASS COMPOSITIONS HAVING IMPROVED MECHANICAL DURABILITY

This application claims the benefit of priority under 35 U.S.C. § 119 of U.S. Provisional Application Ser. No. 63/055,274 filed on Jul. 22, 2020, and U.S. Provisional Application Ser. No. 62/940,452 filed on Nov. 26, 2019, the content of each are relied upon and incorporated herein by reference in their entirety.

BACKGROUND

Field

The present specification generally relates to ion exchangeable glass compositions and, more specifically, to ion exchangeable alkali aluminosilicate glass compositions with improved mechanical durability.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

Also, it is desirable that glasses to be used as cover glass in portable devices be made as thin as possible.

Accordingly, a need exists for glasses that can be strengthened, such as by ion exchange, and that have the mechanical properties that allow them to be formed as thin glass articles.

SUMMARY

According to a first aspect, A1, a glass composition includes: greater than or equal to 50.0 mol % and less than or equal 70.0 mol % $SiO_2$; greater than or equal to 10.0 mol % and less than or equal to 25.0 mol % $Al_2O_3$; greater than or equal to 0.0 mol % and less than or equal to 5.0 mol % $P_2O_5$; greater than or equal to 0.0 mol % and less than or equal to 10.0 mol % $B_2O_3$; greater than or equal to 5.0 mol % and less than or equal to 15.0 mol % $Li_2O$; greater than or equal to 1.0 mol % and less than or equal to 15.0 mol % $Na_2O$; and greater than or equal to 0.0 mol % and than or equal to 1.0 mol % $K_2O$, wherein: $R_2O$ is in the range from greater than or equal to 11.0 mol % to less than or equal to 23.0 mol %, wherein $R_2O$ is the sum of alkali metal oxides in the glass composition; $Al_2O_3+R_2O$ is in the range from greater than or equal to 26.0 mol % to less than or equal to 40.0 mol %; and $-0.1 \leq (Al_2O_3-(R_2O+RO))/Li_2O \leq 0.3$, wherein RO is the sum of alkaline earth metal oxides in the glass composition.

A second aspect A2 includes the glass composition according to the first aspect A15, wherein $R_2O$ is in the range from greater than or equal to 15.0 mol % to less than or equal to 19.0 mol %.

A third aspect A3 includes the glass composition according to the first and second aspects A1-A2, wherein $Al_2O_3+R_2O$ is in the range from greater than or equal to 28.0 mol % to less than or equal to 36.0 mol %.

A fourth aspect A4 includes the glass composition according to any of the first through third aspects A1-A3, wherein $0.0 \leq (Al_2O_3-(R_2O+RO))/Li_2O \leq 0.1$.

A fifth aspect A5 includes the glass composition according to any of the first through fourth aspects A1-A4, wherein $0.9 \leq Al_2O_3/(R_2O+RO) \leq 1.1$.

A sixth aspect A6 includes the glass composition according to any of the first through fifth aspects A1-A5, wherein $Al_2O_3+R_2O+B_2O_3$ is greater than or equal to 32.0 mol %.

A seventh aspect A7 includes the glass composition according to any of the first through fifteenth aspects A1-A6, wherein $(B_2O_3+P_2O_5+A_2O_3)/(SiO_2) \geq 0.20$.

An eighth aspect A8 includes the glass composition according to the seventh aspect A7, wherein $(B_2O_3+P_2O_5+Al_2O_3)/(SiO_2) \geq 0.30$.

A ninth aspect A9 includes the glass composition according to the eighth aspect A8, wherein $(B_2O_3+P_2O_5+Al_2O_3)/(SiO_2) \geq 0.40$.

A tenth aspect A10 includes the glass composition according to any of the first through ninth aspects A1-A9, further comprising less than or equal to 5.0 mol % MgO.

An eleventh aspect A11 includes the glass composition according to any of the first through tenth aspects A1-A10, further comprising 0.0 mol % to 2.0 mol % $TiO_2$.

An twelfth aspect A12 includes the glass composition according to any of the first through eleventh aspects A1-A11, further comprising 0.0 mol % to 1.0 mol % $SnO_2$.

A thirteen aspect A13 includes the glass composition according to any of the first through twelfth aspects A1-A12, wherein $Al_2O_3*(10.832)+B_2O_3*(10.334)+P_2O_5*(-13.761)+Li_2O*(-3.135)+Na_2O*(-7.213)+K_2O*(-13.761)+MgO*(2.159)+CaO*(-4.518)+SrO*(-4.518)>100$.

A fourteenth aspect A14 includes the glass composition according to any of the first through twelfth aspects A1-A12, wherein $Al_2O_3*(5.99)+B_2O_3*(-3.85)+P_2O_5*(-8.44)+Li_2O*(8.65)+Na_2O*(-4.65)+K_2O*(-10.18)+MgO*(1.86)+CaO*(1.86)+SrO*(1.86)>100$.

A fifteenth aspect A15 includes the glass composition according to any of the first through twelfth aspects A1-A12, wherein $Al_2O_3*(4.52)+B_2O*(-8.28)+P_2O_5*(-1.73)+Li_2O*(-10.40)+Na_2O*(-7.65)+K_2O*(-10.52)+MgO*(-4.33)+CaO*(-6.61)+SrO*(-2.60)<-100$.

A sixteenth aspect A16 includes the glass composition according to any of the first through fifteenth aspects A1-A15, wherein the glass composition has a density in the range from greater than or equal to 2.20 to less than or equal to 2.60.

A seventeenth aspect A17 includes the glass composition according to any of the first through sixteenth aspects A1-A16, wherein the glass composition has a liquidus viscosity in the range from greater than or equal to 5.0 kP to less than or equal to 175.0 kP.

An eighteenth aspect A18 includes the glass composition according to any of the first through seventeenth aspects A1-A17, wherein the glass composition has a softening point in the range from greater than or equal to 650.0° C. to less than or equal to 950.0° C.

A nineteenth aspect A19 includes the glass composition according to the eighteenth aspect A18, wherein the glass composition has a softening point in the range from greater than or equal to 750.0° C. to less than or equal to 925.0° C.

A twentieth aspect A20 includes the glass composition according to the nineteenth aspect A19, wherein the glass composition has a softening point in the range from greater than or equal to 790.0° C. to less than or equal to 910.0° C.

A twenty-first aspect A21 includes the glass composition according to any of the first through seventeenth aspects A1-A17, wherein the glass composition has a softening point of less than or equal to 900.0° C.

A twenty-second aspect A22 includes the glass composition according to the twenty-first aspect A21, wherein the glass composition has a softening point of less than or equal to 875.0° C.

A twenty-third aspect A23 includes the glass composition according to the twenty-second aspect A22, wherein the glass composition has a softening point of less than or equal to 860.0° C.

A twenty-fourth aspect A24 includes a glass-based article having the glass composition according to any of the first through twenty-third aspects A1-A23, wherein the glass composition has a $K_{1C}$ fracture toughness as measured by a chevron notch short bar method of greater than or equal to 0.70.

A twenty-fifth aspect A25 includes the glass-based article according to the twenty-fourth aspects A24, wherein the glass composition has a $K_{1C}$ fracture toughness as measured by a chevron notch short bar method of greater than or equal to 0.73.

A twenty-sixth aspect A26 includes a glass-based article having the glass composition according to any of the first through twenty-fifth aspects A1-A25, wherein the glass composition is chemically strengthened and has a compressive stress of greater than or equal to 450.0 MPa.

A twenty-seventh aspect A27 includes the glass-based article according the twenty-sixth aspect A26, wherein the glass-based article is chemically strengthened in an ion exchange bath comprising $KNO_3$ at a temperature from greater than or equal to 350.0° C. to less than or equal to 500.0° C. for a time period of from greater than or equal to 2 hours to less than or equal to 12 hours.

A twenty-eighth aspect A28 includes the glass-based article according the twenty-seventh aspect A27, wherein the ion exchange bath further comprises $NaNO_3$.

A twenty-ninth aspect A29 includes the glass-based article according to any of the twenty-sixth through twenty-eighth aspects A26-A28, wherein the strengthened glass-based article has a compressive stress of greater than or equal to 600 MPa.

A thirtieth aspect A30 includes the glass-based article according to any of the twenty-sixth through twenty-ninth aspects A26-A29, wherein the strengthened glass-based article has a maximum central tension of greater than or equal to 20.0 MPa.

A thirty-first aspect A31 includes the glass-based article according to the thirtieth aspect A30, the strengthened glass-based article has a maximum central tension of greater than or equal to 60.0 MPa.

A thirty-second aspect A32 includes the glass-based article according to any of the twenty-sixth through thirty-first aspects A26-A31, wherein the strengthened glass-based article has a depth of compression of greater than or equal to 0.15t, wherein t is a thickness of the strengthened glass-based article.

A thirty-third aspect A33 includes the glass-based article according to the thirty-second aspect A32, wherein the strengthened glass-based article has a depth of compression of greater than or equal to 0.18t.

A thirty-fourth aspect A34 includes the glass-based article according to any of the twenty-sixth through thirty-third aspects A26-A33, wherein the strengthened glass-based article has a depth of layer of greater than or equal to 5.0 μm.

A thirty-fifth aspect A35 includes the glass-based article according to the thirty fourth aspect A34, wherein the strengthened glass-based article has a depth of layer of greater than or equal to 10.0 μm.

A thirty-sixth aspect A36 includes the glass-based article according to any of the twenty-sixth through twenty-eighth aspects A26-A28, wherein the strengthened glass-based article has a compressive stress of greater than or equal to 600.0 MPa, a maximum central tension of greater than or equal to 20.0 MPa, a depth of compression of greater than or equal to 0.15t, wherein t is a thickness of the strengthened glass-based article, and a depth of layer of greater than or equal to 5.0 μm.

A thirty-seventh aspect A37 includes the glass-based article according to the thirty-sixth aspect A36, wherein the strengthened glass has a maximum central tension of greater than or equal to 60.0 MPa, a depth of compression of greater than or equal to 0.18t, and a depth of layer of greater than or equal to 10.0 μm.

A thirty-eighth aspect A38 includes the glass-based article according to any of the twenty-sixth through thirty-seventh aspects A26-A37, wherein the strengthened glass-based article has a Knoop Scratch threshold in the range of greater than or equal to 6.0 N to less than or equal to 12.0 N.

A thirty-ninth aspect A39 includes the glass-based article according to any of the twenty-sixth through thirty-seventh aspects A26-A37, wherein the strengthened glass-based article has a Knoop Scratch threshold of greater than or equal to 9.0 N.

A fortieth aspect A40 includes the glass-based article according to any of the twenty-sixth through thirty-ninth aspects A26-A39, wherein the strengthened glass-based article has a failure height of greater than or equal to 100.0 cm as measured on a glass-based article having a thickness of 0.5 mm according to the Drop Test Method on 180 grit sandpaper.

A forty-first aspect A41 includes the glass-based article according to the fortieth aspect A40, wherein the strengthened glass-based article has a failure height of greater than or equal to 120.0 cm.

A forty-second aspect A42 includes the glass-based article according to the forty-first aspect A41, wherein the strengthened glass-based article has a failure height of greater than or equal to 150.0 cm.

A forty-third aspect A43 includes the glass-based article according to any of the twenty-sixth through thirty-ninth aspects A26-A39, wherein the strengthened glass-based article has a failure height of greater than or equal to 150.0 cm as measured on a glass-based article having a thickness of 0.6 mm according the Drop Test Method on 180 grit sandpaper.

A forty-fourth aspect A44 includes the glass-based article according the forty-third aspect A43, wherein the strengthened glass-based article has a failure height of greater than or equal to 180.0 cm.

A forty-fifth aspect A45 includes the glass-based article according the forty-fourth aspect A44, wherein the strengthened glass-based article has a failure height of greater than or equal to 200.0 cm.

A forty-sixth aspect A46 includes the glass-based article according to any of the twenty-sixth through forty-fifth aspects A26-A45, wherein the strengthened glass-based article has a retained strength of greater than or equal to 150.0 MPa as measured for an article having a thickness of 600.0 μm after impact with 80 grit sandpaper with a force of 500.0 N.

A forty-seventh aspect A47 includes the glass-based article according to the forty-sixth aspect A46, wherein the strengthened glass-based article has a retained strength of greater than or equal to 175.0 MPa.

A forty-eight aspect A48 includes the glass-based article according to the forty-seventh aspect A47, wherein, the strengthened glass-based article has a retained strength of greater than or equal to 200.0 MPa.

A forty-ninth aspect A49 includes the glass-based article according to any of the twenty-sixth through forty-fifth aspects A26-A45, wherein the strengthened glass-based article has a retained strength of greater than or equal to 175.0 MPa as measured for an article having a thickness of 600.0 μm after impact with 120 grit sandpaper with a force of 500.0 N.

A fiftieth aspect A50 includes the glass-based article according to the forty-ninth aspect A49, wherein the strengthened glass-based article has a retained strength of greater than or equal to 200.0 MPa.

A fifty-first aspect A51 includes the glass-based article according to the fiftieth aspect A50, wherein the strengthened glass-based article has a retained strength of greater than or equal to 225.0 MPa.

A fifty-second aspect A52 includes the glass-based article according to any of the twenty-sixth through forty-fifth aspects A26-A45, wherein the strengthened glass-based article has a retained strength of greater than or equal to 200.0 MPa as measured for an article having a thickness of 600.0 μm after impact with 180 grit sandpaper with a force of 500.0 N.

A fifty-third A53 includes the glass-based article according to the fifty-second aspect A52, wherein the strengthened glass-based article has a retained strength of greater than or equal to 220.0 MPa.

A fifty-fourth aspect A54 includes the glass-based article according to the fifty-third aspect A53, wherein the strengthened glass-based article has a retained strength of greater than or equal to 250.0 MPa.

A fifty-fifth aspect A55 includes a consumer electronic device, comprising a housing having a front surface, a back surface, and side surfaces electrical components provided at least partially within the housing, the electrical components including at least a controller, a memory, and a display, the display being provided at or adjacent the front surface of the housing; and the glass composition or glass-based article according to any of the first through fifty-fourth aspects A1-A54 is disposed over the display, forms a portion of the housing, or is disposed over the display and forms a portion of the housing.

According to a fifty-sixth aspect A56, a glass composition may include greater than or equal to 55.0 mol % and less than or equal to 65.0 mol % $SiO_2$; greater than or equal to 14.0 mol % and than or equal to 20.0 mol % $Al_2O_3$; greater than or equal to 0.0 mol % and less than or equal to 3.0 mol % $P_2O_5$; greater than or equal to 1.0 mol % and less than or equal to 7.0 mol % $B_2O_3$; greater than or equal to 5.0 mol % and less than or equal to 10.0 mol % $Li_2O$; greater than or equal to 5.0 mol % and less than or equal to 10.0 mol % $Na_2O$; and greater than or equal to 0.0 mol % and less than or equal to 1.0 mol % $K_2O$, wherein: $R_2O$ is in the range from greater than or equal to 13.0 mol % to less than or equal to 20.0 mol %, wherein $R_2O$ is the sum of alkali metal oxides in the glass composition; $Al_2O_3+R_2O$ is in the range from greater than or equal to 28.0 mol % to less than or equal to 40.0 mol %; and $-0.1 \leq (Al_2O_3-(R_2O+RO))/Li_2O \leq 0.3$, wherein RO is the sum of alkaline earth metal oxides in the glass composition.

A fifty-seventh aspect A57 includes the glass composition according to the fifty-sixth aspect A56, wherein $R_2O$ is in the range from greater than or equal to 15.0 mol % to less than or equal to 18.0 mol %.

A fifty-eighth aspect A58 includes the glass composition according to the fifty-sixth aspect A56 or the fifty-seventh aspect A57, wherein $Al_2O_3+R_2O$ is in the range from greater than or equal to 32.0 mol % to less than or equal to 36.0 mol %.

A fifty-ninth aspect A59 includes the glass composition according to any of the fifty-sixth through fifty-eighth aspects A56-A58, wherein $0.0 \leq (Al_2O_3-(R_2O+RO))/Li_2O \leq 0.1$.

A sixtieth aspect A60 includes the glass composition according to any of the fifty-sixth through fifty-ninth aspects A56-A59, wherein $0.9 \leq Al_2O_3/(R_2O+RO) \leq 1.1$.

A sixty-first aspect A61 includes the glass composition according to any of the fifty-sixth through sixtieth aspects A56-A60, wherein $Al_2O_3+R_2O+B_2O_3$ is greater than or equal to 32.0 mol %.

A sixty-second aspect A62 includes the glass composition according to any of the fifty-sixth through sixty-first aspects A56-A61, wherein $(B_2O_3+P_2O_5+Al_2O_3)/(SiO_2) \geq 0.20$.

A sixty-third aspect A63 includes the glass composition according to the sixty-second aspect A62, wherein $(B_2O_3+P_2O_5+Al_2O_3)/(SiO_2) \geq 0.30$.

A sixty-fourth aspect A64 includes the glass composition according to the sixty-third aspect A63, wherein $(B_2O_3+P_2O_5+Al_2O_3)/(SiO_2) \geq 0.40$.

A sixty-fifth aspect A65 includes the glass composition according to any of the fifty-sixth through sixty-fourth aspects A56-A64, further comprising less than or equal to 3.0 mol % MgO.

A sixty-sixth aspect A66 includes the glass composition according to any of the fifty-sixth through sixty-fifth aspects A56-A65, further comprising 0.0 mol % to 1.0 mol % $TiO_2$.

A sixty-seventh aspect A67 includes the glass composition according to any of the fifty-sixth through sixty-sixth aspects A56-A66, further comprising 0.0 mol % to 1.0 mol % $SnO_2$.

A sixty-eighth aspect A68 includes the glass composition according to any of the fifty-sixth through sixty-seventh aspects A56-A67, wherein $Al_2O_3*(10.832)+B_2O_3*(10.334)+P_2O_5*(-13.761)+Li_2O*(-3.135)+Na_2O*(-7.213)+K_2O*(-13.761)+MgO*(2.159)+CaO*(-4.518)+SrO*(-4.518) \geq 100$.

A sixty-ninth aspect A69 includes the glass composition according to any of the fifty-sixth through sixty-seventh aspects A56-A67, wherein $Al_2O_3*(5.99)+B_2O_3*(-3.85)+P_2O_5*(-8.44)+Li_2O*(8.65)+Na_2O*(-4.65)+K_2O*(-10.18)+MgO*(1.86)+CaO*(1.86)+SrO*(1.86) \geq 100$.

A seventieth aspect A70 includes the glass composition according to any of the fifty-sixth through sixty-seventh aspects A56-A67, wherein $Al_2O_3*(4.52)+B_2O*(-8.28)+P_2O_5*(-1.73)+Li_2O*(-10.40)+Na_2O*(-7.65)+K_2O*(-10.52)+MgO*(-4.33)+CaO*(-6.61)+SrO*(-2.60) \leq -100$.

A seventy-first aspect A71 includes the glass composition according to any of the fifty-sixth through seventieth aspects A56-A70, wherein the glass composition has a density in the range from greater than or equal to 2.20 to less than or equal to 2.60.

A seventy-second aspect A72 includes the glass composition according to any of the fifty-sixth through seventy-first aspects A56-A71, wherein the glass composition has a liquidus viscosity in the range from greater than or equal to 5.0 kP to less than or equal to 150.0 kP.

A seventy-third aspect A73 includes the glass composition according to any of the fifty-sixth through seventy-second aspects A56-A72, wherein the glass composition has a softening point in the range from greater than or equal to 650.0° C. to less than or equal to 950.0° C.

A seventy-fourth aspect A74 includes the glass composition according to the seventy-third aspect A73, wherein the glass composition has a softening point in the range from greater than or equal to 750.0° C. to less than or equal to 925.0° C.

A seventy-fifth aspect A75 includes the glass composition according to the seventy-fourth aspect A74, the glass composition has a softening point in the range from greater than or equal to 790.0° C. to less than or equal to 910.0° C.

A seventy-sixth aspect A76 includes the glass composition according to any of the fifty-sixth through seventy-second aspects A56-A72, wherein the glass composition has a softening point of less than or equal to 900.0° C.

A seventy-seventh aspect A77 includes the glass composition according to the seventy-sixth aspect A76, wherein the glass composition has a softening point of less than or equal to 875.0° C.

A seventy-eighth aspect A78 includes the glass composition according to the seventy-seventh aspect A77, wherein the glass composition has a softening point of less than or equal to 860.0° C.

A seventy-ninth aspect A79 includes a glass-based article having the glass composition according to any of the fifty-sixth through seventy-eighth aspects A56-A78, wherein the glass-based article has a $K_{1C}$ fracture toughness as measured by a chevron notch short bar method of greater than or equal to 0.70.

An eightieth aspect A80 includes the glass-based article according to the seventy-ninth aspect A79, wherein the glass composition has a $K_{1C}$ fracture toughness as measured by a chevron notch short bar method of greater than or equal to 0.73.

An eighty-first aspect A81 includes a glass-based article having the glass composition according to any of the fifty-sixth through seventy eighth aspects A56-A78, wherein the glass composition is chemically strengthened and has a compressive stress of greater than or equal to 450.0 MPa.

An eighty-second aspect A82 includes the glass-based article according to the eighty-first aspect A81, wherein the glass-based article is chemically strengthened in an ion exchange bath comprising $KNO_3$ at a temperature from greater than or equal to 350.0° C. to less than or equal to 500.0° C. for a time period of from greater than or equal to 2 hours to less than or equal to 12 hours.

An eighty-third aspect A83 includes the glass-based article according to the eighty-second aspect A82, wherein the ion exchange bath further comprises $NaNO_3$.

An eighty-fourth aspect A84 includes the glass-based article according to any of the eighty-first through eighty-third aspects A81-A83, wherein the strengthened glass-based article has a compressive stress of greater than or equal to 600.0 MPa.

An eighty-fifth aspect A85 includes the glass-based article according to any of the eighty-first through eighty-fourth aspects A81-A84, wherein the strengthened glass-based article has a maximum central tension of greater than or equal to 20.0 MPa.

An eighty-sixth aspect A86 includes the glass-based article according to the eighty-fifth aspect A85, wherein the strengthened glass-based article has a maximum central tension of greater than or equal to 60.0 MPa.

An eighty-seventh aspect A87 includes the glass-based article according to any of the eighty-first through eighty-sixth aspects A81-A86, wherein the strengthened glass-based article has a depth of compression of greater than or equal to 0.15t, wherein t is a thickness of the strengthened glass-based article.

An eighty-eighth aspect A88 includes the glass-based article according to the eighty-seventh aspect A87, wherein the strengthened glass-based article has a depth of compression of greater than or equal to 0.18t.

An eighty-ninth aspect A89 includes the glass-based article according to any of the eighty-first through eighty-eighth aspects A81-A88, wherein the strengthened glass-based article has a depth of layer of greater than or equal to 5.0 μm.

A ninetieth aspect A90 includes the glass-based article according to the eighty-ninth aspect A89, wherein the strengthened glass-based article has a depth of layer of greater than or equal to 10.0 μm.

A ninety-first aspect A91 includes the glass-based article according to any of the eighty-first through eighty-third aspects A81-A83, wherein the strengthened glass-based article has a compressive stress of greater than or equal to 600.0 MPa, a maximum central tension of greater than or equal to 20.0 MPa, a depth of compression of greater than or equal to 0.15t, wherein t is a thickness of the strengthened glass-based article, and a depth of layer of greater than or equal to 5.0 μm.

A ninety-second aspect A92 includes the glass-based article according the ninety-first aspect A91, wherein the strengthened glass has a maximum central tension of greater than or equal to 60.0 MPa, a depth of compression of greater than or equal to 0.18t, and a depth of layer of greater than or equal to 10.0 μm.

A ninety-third aspect A93 includes the glass-based article according to any of the eighty-first through ninety-second aspects A81-A92, wherein the strengthened glass-based article has a Knoop Scratch threshold in the range of greater than or equal to 6.0 N to less than or equal to 12.0 N.

A ninety-fourth aspect A94 includes the glass-based article according to any of the eighty-first through ninety-second aspects A81-A92, wherein the strengthened glass-based article has a Knoop Scratch threshold of greater than or equal to 9.0 N.

A ninety-fifth aspect A95 includes the glass-based article according to any of the eighty-first through ninety-fourth aspects A81-A94, wherein the strengthened glass-based article has a failure height of greater than or equal to 100.0 cm as measured on a glass-based article having a thickness of 0.5 mm according to the Drop Test Method on 180 grit sandpaper.

A ninety-sixth aspect A96 includes the glass-based article according the ninety-fifth aspect A95, wherein the strengthened glass-based article has a failure height of greater than or equal to 120.0 cm.

A ninety-seventh aspect A97 includes the glass-based article according to the ninety-sixth aspect A96, wherein the strengthened glass-based article has a failure height of greater than or equal to 150.0 cm.

A ninety-eighth aspect A98 includes the glass-based article according to any of the eighty-first through ninety-fourth aspects A81-A94, wherein the strengthened glass-based article has a failure height of greater than or equal to 150.0 cm as measured on a glass-based article having a thickness of 0.6 mm according to the Drop Test Method on 180 grit sandpaper.

A ninety-ninth aspect A99 includes the glass-based article according to the ninety-eighth aspect A98, wherein the strengthened glass-based article has a failure height of greater than or equal to 180.0 cm.

A one-hundredth aspect A100 includes the glass-based article according to the ninety-ninth aspect A99, wherein the strengthened glass-based article has a failure height of greater than or equal to 200.0 cm.

A hundred-and-first aspect A101 according to any of the eighty-first through one-hundredth aspects A81-A100, wherein the strengthened glass-based article has a retained strength of greater than or equal to 150.0 MPa as measured for an article having a thickness of 600.0 µm after impact with 80 grit sandpaper with a force of 500.0 N.

A hundred-and-second aspect A102 includes the glass-based article according to the hundred-and-first aspect A101, wherein the strengthened glass-based article has a retained strength of greater than or equal to 175.0 MPa.

A hundred-and-third aspect A103 includes the glass composition according to the hundred-and-second aspect A102, wherein, the strengthened glass-based article has a retained strength of greater than or equal to 200.0 MPa.

A hundred-and-fourth aspect A104 includes the glass-based article according to any of the eighty-first through one-hundredth aspects A81-A100, wherein the strengthened glass-based article has a retained strength of greater than or equal to 175.0 MPa as measured for an article having a thickness of 600.0 µm after impact with 120 grit sandpaper with a force of 500.0 N.

A hundred-and-fifth aspect A105 includes the glass-based article according to the hundred-and-fourth aspect A104, wherein the strengthened glass-based article has a retained strength of greater than or equal to 200.0 MPa.

A hundred-and-sixth aspect A106 includes the glass-based article according to the hundred-and-fifth aspect A105, wherein the strengthened glass-based article has a retained strength of greater than or equal to 225.0 MPa.

A hundred-and-seventh aspect A107 includes the glass-based article according to any of the eighty-first through one-hundredth aspects A81-A100, wherein the strengthened glass-based article has a retained strength of greater than or equal to 200.0 MPa as measured for an article having a thickness of 600.0 µm after impact with 180 grit sandpaper with a force of 500.0 N.

A hundred-and-eighth aspect A108 includes the glass-based article according to the hundred-and-seventh aspect A107, wherein the strengthened glass-based article has a retained strength of greater than or equal to 220.0 MPa.

A hundred-and-ninth aspect A109 includes the glass-based article according to the hundred-and-eighth aspect A108, wherein the strengthened glass-based article has a retained strength of greater than or equal to 250.0 MPa.

A hundred-and-tenth aspect A110 including a consumer electronic device, comprising: a housing having a front surface, a back surface, and side surfaces; electrical components provided at least partially within the housing, the electrical components including at least a controller, a memory, and a display, the display being provided at or adjacent the front surface of the housing; and the glass composition or glass-based article of any of the fifty-sixth through hundred-and-ninth aspects A56-A109 is disposed over the display, forms at least a portion of the housing, or is disposed over the display and forms at least a portion of the housing.

A hundred-and-eleventh aspect A111, a glass composition may include: greater than or equal to 55.0 mol % and less than or equal to 63.0 mol % $SiO_2$; greater than or equal to 15.0 mol % and less than or equal to 19.0 mol % $Al_2O_3$; greater than or equal to 0.5 mol % and less than or equal to 2.5 mol % $P_2O_5$; greater than or equal to 2.0 mol % and less than or equal to 6.0 mol % $B_2O_3$; greater than or equal to 6.0 mol % and less than or equal to 10.0 mol % $Li_2O$; greater than or equal to 6.0 mol % and less than or equal to 10.0 mol % $Na_2O$; and greater than or equal to 0.0 mol % and less than or equal to 0.5 mol % $K_2O$, wherein: $R_2O$ is in the range from greater than or equal to 15.0 mol % to less than or equal to 20.0 mol %, wherein $R_2O$ is the sum of alkali metal oxides in the glass composition; $Al_2O_3+R_2O$ is in the range from greater than or equal to 30.0 mol % to less than or equal to 38.0 mol %; and $-0.1 \leq (Al_2O_3—(R_2O+RO))/Li_2O \leq 0.3$, wherein RO is the sum of alkaline earth metal oxides in the glass composition.

A hundred-and-twelfth aspect A112 includes the glass composition according to the hundred-and-eleventh aspect A111, wherein $R_2O$ is in the range from greater than or equal to 15.0 mol % to less than or equal to 17.0 mol %.

A hundred-and-thirteenth aspect A113 includes the glass composition according to the hundred-and-eleventh aspect A111 or the hundred-and-twelfth aspect A112, wherein $Al_2O_3+R_2O$ is in the range from greater than or equal to 32.0 mol % to less than or equal to 36.0 mol %.

A hundred-and-fourteenth aspect A114 includes the glass composition according to any of the hundred-and-eleventh through hundred-and-thirteenth aspects A111-A113, wherein $0.0 \leq (Al_2O_3-(R_2O+RO))/Li_2O \leq 0.1$.

A hundred-and-fifteenth aspect A115 includes the glass composition according to any of the hundred-and-eleventh through hundred-and-fourteenth aspects A111-A114, wherein $0.9 \leq Al_2O_3/(R_2O+RO) \leq 1.1$.

A hundred-and-sixteenth aspect A116 includes the glass composition according to any of the hundred-and-eleventh through hundred-and-fifteenth aspects A111-A115, wherein $Al_2O_3+R_2O+B_2O_3$ is greater than or equal to 32.0 mol %.

A hundred-and-seventeenth aspect A117 includes the glass composition according to any of the hundred-and-eleventh through hundred-and-sixteenth aspects A111-A116, wherein $(B_2O_3+P_2O_5+Al_2O_3)/(SiO_2) \geq 0.20$.

A hundred-and-eighteenth aspect A118 includes the glass composition according to the hundred-and-seventeenth aspect A117, wherein $(B_2O_3+P_2O_5+A_2O_3)/(SiO_2) \geq 0.30$.

A hundred-and-nineteenth aspect A119 includes the glass composition according to the hundred-and-eighteenth aspect A118, wherein $(B_2O_3+P_2O_5+A_2O_3)/(SiO_2) \geq 0.40$.

A hundred-and-twentieth aspect A120 includes the glass composition according to any of the hundred-and-eleventh through hundred-and-nineteenth aspects A111-A119, further comprising less than or equal to 2.0 mol % MgO.

A hundred-and-twenty-first aspect A121 includes the glass composition according to any of the hundred-and-eleventh through hundred-and-twentieth aspects A111-A120, further comprising 0.0 mol % to 1.0 mol % $TiO_2$.

A hundred-and-twenty-second aspect A122 includes the glass composition according to any of the hundred-and-eleventh through hundred-and-twenty-first aspects A111-A121, further comprising 0.0 mol % to 1.0 mol % $SnO_2$.

A hundred-and-twenty-third aspect A123 includes the glass composition according to any of the hundred-and-eleventh through hundred-and-twenty-second aspects A111-A122, wherein $Al_2O_3*(10.832)+B_2O_3*(10.334)+P_2O_5*(-13.761)+Li_2O*(-3.135)+Na_2O*(-7.213)+K_2O*(-13.761)+MgO*(2.159)+CaO*(-4.518)+SrO*(-4.518) \geq 100$.

A hundred-and-twenty-fourth aspect A124 includes the glass composition according to any of the hundred-and-eleventh through hundred-and-twenty-second aspects A111-

A122, wherein $Al_2O_3^*(5.99)+B_2O_3^*(-3.85)+P_2O_5^*(-8.44)+Li_2O^*(8.65)+Na_2O^*(-4.65)+K_2O^*(-10.18)+MgO^*(1.86)+CaO^*(1.86)+SrO^*(1.86) \geq 100$.

A hundred-and-twenty-fifth aspect A125 includes the glass composition according to any of the hundred-and-eleventh through hundred-and-twenty-second aspects A111-A122, wherein $Al_2O_3^*(4.52)+B_2O^*(-8.28)+P_2O_5^*(-1.73)+Li_2O^*(-10.40)+Na_2O^*(-7.65)+K_2O^*(-10.52)+MgO^*(-4.33)+CaO^*(-6.61)+SrO^*(-2.60) \leq -100$.

A hundred-and-twenty-sixth aspect A126 includes the glass composition according to any of the hundred-and-eleventh through hundred-and-twenty-fifth aspects A111-A125, wherein the glass composition has a density in the range from greater than or equal to 2.20 to less than or equal to 2.60.

A hundred-and-twenty-seventh aspect A127 includes the glass composition according to any of the hundred-and-eleventh through hundred-and-twenty-sixth aspects A111-A126, wherein the glass composition has a liquidus viscosity in the range from greater than or equal to 5.0 kP to less than or equal to 175.0 kP.

A hundred-and-twenty-eighth aspect A128 includes the glass composition according to any of the hundred-and-eleventh through hundred-and-twenty-seventh aspects A111-A127, wherein the glass composition has a softening point in the range from greater than or equal to 650.0° C. to less than or equal to 950.0° C.

A hundred-and-twenty-ninth aspect A129 includes the glass composition according to the hundred-and-twenty-eighth aspect A128, wherein the glass composition has a softening point in the range from greater than or equal to 750.0° C. to less than or equal to 925.0° C.

A hundred-and-thirtieth aspect A130 includes the glass composition according to the hundred-and-twenty-ninth aspect A129, wherein the glass composition has a softening point in the range from greater than or equal to 790.0° C. to less than or equal to 910.0° C.

A hundred-and-thirty-first aspect A131 includes the glass composition according to any of the hundred-and-eleventh through hundred-and-twenty-seventh aspects A111-A127, wherein the glass composition has a softening point of less than or equal to 900.0° C.

A hundred-and-thirty-second aspect A132 includes the glass composition according to the hundred-and-thirty-first aspect A131, wherein the glass composition has a softening point of less than or equal to 875.0° C.

A hundred-and-thirty-third aspect A133 includes the glass composition according to the hundred-and-thirty-second aspect A132, wherein the glass composition has a softening point of less than or equal to 860.0° C.

A hundred-and-thirty-fourth aspect A134 includes a glass-based article having the glass composition according to any of the hundred-and-eleventh through hundred-and-thirty-third aspects A111-A133, wherein the glass composition has a $K_{1C}$ fracture toughness as measured by a chevron notch short bar method of greater than or equal to 0.70 MPa·m$^{1/2}$.

A hundred-and-thirty-fifth aspect A135 includes the glass-based article according to the hundred-and-thirty-fourth aspect A134, wherein the glass composition has a $K_{1C}$ fracture toughness as measured by a chevron notch short bar method of greater than or equal to 0.73 MPa·m$^{1/2}$.

A hundred-and-thirty-sixth aspect A136 includes a glass-based article having the glass composition according to any of the hundred-and-eleventh through hundred-and-thirty-third aspects A111-A133, wherein the glass composition is chemically strengthened and has a compressive stress of greater than or equal to 450.0 MPa.

A hundred-and-thirty-seventh aspect A137 includes the glass-based article according to the hundred-and-thirty-sixth aspect A136, wherein the glass-based article is chemically strengthened in an ion exchange bath comprising $KNO_3$ at a temperature from greater than or equal to 350.0° C. to less than or equal to 500.0° C. for a time period of from greater than or equal to 2 hours to less than or equal to 12 hours.

A hundred-and-thirty-eighth aspect A138 includes the glass-based article according to the hundred-and-thirty-seventh aspect A137, wherein the ion exchange bath further comprises $NaNO_3$.

According to a hundred-and-thirty-ninth aspect A139 includes the glass-based article according to any of the hundred-and-thirty-sixth through hundred-and-thirty-eighth aspects A136-A138, wherein the strengthened glass-based article has a compressive stress of greater than or equal to 600.0 MPa.

A hundred-and-fortieth aspect A140 includes the glass-based article according to any of the hundred-and-thirty-sixth through hundred-and-thirty-ninth aspects A136-A139, wherein the strengthened glass-based article has a maximum central tension of greater than or equal to 20.0 MPa.

A hundred-and-forty-first aspect A141 includes the glass-based article according to the hundred-and-fortieth aspect A140, wherein the strengthened glass-based article has a maximum central tension of greater than or equal to 60.0 MPa.

A hundred-and-forty-second aspect A142 includes the glass-based article according to any of the hundred-and-thirty-sixth through hundred-and-forty-first aspects A136-A141, wherein the strengthened glass-based article has a depth of compression of greater than or equal to 0.15t, wherein t is a thickness of the strengthened glass-based article.

A hundred-and-forty-third aspect A143 includes the glass-based article according to the hundred-and-forty-second aspect A142, wherein the strengthened glass-based article has a depth of compression of greater than or equal to 0.18t.

A hundred-and-forty-fourth aspect A144 includes the glass-based article according to any of the hundred-and-thirty-sixth through hundred-and-forty-third aspects A136-A143, wherein the strengthened glass-based article has a depth of layer of greater than or equal to 5.0 μm.

A hundred-and-forty-fifth aspect A145 includes the glass-based article according to the hundred-and-forty-fourth aspect A144, wherein the strengthened glass-based article has a depth of layer of greater than or equal to 10.0 μm.

A hundred-and-forty-sixth aspect A146 includes the glass-based article according to any of the hundred-and-thirty-sixth through hundred-and-thirty-eighth aspects A136-A138, wherein the strengthened glass has a compressive stress of greater than or equal to 600.0 MPa, a maximum central tension of greater than or equal to 20.0 MPa, a depth of compression of greater than or equal to 0.15t, wherein t is a thickness of the strengthened glass-based article, and a depth of layer of greater than or equal to 5.0 μm.

A hundred-and-forty-seventh aspect A147 includes the glass-based article according to the hundred-and-forty-sixth aspect A146, wherein the strengthened glass has a maximum central tension of greater than or equal to 60.0 MPa, a depth of compression of greater than or equal to 0.18t, and a depth of layer of greater than or equal to 10.0 μm.

A hundred-and-forty-eighth aspect A148 includes the glass-based article according to any of the hundred-and-thirty-sixth through hundred-and-forty-seventh aspects A136-A147, wherein the strengthened glass-based article has a Knoop Scratch threshold in the range of greater than or equal to 6.0 N to less than or equal to 12.0 N.

A hundred-and-forty-ninth aspect A149 includes the glass-based article according to any of the hundred-and-thirty-sixth through hundred-and-forty-seventh aspects A136-A147, wherein the strengthened glass-based article has a Knoop Scratch threshold of greater than or equal to 9.0 N.

A hundred-and-fiftieth aspect A150 includes the glass-based article according to any of the hundred-and-thirty-sixth through hundred-and-forty-ninth aspects A136-A149, wherein the strengthened glass-based article has a failure height of greater than or equal to 100.0 cm as measured for an article having a 0.5 mm thickness according to the Drop Test Method on 180 grit sandpaper.

A hundred-and-fifty-first aspect A151 includes the glass-based article according to the hundred-and-fiftieth aspect A150, wherein the strengthened glass-based article has a failure height of greater than or equal to 120.0 cm.

A hundred-and-fifty-second aspect A152 includes the glass-based article according to the hundred-and-fifty-first aspect A151, wherein the strengthened glass-based article has a failure height of greater than or equal to 150.0 cm.

A hundred-and-fifty-third aspect A153 includes the glass-based article according to any of the hundred-and-thirty-sixth through hundred-and-forty-ninth aspects A136-A149, wherein the strengthened glass-based article has a failure height of greater than or equal to 150.0 cm as measured for an article having a thickness of 0.6 mm according to the Drop Test Method on 180 grit sandpaper.

A hundred-and-fifty-fourth aspect A154 includes the glass-based article according to the hundred-and-fifty-third aspect A153, wherein the strengthened glass-based article has a failure height of greater than or equal to 180.0 cm.

A hundred-and-fifty-fifth aspect A155 includes the glass-based article according to the hundred-and-fifty-fourth aspect A154, wherein the strengthened glass-based article has a failure height of greater than or equal to 200.0 cm.

A hundred-and-fifty-sixth aspect A156 includes the glass-based article according to any of the hundred-and-thirty-sixth through hundred-and-fifty-fifth aspects A136-A155, wherein the strengthened glass-based article has a retained strength of greater than or equal to 150.0 MPa as measured for an article having a thickness of 600.0 μm after impact with 80 grit sandpaper with a force of 500.0 N.

A hundred-and-fifty-seventh aspect A157 includes the glass-based article according to the hundred-and-fifty-sixth aspect A156, wherein the strengthened glass-based article has a retained strength of greater than or equal to 175.0 MPa.

A hundred-and-fifty-eighth aspect A158 includes the glass composition according to the hundred-and-fifty-seventh aspect A157, wherein, the strengthened glass-based article has a retained strength of greater than or equal to 200.0 MPa.

A hundred-and-fifty-ninth aspect A159 includes the glass-based article according to any of the hundred-and-thirty-sixth through hundred-and-fifty-fifth aspects A136-A155, wherein the strengthened glass-based article has a retained strength of greater than or equal to 175.0 MPa as measured for an article having a thickness of 600.0 μm after impact with 120 grit sandpaper with a force of 500.0 N.

A hundred-and-sixtieth aspect A160 includes the glass-based article according to the hundred-and-fifty-ninth aspect A159, wherein the strengthened glass-based article has a retained strength of greater than or equal to 200.0 MPa.

A hundred-and-sixty-first aspect A161 includes the glass-based article according to the hundred-and-sixtieth aspect A160, wherein the strengthened glass-based article has a retained strength of greater than or equal to 225.0 MPa.

A hundred-and-sixty-second aspect A162 includes the glass-based article according to any of the hundred-and-thirty-sixth through hundred-and-fifty-fifth aspects A136-A155, wherein the strengthened glass-based article has a retained strength of greater than or equal to 200.0 MPa as measured for an article having a thickness of 600.0 μm after impact with 180 grit sandpaper with a force of 500.0 N.

A hundred-and-sixty-third aspect A163 includes the glass-based article according to the hundred-and-sixty-second aspect A162, wherein the strengthened glass-based article has a retained strength of greater than or equal to 220.0 MPa.

A hundred-and-sixty-fourth aspect A164 includes the glass-based article according to the hundred-and-sixty-third aspect A163, wherein the strengthened glass-based article has a retained strength of greater than or equal to 250.0 MPa.

A hundred-and-sixty-fifth aspect A165 includes a consumer electronic device, comprising: a housing having a front surface, a back surface, and side surfaces; electrical components provided at least partially within the housing, the electrical components including at least a controller, a memory, and a display, the display being provided at or adjacent the front surface of the housing; and the glass composition or glass-based of any of the one-hundred-and-eleventh through one-hundred-and-sixty-fourth aspects A111-A164 is disposed over the display, forms at least a portion of the housing, or is disposed over the display and forms at elast a portion of the housing.

According to a hundred-and-sixty-sixth aspect A166, a glass composition may include: greater than or equal to 55.0 mol % and less than or equal to 65.0 mol % $SiO_2$; greater than or equal to 14.0 mol % and less than or equal to 20.0 mol % $Al_2O_3$; greater than or equal to 0.0 mol % and than or equal to 3.0 mol % $P_2O_5$; greater than or equal to 1.0 mol % and than or equal to 7.0 mol % $B_2O_3$; wherein: $-0.1 \leq (Al_2O_3-(R_2O+RO))/Li_2O \leq 0.3$, wherein $R_2O$ is the sum of alkali metal oxides in the glass composition and RO is the sum of alkaline earth metal oxides in the composition, and the glass composition has a softening point of less than or equal to 900.0° C.

A hundred-and-sixty-seventh aspect A167 includes the glass composition according to the hundred-and-sixty-sixth aspect A166, wherein the glass composition has a softening point of less than or equal to 875.0° C.

A hundred-and-sixty-eighth aspect A168 includes the glass composition according to the hundred-and-sixty-sixth aspect A166 or the hundred-and-sixty-seventh aspect A167, wherein the glass composition has a softening point of less than or equal to 860.0° C.

A hundred-and-sixty-ninth aspect A169 includes a glass-based article having a glass composition according to hundred-and-sixty-sixth through hundred-and-sixty-eighth aspects A166-A168, wherein the glass composition is chemically strengthened.

A hundred-and-seventieth aspect A170 includes the glass-based article according to the hundred-and-sixty-ninth aspect A169, wherein the glass-based article is chemically strengthened in an ion exchange bath comprising $KNO_3$ at a temperature from greater than or equal to 350.0° C. to less than or equal to 500.0° C. for a time period of from greater than or equal to 2 hours to less than or equal to 12 hours.

A hundred-and-seventy-first aspect A171 includes the glass-based article according to the hundred-and-seventieth aspect A170, wherein the ion exchange bath further comprises $NaNO_3$.

A hundred-and-seventy-second aspect A172 includes the glass-based article according to any of the hundred-and-sixty-ninth through hundred-and-seventy-first aspects A169-A171, wherein the strengthened glass-based article has a failure height of greater than or equal to 100.0 cm as measured for an article having a thickness of 0.5 mm according to the Drop Test Method on 180 grit sandpaper.

A hundred-and-seventy-third aspect A173 includes the glass-based article according to the hundred-and-seventy-second aspect A172, wherein the strengthened glass-based article has a failure height of greater than or equal to 120.0 cm.

A hundred-and-seventy-fourth aspect A174 includes the glass-based article according to the hundred-and-seventy-third aspect A173, wherein the strengthened glass-based article has a failure height of greater than or equal to 150.0 cm.

A hundred-and-seventy-fifth aspect A175 includes the glass-based article according to any of the hundred-and-sixty-ninth through hundred-and-seventy-first aspects A169-A171, wherein the strengthened glass-based article has a failure height of greater than or equal to 150.0 cm as measured for an article having a thickness of 0.6 mm according to the Drop Test Method on 180 grit sandpaper.

A hundred-and-seventy-sixth aspect A176 includes the glass-based article according to the hundred-and-seventy-fifth aspect A175, wherein the strengthened glass-based article has a failure height of greater than or equal to 180.0 cm.

A hundred-and-seventy-seventh aspect A177 includes the glass-based article according to the hundred-and-seventy-sixth aspect A176, wherein the strengthened glass-based article has a failure height of greater than or equal to 200.0 cm.

A hundred-and-seventy-eighth aspect A178 includes the glass-based article according to any of the hundred-and-sixty-ninth through hundred-and-seventy-seventh aspects A169-A177, wherein the strengthened glass-based article has a compressive stress of greater than or equal to 450.0 MPa.

A hundred-and-seventy-ninth aspect A179 includes the glass-based article according to any of the hundred-and-sixty-ninth through hundred-and-seventy-eighth aspects A169-A178, wherein the strengthened glass-based article has a maximum central tension of greater than or equal to 60.0 MPa.

A hundred-and-eightieth aspect A180 includes the glass-based article according to any of the hundred-and-sixty-ninth through hundred-and-seventy-ninth aspects A169-A179, wherein the strengthened glass-based article has a depth of compression of greater than or equal to 0.15t, wherein t is a thickness of the strengthened glass-based article.

A hundred-and-eighty-first aspect A181 includes the glass-based article according to any of the hundred-and-sixty-ninth through hundred-and-eightieth aspects A169-A180, wherein the strengthened glass-based article has a depth of layer of greater than or equal to 5.0 µm.

A hundred-and-eighty-second aspect A182 includes the glass-based article according to any of the hundred-and-sixty-ninth through hundred-and-eighty-first aspects A169-A181, wherein the strengthened glass-based article has a Knoop Scratch threshold of greater than or equal to 6.0 N.

A hundred-and-eighty-third aspect A183 includes the glass-based article according to any of the hundred-and-sixty-ninth through hundred-and-eighty-first aspects A169-A182, wherein the strengthened glass-based article has a retained strength of greater than or equal to 150.0 MPa as measured for an article having a thickness of 600.0 µm after impact with 80 grit sandpaper with a force of 500.0 N.

A hundred-and-eighty-fourth aspect A184 includes the glass-based article according to the hundred-and-eighty-third aspect A183, wherein the strengthened glass-based article has a retained strength of greater than or equal to 175.0 MPa.

A hundred-and-eighty-fifth aspect A185 includes the glass composition according to the hundred-and-eighty-fourth aspect A184, wherein, the strengthened glass-based article has a retained strength of greater than or equal to 200.0 MPa.

A hundred-and-eighty-sixth aspect A186 includes the glass-based article according to any of the hundred-and-sixty-ninth through hundred-and-eighty-first aspects A169-A182, wherein the strengthened glass-based article has a retained strength of greater than or equal to 175.0 MPa as measured for an article having a thickness of 600.0 µm after impact with 120 grit sandpaper with a force of 500.0 N.

A hundred-and-eighty-seventh aspect A187 includes the glass-based article according to the hundred-and-eighty-sixth aspect A186, wherein the strengthened glass-based article has a retained strength of greater than or equal to 200.0 MPa.

A hundred-and-eighty-eighth aspect A188 includes the glass-based article according to the hundred-and-eighty-seventh aspect A187, wherein the strengthened glass-based article has a retained strength of greater than or equal to 225.0 MPa.

A hundred-and-eighty-ninth aspect A189 includes the glass-based article according to any of the hundred-and-sixty-ninth through hundred-and-eighty-first aspects A169-A182, wherein the strengthened glass-based article has a retained strength of greater than or equal to 200.0 MPa as measured for an article having a thickness of 600.0 µm after impact with 180 grit sandpaper with a force of 500.0 N.

A hundred-and-ninetieth aspect A190 includes the glass-based article according to the hundred-and-eighty-ninth aspect A189, wherein the strengthened glass-based article has a retained strength of greater than or equal to 220.0 MPa.

A hundred-and-ninety-first aspect A191 includes the glass-based article according to the hundred-and-ninetieth aspect A190, wherein the strengthened glass-based article has a retained strength of greater than or equal to 250.0 MPa.

According to a hundred-and-ninety-second aspect A192, a chemically strengthened glass-based article may include: greater than or equal to 55.0 mol % and less than or equal to 65.0 mol % $SiO_2$; greater than or equal to 14.0 mol % and than or equal to 20.0 mol % $Al_2O_3$; greater than or equal to 0.0 mol % and than or equal to 3.0 mol % $P_2O_5$; greater than or equal to 1.0 mol % and than or equal to 7.0 mol % $B_2O_3$; wherein: $-0.1 \leq (Al_2O_3-(R_2O+RO))/Li_2O \leq 0.3$, wherien $R_2O$ is the sum of alkali metal oxides in the glass-based article and RO is the sum of alkaline earth metal oxides in the glass-based article, and wherein the strengthened glass-based article has a failure height of greater than or equal to 100.0 cm as measured for an article having a thickness of less than 0.5 mm according to Drop Test Method on 180 grit sandpaper.

A hundred-and-ninety-third aspect A193 includes the strengthened glass-based article according to the hundred-and-ninety-second aspect A192, wherein the strengthened glass-based article has a failure height of greater than or equal to 120.0 cm.

A hundred-and-ninety-fourth aspect A194 includes the strengthened glass-based article according to the hundredand-ninety-third aspect A193, wherein the strengthened glass-based article has a failure height of greater than or equal to 150.0 cm.

A hundred-and-ninety-fifth aspect A195 includes the strengthened glass-based article according to any of the hundred-and-ninety-second through hundred-and-ninety-fourth aspects A192-A194, wherein the strengthened glass-based article has a compressive stress of greater than or equal to 450.0 MPa.

A hundred-and-ninety-sixth aspect A196 includes the strengthened glass-based article according to any of the hundred-and-ninety-second through hundred-and-ninety-fifth aspects A192-A195, wherein the strengthened glass-based article has a maximum central tension of greater than or equal to 60.0 MPa.

A hundred-and-ninety-seventh aspect A197 includes the strengthened glass-based article according to any of the hundred-and-ninety-second through hundred-and-ninety-sixth aspects A192-A196, wherein the strengthened glass-based article has a depth of compression of greater than or equal to 0.15t, wherein t is a thickness of the strengthened glass article.

A hundred-and-ninety-eighth aspect A198 includes the strengthened glass-based article according to any of the hundred-and-ninety-second through hundred-and-ninety-seventh aspects A192-A197, wherein the strengthened glass-based article has a depth of layer of greater than or equal to 5.0 µm.

A hundred-and-ninety-ninth aspect A199 includes the strengthened glass-based article according to any of the hundred-and-ninety-second through hundred-and-ninety-eighth aspects A192-A198, wherein the strengthened glass-based article has a Knoop Scratch threshold of greater than or equal to 6.0 N.

According to a two-hundredth aspect A200, a chemically strengthened glass-based article may include: greater than or equal to 55.0 mol % and less than or equal to 65.0 mol % $SiO_2$; greater than or equal to 14.0 mol % and less than or equal to 20.0 mol % $Al_2O_3$; greater than or equal to 0.0 mol % and than or equal to 3.0 mol % $P_2O_5$; greater than or equal to 1.0 mol % and than or equal to 7.0 mol % $B_2O_3$; wherein: $-0.1 \leq (Al_2O_3-(R_2O+RO))/Li_2O \leq 0.3$, wherein $R_2O$ is the sum of alkali metal oxides in the glass-based article and RO is the sum of alkaline metal oxides in the glass-based article, and wherein the chemically strengthened glass-based article has a failure height of greater than or equal to 150.0 cm as measured for an article having a thickness of less than 0.6 mm according to the Drop Test Method on 180 grit sandpaper.

A two-hundred-and-first aspect A201 includes the strengthened glass-based article according to the two-hundredth aspect A200, wherein the chemically strengthened glass-based article has a failure height of greater than or equal to 180.0 cm.

A two-hundred-and-second aspect A202 includes the strengthened glass-based article according to two-hundred-and-first aspect A201, wherein the chemically strengthened glass-based article has a failure height of greater than or equal to 200.0 cm.

A two-hundred-and-third aspect A203 includes the strengthened glass-based article according to any of the two-hundredth through two-hundred-and-second aspects A200-A202, wherein the strengthened glass-based article has a compressive stress of greater than or equal to 450.0 MPa.

A two-hundred-and-fourth aspect A204 includes the strengthened glass-based article according to any of the two-hundredth through two-hundred-and-third aspects A200-A203, wherein the strengthened glass-based article has a maximum central tension of greater than or equal to 60.0 MPa.

A two-hundred-and-fifth aspect A205 includes the strengthened glass-based article according to any of the two-hundredth through two-hundred-and-fourth aspects A200-A204, wherein the strengthened glass-based article has a depth of compression of greater than or equal to 0.15t, wherein t is a thickness of the strengthened glass article.

A two-hundred-and-sixth aspect A206 includes the strengthened glass-based article according to any of the two-hundredth through two-hundred-and-fifth aspects A200-A205, wherein the strengthened glass-based article has a depth of layer of greater than or equal to 5.0 µm.

A two-hundred-and-seventh aspect A207 includes the strengthened glass-based article according to any of the two-hundredth through two-hundred-and-sixth aspects A200-A206, wherein the strengthened glass-based article has a Knoop Scratch threshold of greater than or equal to 9.0 N.

According to a two-hundred-and-eighth aspect A208 a glass-based article includes: a composition comprising a lithium-based aluminosilicate; first and second opposing surfaces defining a thickness (t) of the glass-based article, wherein the thickness of the glass-based article is greater than or equal to 100 µm and less than or equal to 1000 µm; a failure height of greater than or equal to 100 cm as measured by the Drop Test Method on 180 grit sandpaper; and a Knoop Scratch threshold of greater than or equal to 6.0 N and less than or equal to 12.0 N.

A two-hundred-and-ninth aspect A209 includes the glass-based article according to the two-hundredth-and-eighth aspect A208, wherein the thickness of the glass-based article is greater than or equal to 400 µm and less than or equal to 800 µm.

A two-hundred-and-tenth aspect A210 includes the glass-based article according to any of the two-hundredth-and-eighth through two-hundred-and-ninth aspects A208-A209, wherein the thickness of the glass-based article is greater than or equal to 400 µm and less than or equal to 700 µm.

A two-hundred-and-eleventh aspect A211 includes the glass-based article according to any of the two-hundredth-and-eighth through two-hundred-and-tenth aspects A208-A210, wherein the failure height is greater than or equal to 150 cm as measured by the Drop Test Method on 180 grit sandpaper.

A two-hundred-and-twelfth aspect A212 includes the glass-based article according to any of the two-hundredth-and-eighth through two-hundred-and-eleventh aspects A208-A211, wherein the failure height is greater than or equal to 200 cm as measured the Drop Test Method on 180 grit sandpaper.

A two-hundred-and-thirteenth aspect A213 includes the glass-based article according to any of the two-hundredth-and-eighth through two-hundred-and-twelfth aspects A208-A212, wherein the glass-based article has a Knoop scratch threshold of greater than or equal to 6.0 N and less than or equal to 12.0 N.

A two-hundred-and-fourteenth aspect A214 includes the glass-based article according to any of the two-hundredth-and-eighth through two-hundred-and-thirteenth aspects A208-A213, wherein the glass-based article has a Knoop scratch threshold of greater than or equal to 7.0 N and less than or equal to 12.0 N.

A two-hundred-and-fifteenth aspect A215 includes the glass-based article according to any of the two-hundredthand-eighth through two-hundred-and-fourteenth aspects A208-A214, wherein the glass-based article has a softening point of greater than or equal to 650° C. and less than or equal to 950° C.

A two-hundred-and-sixteenth aspect A216 includes the glass-based article according to any of the two-hundredth-and-eighth through two-hundred-and-fifteenth aspects A208-A215, wherein the glass-based article has a softening point of greater than or equal to 650° C. and less than or equal to 800° C.

A two-hundred-and-seventeenth aspect A217 includes the glass-based article according to any of the two-hundredth-and-eighth through two-hundred-and-sixteenth aspects A208-A216, wherein the glass-based article has a $K_{1C}$ fracture toughness as measured by a chevron notch short bar method of greater than or equal to 0.70.

A two-hundred-and-eighteenth aspect A218 includes the glass-based article according to any of the two-hundredth-and-eighth through two-hundred-and-seventeenth aspects A208-A217, wherein the glass-based article has a composition comprising: greater than or equal to 50.0 mol % and less than or equal to 70.0 mol % $SiO_2$; greater than or equal to 10.0 mol % and less than or equal to 25.0 mol % $Al_2O_3$; greater than or equal to 0.0 mol % and less than or equal to 5.0 mol % $P_2O_5$; greater than or equal to 0.0 mol % and less than or equal to 10.0 mol % $B_2O_3$; greater than or equal to 5.0 mol % and less than or equal to 15.0 mol % $Li_2O$; greater than or equal to 1.0 mol % and less than or equal to 15.0 mol % $Na_2O$; and greater than or equal to 0.0 mol % and less than or equal to 1.0 mol % $K_2O$.

A two-hundred-and-nineteenth aspect A219 includes the glass-based article according to the two-hundredth-and-eighteenth aspect A218, wherein $R_2O$ is greater than or equal to 11.0 mol % and less than or equal to 23.0 mol %, wherein $R_2O$ the sum of alkali metal oxides present in the glass-based article in mol %; $Al_2O_3+R_2O$ is greater than or equal to 26.0 mol % and less than or equal to 40.0 mol %; and $-0.1 \leq (Al_2O_3-(R_2O+RO))/Li_2O \leq 0.3$, wherein RO is the sum of alkaline earth metal oxides present in the glass-based article in mol %.

A two-hundred-and-twentieth aspect A220 includes the glass-based article according to the two-hundredth-and-nineteenth aspect A219, wherein $R_2O$ is greater than or equal to 15.0 mol % and less than or equal to 19.0 mol %.

A two-hundred-and-twenty-first aspect A221 includes the glass-based article according to any of the two-hundredth-and-nineteenth through two-hundred-and-twentieth aspects A219-A220, wherein $Al_2O_3+R_2O$ is greater than or equal to 28.0 mol % and less than or equal to 36.0 mol %.

A two-hundred-and-twenty-second aspect A222 includes the glass-based article according to any of the two-hundredth-and-nineteenth through two-hundred-and-twenty-first aspects A219-A221, wherein $0.0 \leq (Al_2O_3-(R_2O+RO))/Li_2O \leq 0.1$.

A two-hundred-and-twenty-third aspect A223 includes the glass-based article according to any of the two-hundredth-and-nineteenth through two-hundred-and-twenty-second aspects A219-A222, wherein the glass-based article is a strengthened glass-based article and has a depth of compression greater than or equal to 0.15t.

A two-hundred-and-twenty-fourth aspect A224 includes the glass-based article according to the two-hundred-and-twenty-third aspect A223, wherein the strengthened glass-based article has a compressive stress of greater than or equal to 600 MPa.

A two-hundred-and-twenty-fifth aspect A225 includes the glass-based article according to any of the two-hundredth-and-twenty-third through two-hundred-and-twenty-fourth aspects A223-A224, wherein the strengthened glass-based article has a maximum central tension of greater than or equal to 20.0 MPa.

A two-hundred-and-twenty-sixth aspect A226 includes the glass-based article according to any of the two-hundredth-and-twenty-third through two-hundred-and-twenty-fifth aspects A223-A225, wherein the strengthened glass-based article has a depth of layer of greater than or equal to 5.0 μm.

According to a two-hundred-and-twenty-seventh aspect A227, a glass-based article may include: a composition comprising a lithium-based aluminosilicate; first and second opposing surfaces defining a thickness (t) of the glass-based article, wherein the thickness of the glass-based article is greater than or equal to 100 μm and less than or equal to 1000 μm; a retained strength greater than or equal to 150 MPa as measured for a glass-based article having a thickness of 600.0 μm after impact with 80 grit sandpaper with a force of 500.0 N; and a Knoop Scratch threshold of greater than or equal to 6.0 N and less than or equal to 12.0 N.

A two-hundred-and-twenty-eighth aspect A228 includes the glass-based article according to the two-hundred-and-twenty-seventh aspect A227, wherein the glass-based article has a retained strength greater than or equal to 175 MPa as measured for a glass-based article having a thickness of 600.0 μm after impact with 120 grit sandpaper with a force of 500.0 N.

A two-hundred-and-twenty-ninth aspect A229 includes the glass-based article according to any of the two-hundredth-and-twenty-seventh through two-hundred-and-twenty-eighth aspects A227-A228, wherein the glass-based article has a retained strength greater than or equal to 175 MPa as measured for a glass-based article having a thickness of 600.0 μm after impact with 120 grit sandpaper with a force of 500.0 N.

According to a two-hundred-and-thirtieth aspect A230, a consumer electronic device includes: a housing having a front surface, a back surface, and side surfaces; electrical components provided at least partially within the housing, the electrical components including at least a controller, a memory, and a display, the display being provided at or adjacent the front surface of the housing; and wherein the glass-based article of any one of the two-hundred-and-eighth through two-hundred-and-twenty-ninth aspects is disposed over the display, forms at least a portion of the housing, or is formed over the display and forms at least a portion of the housing.

According to a two-hundred-and-thirty-first aspect A231, the glass-based article of any one of the two-hundred-and-eighth through two-hundred-and-twenty-ninth aspects is a cell phone cover glass.

Additional features and advantages of the s described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 is a plan view of an exemplary device-drop machine that may be used to conduct the Drop Test Method;

FIG. 2 is a plan view of the machine of FIG. 1, wherein a chuck of the device-drop machine is released, chuck jaws open, and a puck is released;

FIG. 3 is a plan view of the machine of FIG. 1, wherein the falling puck strikes a drop surface;

DETAILED DESCRIPTION

Figure 4:
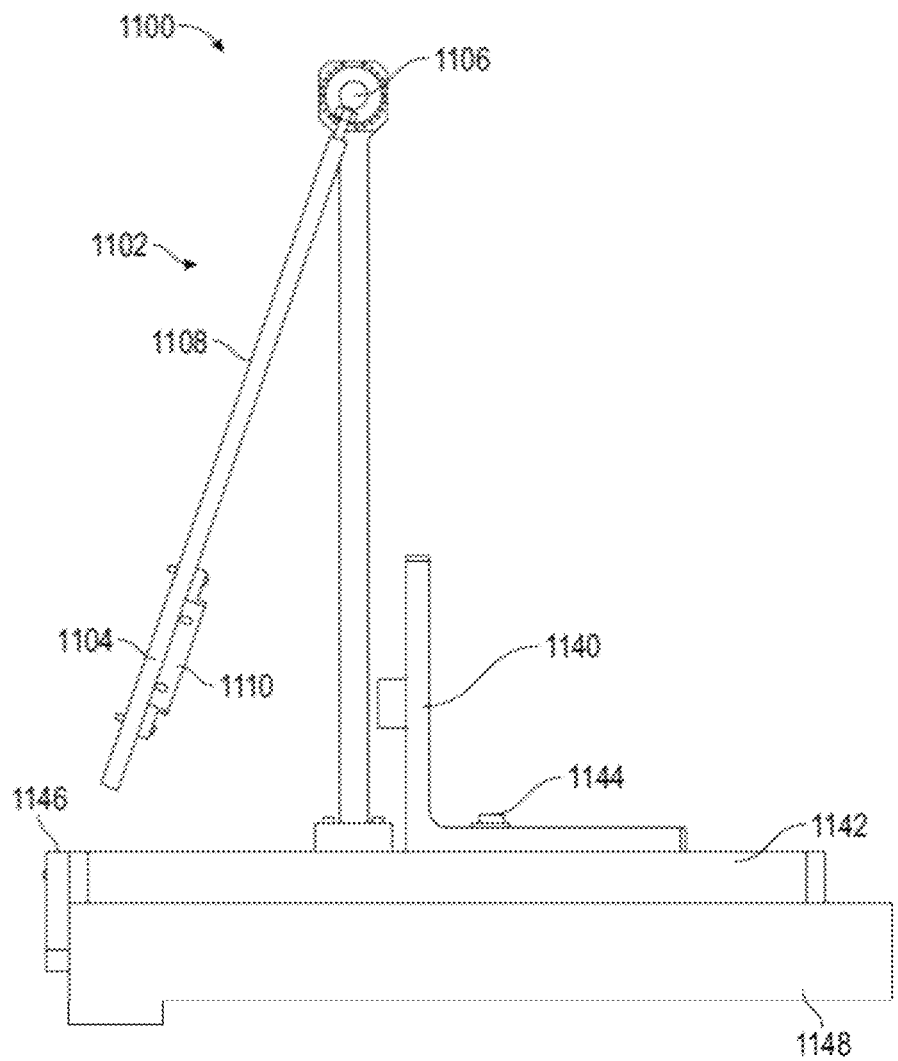
FIG. 4 is a schematic view of an apparatus that introduces damage to a glass article via impact with an impacting object.

Reference will now be made in detail to various embodiments of ion exchangeable alkali aluminosilicate glass compositions that exhibit improved mechanical durability. According to embodiments, a glass composition comprises: 50.0 mol % to 70.0 mol % $SiO_2$; 10.0 mol % to 25.0 mol % $Al_2O_3$; 0.0 mol % to 5.0 mol % $P_2O_5$; 0.0 mol % to 10.0 mol % $B_2O_3$; 5.0 mol % to 15.0 mol % $Li_2O$; 1.0 mol % to 15.0 mol % $Na_2O$; and 0.0 mol % to 1.0 mol % $K_2O$. The sum of all alkali oxides, $R_2O$, present in the glass composition may be in the range from greater than or equal to 11.0 mol % to less than or equal to 23.0 mol %. The sum of $Al_2O_3$ and $R_2O$ present in the glass composition may be in the range from greater than or equal to 26.0 mol % to less than or equal to 40 mol %. The glass composition may satisfy the relationship $-0.1 \leq (Al_2O_3-(R_2O+RO))/Li_2O \leq 0.3$. Various embodiments of glass compositions will be referred to herein with specific references to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a central composition at the center of the glass article comprises the base composition. The "center" of the glass article may be measured at a thickness of 0.5t and at least a distance of 0.5t from any edge of the glass article.

The term "lithium-based" means that a lithium comprises a substantial portion of the alkali metal oxides present in a glass composition. Without limitation, "lithium-based" includes glass compositions having at least 5.0 mol % $Li_2O$ in the glass composition.

The term "glass-based article" includes a glass or glass ceramic article formed from a glass composition as disclosed and described herein.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol %. The terms "0 mol %," "free," and the like when used to describe the concentration and/or absence of a particular constituent component in a glass-based article, means that the constituent component is not intentionally added to the glass-based article.

In embodiments of the glass compositions described herein, the concentrations of constituent components (e.g., $SiO_2$, $Al_2O_3$, and the like) are specified in mole percent (mol %) on an oxide basis, unless otherwise specified.

The term "softening point," as used herein, refers to the temperature at which the viscosity of the glass composition is $1 \times 10^{7.6}$ poise. The softening point was determined using the parallel plate viscosity method of ASTM C1351M-96 (2012).

The term "annealing point," as used herein, refers to the temperature at which the viscosity of the glass composition is $1 \times 10^{13}$ poise.

The term "strain point," as used herein, refers to the temperature at which the viscosity of the glass composition is $1 \times 10^{14.68}$ poise.

The term "CTE," as used herein, refers to the coefficient of thermal expansion of the glass composition over a temperature range from about 20° C. to about 300° C., unless otherwise specified.

The term "liquidus viscosity," as used herein, refers to the viscosity of the glass at the onset of devitrification (i.e., at the liquidus temperature as determined with the gradient furnace method according to ASTM C829-81).

The elastic modulus (also referred to as Young's modulus) of the glass is provided in units of gigapascals (GPa). The elastic modulus of the glass is determined by resonant ultrasound spectroscopy on bulk samples of each glass composition.

Density is measured by the buoyancy method of ASTM C693-93(2013).

Glass compositions according to embodiments have a high fracture toughness. Without being bound by any particular theory, the high fracture toughness may impart improved drop performance to the glass compositions. The fracture toughness refers to the $K_{1C}$ value, and is measured by the chevron notched short bar method. The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Fracture toughness is measured on a non-strengthened glass article, such as measuring the $K_{1C}$ value prior to ion exchange (IOX) treatment of the glass article, thereby representing a feature of a glass substrate prior to IOX. The fracture toughness test methods described herein are not suitable for glasses that have been exposed to IOX treatment. The measurements on corresponding underlying glass substrates (without IOX treatment), nonetheless, provide valuable information about the IOX'd glass properties. Accordingly, the fracture toughness of an IOX'd article is measured on an otherwise identical article that has not been IOX'd. Unless otherwise specified, the CSNB method is used to measure fracture toughness values described herein.

The term "single ion exchange process," as used herein, refers to a process in which the glass composition is exposed to a single ion exchange solution, such as a $KNO_3$ or $NaNO_3$ molten salt bath.

The term "double ion exchange process," as used herein, refers to a process in which the glass composition is exposed to a first ion exchange solution and a second ion exchange solution.

The term "multiple ion exchange process," as used herein, refers to a process in which the glass composition is exposed to three or more ion exchange solutions.

The term "depth of compression" (DOC), as used herein, refers to the depth at which the stress crosses from a positive (compressive) stress to a negative (tensile) stress and thus exhibits a stress value of zero.

The term "depth of layer" (DOL), as used herein, refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge—Optical Emission Spectroscopy (GD-OES)). Unless otherwise specified, the DOL is given as the depth of exchange of the slowest-diffusing ion introduced by an ion exchange (IOX) process.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) has a maximum at or near the surface of the glass, and the CS varies with distance d from the surface according to a function.

Compressive stress (CS) and depth of layer (DOL) are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum central tension (CT) or peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

The term, "Knoop Scratch threshold," as used herein, refers to the onset of lateral cracking (in 3 or more of 5 scratch events). A series of increasing constant-load scratches (3 minimum per load, but more per load could be used to increase confidence level) are performed to identify the Knoop Scratch threshold. In Knoop Scratch threshold testing, for each load, samples of the glass substrates and/or articles were scratched with a Knoop indentor over a length of 10 mm. The following 3 failure modes are used to determine the Knoop Scratch threshold: 1) sustained lateral surface cracks that are more than two times the width of the groove, 2) damage is contained within the groove, but there are lateral surface cracks that are less than two times the width of groove and there is damage visible by naked eye, or 3) the presence of large subsurface lateral cracks which are greater than two times the width of the groove and/or there is a median crack at the vertex of the scratch. The Knoop Scratch threshold is then the highest load at which none of the three above failures occur in 3 or more of 5 events.

The term "failure height," as used herein, refers to the lowest height from which a device including a glass article can be dropped and the glass article fails (i.e., cracks). The Drop Test Method is used to determine the failure height on a device. The Drop Test Method involves performing face-drop testing on a puck with a glass article attached thereto. The glass article is attached to the puck with Tesa® 61385 double sided adhesive tape to hold the glass article to the puck during the drop test described herein below. The glass article to be tested has a thickness similar or equal to the thickness that will be used in a given hand-held consumer electronic device, such as 0.5 mm or 0.6 mm. A puck refers to a structure meant to mimic the size, shape, and weight distribution of a given device, such as a cell phone. Hereinafter, the term "puck," refers to a structure that has a weight of 126.0 grams, a length of 133.1 mm, a width of 68.2 mm, and a height of 9.4 mm. In embodiments, the puck has the dimensions and weight similar to a handheld electronic device.

An exemplary device-drop machine that may be used to conduct the Drop Test Method is shown as reference number 10 in FIG. 1. The device-drop machine 10 includes a chuck 12 having chuck jaws 14. The puck 16 is staged in the chuck jaws 14 with the glass article attached thereto and facing downward. The chuck 12 is ready to fall from, for example, an electro-magnetic chuck lifter. Referring now to FIG. 2, the chuck 12 is released and during its fall, the chuck jaws 14 are triggered to open by, for example, a proximity sensor. As the chuck jaws 14 open, the puck 16 is released. Referring now to FIG. 3, the falling puck 16 strikes a drop surface 18. The drop surface 18 may be sandpaper, such as 180 grit sandpaper, positioned on a steel plate. If the glass article attached to the puck survives the fall (i.e., does not crack), the chuck 12 is set at an increased height and the test is repeated. The failure height is then the lowest height from which the puck including the glass article is dropped and the glass composition fails. A single glass article is tested at multiple heights, such as at 22 cm, 30 cm, 40 cm, 50 cm, 60 cm, and increments of 10 centimeters until the glass article fails by showing damage. The sandpaper is replaced upon failure of the glass. Unless otherwise indicated 180 grit sandpaper is used herein.

The term "retained strength," as used herein, refers to the strength of a glass article after damage introduction by an impact force when the article is bent to impart tensile tress. Damage is introduced according to the method described in U.S. Patent Publication No. 2019/0072469 A1, which is incorporated herein by reference. For example, an apparatus for impact testing a glass article is shown as reference number 1100 in FIG. 4. The apparatus 1100 includes a pendulum 1102 including a bob 1104 attached to a pivot 1106. The term "bob" on a pendulum, as used herein, is a weight suspended from and connected to a pivot by an arm. Thus, the bob 1104 shown is connected to the pivot 1106 by an arm 1108. The bob 1104 includes a base 1110 for receiving a glass article, and the glass article is affixed to the base. The apparatus 1100 further includes an impacting object 1140 positioned such that when the bob 1104 is released from a position at an angle greater than zero from the equilibrium position, the surface of the bob 1104 contacts the impacting object 1140. The impacting object includes an abrasive sheet having an abrasive surface to be placed in contact with the outer surface of the glass article. The abrasive sheet may comprise sandpaper, which may have a grit size in the range of 30 grit to 1000 grit, or 100 grit to 300 grit, for example 80 grit, 120 grit, 180 grit, and 1000 grit sandpaper). Unless otherwise indicated 180 grit sandpaper was used herein.

For purposes of this disclosure, the impacting object was in the form of a 6 mm diameter disk of 80 grit, 120 grit, or 180 grit sandpaper affixed to the apparatus. A glass article having a thickness of approximately 600.0 μm was affixed to the bob. For each impact, a fresh sandpaper disk was used. Damage on the glass article was done at approximately 500.0 N impact force by pulling the swing of the arm of the apparatus to approximately a 90° angle. Approximately 10 samples of each glass article were impacted.

Twelve hours or more after the damage introduction, the glass articles were fractured in four-point bending (4PB). The damaged glass article was placed on support rods (support span) with the damaged site on the bottom (i.e., on the tension side) and between the load roads (loading span). For purposes of this disclosure, the loading span was 18 mm and the support span was 36 mm. The radius of curvature of load and support rods was 3.2 mm. Loading was done at a constant displacement rate of 5 mm/min using a screw-driven testing machine (Instron, Norwood, Mass., USA) until failure of the glass. The 4PB tests were performed at a temperature of 22° C.±2° C. and at a relative humidity (RH) of 50%±5%.

The applied fracture stress (or the applied stress to failure) $\sigma_{app}$ in four-point bending (4PB) was calculated from the equation, $$\sigma_{app} = \frac{1}{(1-v^2)} \frac{3P(L-a)}{2bh^2} \quad (1)$$

where, P is the maximum load to failure, L (=36 mm) is the distance between support rods (support span), a (=18 mm) is the distance between the loading rods (loading span), b is the width of the glass plate, h is the thickness of the glass plate and v is the Poisson's Ratio of the glass composition. The term $(1/(1-v^2))$ in Eq. (1) considers the stiffening effect of a plate. In four-point bending, stress is constant under the loading span and thus, the damaged site is under mode I uniaxial tensile stress loading. The stressing rate of the 4-point bend testing for the specimens was estimated to be between 15 to 17 MPa per sec. The retained strength of the glass composition is the highest applied fracture stress at which failure does not occur.

Alkali aluminosilicate glasses have good ion exchangeability. Chemical strengthening processes have been used to achieve high strength and high toughness properties in alkali aluminosilicate glasses. Sodium aluminosilicate glasses are highly ion exchangeable glasses with high glass formability and quality. The substitution of $Al_2O_3$ into the silicate glass network increases the interdiffusivity of monovalent cations during ion exchange. By chemical strengthening in a molten salt bath (e.g., $KNO_3$ and/or $NaNO_3$), glasses with high strength, high toughness, and high indentation cracking resistance may be achieved.

Therefore, alkali aluminosilicate glasses with good physical properties, chemical durability, and ion exchangeability have drawn attention for use as cover glass. In particular, lithium containing aluminosilicate glasses, which have lower annealing and softening temperature, lower CTE values, and fast ion exchangeability are provided herein. Through different ion exchange processes, greater CT, DOC, and CS may be achieved. However, the addition of lithium in the alkali aluminosilicate glass may reduce the melting point, softening point, or liquidus viscosity of the glass.

Drawing processes for forming glass articles, such as, for example, glass sheets, are desirable because they allow a thin glass article to be formed with few defects. It was previously thought that glass compositions were required to have relatively high liquidus viscosities—such as a liquidus viscosity greater than 1000 kP, greater than 1100 kP, or greater than 1200 kP—to be formed by a drawing process, such as, for example, fusion drawing or slot drawing. However, developments in drawing processes allow glasses with lower liquidus viscosities to be used in drawing processes. Thus, glasses used in drawing processes may include more lithia than previously thought, and may include more glass network forming components, such as, for example, $SiO_2$, $Al_2O_3$, and $B_2O_3$. Accordingly, a balance of the various glass components that allows the glass to realize the benefits of adding lithium and glass network formers to the glass composition, but that does not negatively impact the glass composition are provided herein.

In particular, the glass compositions provided herein may include more $Li_2O$, $Al_2O_3$, $B_2O_3$, and MgO and less $P_2O_5$ and $K_2O$ than conventional glass compositions. The glass compositions provided herein may also include a relatively small amounts of $TiO_2$. $Li_2O$, $Al_2O_3$, $B_2O_3$, and MgO may have high field strength, which may increase the bonding strength and, thus, the fracture toughness of the glass composition. $P_2O_5$ and $K_2O$ may have the opposite effect. Such a combination of changing elements may result in lowered softening point. Moreover, the combination of changing elements of the glass compositions provided herein may result in improved fracture toughness and ion exchange properties (e.g., higher CS and higher DOC), which may lead to improved drop test performance.

In embodiments of the alkali aluminosilicate glass compositions disclosed herein, $SiO_2$ is the largest constituent and, as such, $SiO_2$ is the primary constituent of the glass network formed from the glass composition. Pure $SiO_2$ has a relatively low CTE and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which in turn, adversely impacts the formability of the glass. In embodiments, the glass composition may comprise 50.0 to 70.0 mol % $SiO_2$. In embodiments, the glass composition may comprise 55.0 to 65.0 mol % $SiO_2$. In embodiments, the glass composition may comprise 57.0 to 63.0 mol % $SiO_2$. In embodiments, the concentration of $SiO_2$ in the glass composition may be in the range from 50.0 to 70.0 mol %, from 50.0 to 67.0 mol %, from 50.0 to 65.0 mol %, from 50.0 to 63.0 mol %, from 50.0 to 60.0 mol %, from 55.0 to 70.0 mol %, from 55.0 to 67.0 mol %, from 55.0 to 65.0 mol %, from 55.0 to 64.0 mol %, from 55.0 to 63.0 mol %, from 55.0 to 62.0 mol %, from 55.0 to 61.0 mol %, from 55.0 to 60.0 mol %, from 55.0 to 59.0 mol %, from 56.0 to 70.0 mol %, from 56.0 to 67.0 mol %, from 56.0 to 65.0 mol %, from 56.0 to 64.0 mol %, from 56.0 to 63.0 mol %, from 56.0 to 62.0 mol %, from 56.0 to 61.0 mol %, from 56.0 to 60.0 mol %, from 56.0 to 59.0 mol %, from 57.0 to 70.0 mol %, from 57.0 to 67.0 mol %, from 57.0 to 65.0 mol %, from 57.0 to 64.0 mol %, from 57.0 to 63.0 mol %, from 57.0 to 62.0 mol %, from 57.0 to 61.0 mol %, from 57.0 to 60.0 mol %, or from 57.0 to 59.0 mol %, or any and all sub-ranges formed from any of these endpoints.

The glass compositions described herein may further comprise $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition. If the amount of $Al_2O_3$ it too high, the formability of the glass composition may be decreased. However, when the concentration of $Al_2O_3$ is balanced against the concentration of $SiO_2$ and the concentration of alkali oxides in the glass composition, $Al_2O_3$ may reduce the liquidus temperature of the glass melt. Reducing the liquidus temperature enhances the liquidus viscosity and improves the compatibility of the glass composition with certain forming processes, such as the fusion forming process. In embodiments, the glass composition may comprise from 10.0 to 25.0 mol % $Al_2O_3$. In embodiments, the glass composition may comprise from 14.0 to 20.0 mol % $Al_2O_3$. In embodiments, the glass composition may comprise from 15.0 to 19.0 mol % $Al_2O_3$. In embodiments, the concentration of $Al_2O_3$ in the glass composition may be in the range from 10.0 to 25.0 mol %, from 10.0 to 23.0 mol %, from 10.0 to 20.0 mol %, from 10.0 to 19.0 mol %, from 10.0 to 18.0 mol %, from 12.0 to 25.0 mol %, from 12.0 to 23.0 mol %, from 12.0 to 20.0 mol %, from 12.0 to 19.0 mol %, from 12.0 to 18.0 mol %, from 13.0 to 25.0 mol %, from 13.0 to 23.0 mol %, from 13.0 to 20.0 mol %, from 13.0 to 19.0 mol %, from 13.0 to 18.0 mol %, from 14.0 to 25.0 mol %, from 14.0 to 23.0 mol %, from 14.0 to 20.0 mol %, from 14.0 to 19.0 mol %, from 14.0 to 18.0 mol %, from 15.0 to 25.0 mol %, from 15.0 to 23.0 mol %, from 15.0 to 20.0 mol %, from 15.0 to 19.0 mol %, from 15.0 to 18.0 mol %, from 16.0 to 25.0 mol %, from 16.0 to 23.0 mol %, from 16.0 to 20.0 mol %, from 16.0 to 19.0 mol %, from 16.0 to 18.0 mol %, from 17.0 to 25.0 mol %, from 17.0 to 23.0 mol %, from 17.0 to 20.0 mol %, from 17.0 to 19.0 mol %, or from 17.0 to 18.0 mol %, or any and all sub-ranges formed from any of these endpoints. In embodiments, the concentration of $Al_2O_3$ in the glass composition may be greater than or equal to 10.0 mol %, greater than or equal to 11.0 mol %, greater than or equal to 12.0 mol %, greater than or equal to 13.0 mol %, greater than or equal to 14.0 mol %, greater than or equal to 15.0 mol %, greater than or equal to 16.0 mol %, or greater than or equal to 17.0 mol %.

The glass compositions described herein may further comprise $P_2O_5$. Like $SiO_2$ and $Al_2O_3$, $P_2O_5$ may be added to the glass composition as a network former, thereby reducing the meltability and formability of the glass composition. Thus, $P_2O_5$ may be added in amounts that do not overly decrease these properties. The addition of $P_2O_5$ may also increase the diffusivity of ions in the glass composition during ion exchange treatment, thereby increasing the efficiency of these treatments. In embodiments, the glass composition may comprise from 0.0 to 5.0 mol % $P_2O_5$. In embodiments, the glass composition may comprise from 0.3 to 3.0 mol % $P_2O_5$. In embodiments, the glass composition may comprise from 0.5 to 2.5 mol % $P_2O_5$. In embodiments, the concentration of $P_2O_5$ in the glass composition may be in the range from 0.0 to 5.0 mol %, from 0.0 to 4.0 mol %, from 0.0 to 3.0 mol %, from 0.0 to 2.5 mol %, from 0.0 to 2.3 mol %, from 0.0 to 2.0 mol %, from 0.0 to 1.7 mol %, from 0.0 to 1.5 mol %, from 0.3 to 5.0 mol %, from 0.3 to 4.0 mol %, from 0.3 to 3.0 mol %, from 0.3 to 2.5 mol %, from 0.3 to 2.3 mol %, from 0.3 to 2.0 mol %, from 0.3 to 1.7 mol %, from 0.3 to 1.5 mol %, from 0.5 to 5.0 mol %, from 0.5 to 4.0 mol %, from 0.5 to 3.0 mol %, from 0.5 to 2.5 mol %, from 0.5 to 2.3 mol %, from 0.5 to 2.0 mol %, from 0.5 to 1.7 mol %, from 0.5 to 1.5 mol %, from 0.7 to 5.0 mol %, from 0.7 to 4.0 mol %, from 0.7 to 3.0 mol %, from 0.7 to 2.5 mol %, from 0.7 to 2.3 mol %, from 0.7 to 2.0 mol %, from 0.7 to 1.7 mol %, from 0.7 to 1.5 mol %, from 1.0 to 5.0 mol %, from 1.0 to 4.0 mol %, from 1.0 to 3.0 mol %, from 1.0 to 2.5 mol %, from 1.0 to 2.3 mol %, from 1.0 to 2.0 mol %, from 1.0 to 1.7 mol %, or from 1.0 to 1.5 mol %, or any and all sub-ranges formed from any of these endpoints. In embodiments, the glass composition may comprise less than or equal to 4.0 mol % $P_2O_5$. In embodiments, the concentration of $P_2O_5$ in the glass composition may be less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, or less than or equal to 1.5 mol %.

The glass compositions described herein may further comprise $B_2O_3$. Like $SiO_2$, $Al_2O_3$, and $P_2O_5$, $B_2O_3$ may be added to the glass composition as a network former, thereby reducing the meltability and formability of the glass composition. Thus, $B_2O_3$ may be added in amounts that do not overly decrease these properties. However, it has been found that additions of boron significantly reduce diffusivity of alkali ions in the glass composition, which, in turn, adversely impacts the ion exchange performance of the resultant glass. In particular, it has been found that additions of boron significantly increase the time required to achieve a given CT and/or DOC relative to glass compositions which are boron free. In embodiments, the glass composition may comprise from 0.0 to 10.0 mol % $B_2O_3$. In embodiments, the glass composition may comprise from 1.0 to 7.0 mol % $B_2O_3$. In embodiments, the glass composition may comprise from 2.0 to 6.0 mol % $B_2O_3$. In embodiments, the concentration of $B_2O_3$ in the glass composition may be in the range from 0.0 to 10.0 mol %, from 0.0 to 9.0 mol %, 0.0 to 8.0 mol %, 0.0 to 7.5 mol %, 0.0 to 7.0 mol %, 0.0 to 6.5 mol %, from 0.0 to 6.0 mol %, from 0.0 to 5.5 mol %, from 0.0 to 5.0 mol %, from 0.0 to 4.5 mol %, from 0.5 to 10.0 mol %, from 0.5 to 9.0 mol %, 0.5 to 8.0 mol %, 0.5 to 7.5 mol %, 0.5 to 7.0 mol %, 0.5 to 6.5 mol %, from 0.5 to 6.0 mol %, from 0.5 to 5.5 mol %, from 0.5 to 5.0 mol %, from 0.5 to 4.5 mol %, from 1.0 to 10.0 mol %, from 1.0 to 9.0 mol %, 1.0 to 8.0 mol %, 1.0 to 7.5 mol %, 1.0 to 7.0 mol %, 1.0 to 6.5 mol %, from 1.0 to 6.0 mol %, from 1.0 to 5.5 mol %, from 1.0 to 5.0 mol %, from 1.0 to 4.5 mol %, from 1.5 to 10.0 mol %, from 1.5 to 9.0 mol %, from 1.5 to 8.0 mol %, from 1.5 to 7.5 mol %, from 1.5 to 7.0 mol %, from 1.5 to 6.5 mol %, from 1.5 to 6.0 mol %, from 1.5 to 5.5 mol %, from 1.5 to 5.0 mol %, from 1.5 to 4.5 mol %, from 2.0 to 10 mol %, from 2.0 to 9.0 mol %, from 2.0 to 8.0 mol %, from 2.0 to 7.5 mol %, from 2.0 to 7.0 mol %, from 2.0 to 6.5 mol %, from 2.0 to 6.0 mol %, from 2.0 to 5.5 mol %, from 2.0 to 5.0 mol %, from 2.0 to 4.5 mol %, from 2.5 to 10.0 mol %, from 2.5 to 9.0 mol %, from 2.5 to 8.0 mol %, from 2.5 to 7.5 mol %, from 2.5 to 7.0 mol %, from 2.5 to 6.5 mol %, from 0.0 to 6.0 mol %, from 0.0 to 5.5 mol %, from 2.5 to 5.0 mol %, from 2.5 to 4.5 mol %, from 3.0 to 10.0 mol %, from 3.0 to 9.0 mol %, from 3.0 to 8.0 mol %, from 3.0 to 7.5 mol %, from 3.0 to 7.0 mol %, from 3.0 to 6.5 mol %, from 3.0 to 6.0 mol %, from 3.0 to 5.5 mol %, from 3.0 to 5.0 mol %, from 3.0 to 4.5 mol %, from 3.5 to 10.0 mol %, from 3.5 to 9.0 mol %, from 3.5 to 8.0 mol %, from 3.5 to 7.5 mol %, from 3.5 to 7.0 mol %, from 3.5 to 6.5 mol %, from 3.5 to 6.0 mol %, from 3.5 to 5.5 mol %, from 3.5 to 5.0 mol %, from 3.5 to 4.5 mol %, from 4.0 to 10.0 mol %, from 4.0 to 9.0 mol %, from 4.0 to 8.0 mol %, from 4.0 to 7.5 mol %, from 4.0 to 7.0 mol %, from 4.0 to 6.5 mol %, from 4.0 to 6.0 mol %, from 4.0 to 5.5 mol %, or from 4.0 to 5.0 mol %, or any and all sub-ranges formed from any of these endpoints. In embodiments, the concentration of $B_2O_3$ in the glass composition may be greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, or greater than or equal to 4.0 mol %.

In embodiments, the glass compositions described herein may include a relatively high $SiO_2$ concentration to increase durability, and may also include $B_2O_3$ and $Al_2O_3$ to increase scratch resistance and $P_2O_5$ to improve ion-exchange properties. In embodiments, the glass composition may satisfy the relationship $(B_2O_3+P_2O_5+Al_2O_3)/(SiO_2) \geq 0.20$, $(B_2O_3+P_2O_5+Al_2O_3)/(SiO_2) \geq 0.30$, or $(B_2O_3+P_2O_5+Al_2O_3)/(SiO_2) \geq 0.40$. Accordingly, balance the amounts of $B_2O_3$, $P_2O_5$, and $Al_2O_3$ to be within the above ranges provides a balance of diffusivity and fracture toughness.

The glass compositions described herein may further comprise $Li_2O$. The effects of $Li_2O$ in the glass composition are discussed above. In part, the addition of lithium in the glass allows for better control of an ion exchange process and further reduces the softening point of the glass. In embodiments, the glass composition may comprise 5.0 to 15.0 mol % $Li_2O$. In embodiments, the glass composition may comprise 5.0 to 10.0 mol % $Li_2O$. In embodiments, the glass composition may comprise 6.0 to 9.0 mol % $Li_2O$. In embodiments, the concentration of $Li_2O$ in the glass composition may be in the range from 5.0 to 15.0 mol %, from 5.0 to 10.0 mol %, from 5.0 to 9.0 mol %, from 5.0 to 8.5 mol %, from 5.0 to 8.0 mol %, from 6.0 to 15.0 mol %, from 6.0 to 10.0 mol %, from 6.0 to 9.0 mol %, from 6.0 to 8.5 mol %, from 6.0 to 8.0 mol %, from 6.0 to 7.5 mol %, from 6.0 to 7.0 mol %, from 6.5 to 15.0 mol %, from 6.5 to 10.0 mol %, from 6.5 to 9.0 mol %, from 6.5 to 8.5 mol %, from 6.5 to 8.0 mol %, from 7.0 to 15.0 mol %, from 7.0 to 10.0 mol %, from 7.0 to 9.0 mol %, from 7.0 to 8.5 mol %, from 7.0 to 8.0 mol %, 7.5 to 15.0 mol %, from 7.5 to 10.0 mol %, from 7.5 to 9.0 mol %, or from 7.5 to 8.5 mol %, or any and all sub-ranges formed from any of these endpoints. In embodiments, the concentration of $Li_2O$ in the glass composition may be less than or equal to 15.0 mol %, less than or equal to 10.0 mol %, less than or equal to 9.5 mol %, less than or equal to 9.0 mol %, less than or equal to 8.5 mol %, or less than or equal to 8.0 mol %.

The glass compositions described herein may further comprise alkali metal oxides other than $Li_2O$, such as $Na_2O$. $Na_2O$ aids in the ion exchangeability of the glass composition, and also increases the melting point and improves formability of the glass composition. However, if too much $Na_2O$ is added to the glass composition, the CTE may be too low and the melting point may be too high. As such, in embodiments, the concentration of $Li_2O$ present in the glass composition is greater than the concentration of $Na_2O$ present in the glass composition. In embodiments, the glass composition may comprise 1.0 to 15.0 mol % $Na_2O$. In embodiments, the glass composition may comprise 4.0 to 10.0 mol % $Na_2O$. In embodiments, the glass composition may comprise 5.0 to 9.0 mol % $Na_2O$. In embodiments, the concentration of $Na_2O$ in the glass composition may be in the range from 1.0 to 15.0 mol %, from 1.0 to 10.0 mol %, from 3.0 to 15.0 mol %, from 3.0 to 10.0 mol %, from 4.0 to 15.0 mol %, from 4.0 to 10.0 mol %, from 4.0 to 9.5 mol %, from 4.0 to 9.0 mol %, from 4.5 to 15.0 mol %, from 4.5 to 10.0 mol %, from 4.5 to 9.5 mol %, from 4.5 to 9.0 mol %, from 5.0 to 15 mol %, from 5.0 to 10.0 mol %, from 5.0 to 9.5 mol %, from 5.0 to 9.0 mol %, from 5.5 to 15.0 mol %, from 5.5 to 10.0 mol %, from 5.5 to 9.5 mol %, from 5.5 to 9.0 mol %, from 6.0 to 15.0 mol %, from 6.0 to 10.0 mol %, from 6.0 to 9.5 mol %, from 6.0 to 9.0 mol %, from 6.5 to 15.0 mol %, from 6.5 to 10.0 mol %, from 6.5 to 9.5 mol %, from 6.5 to 9.0 mol %, from 7.0 to 15.0 mol %, from 7.0 to 10.0 mol %, from 7.0 to 9.5 mol %, from 7.0 to 9.0 mol %, from 7.5 to 15.0 mol %, from 7.5 to 10.0 mol %, from 7.5 to 9.5 mol %, from 8.0 to 15.0 mol %, or from 8.0 to 10.0 mol % or any and all sub-ranges formed from any of these endpoints. In embodiments, the concentration of $Na_2O$ in the glass composition may be less than or equal to 15.0 mol %, less than or equal to 10.0 mol %, less than or equal to 9.5 mol %, or less than or equal to 9.0 mol.

The glass compositions described herein may further comprise alkali metal oxides other than $Li_2O$ and $Na_2O$, such as $K_2O$. $K_2O$ promotes ion exchange and increases the DOC. However, adding $K_2O$ may cause the CTE to be too low and the melting point to be too high. In embodiments, the glass composition may comprise 0.0 to 1.0 mol % $K_2O$. In embodiments, the glass composition may comprise 0.0 to 0.5 mol % $K_2O$. In embodiments, the glass composition may comprise 0.0 to 0.4 mol % $K_2O$. In embodiments, the concentration of $K_2O$ in the glass composition may be in the range from 0.0 to 1.0 mol %, from 0.0 to 0.5 mol %, from 0.0 to 0.4 mol %, from 0.0 to 0.3 mol %, from 0.0 to 0.2 mol %, or from 0.0 to 0.1 mol %, or any and all sub-ranges formed from any of these endpoints. In embodiments, the glass composition may comprise less than or equal to 1.0 mol % $K_2O$, less than or equal to 0.5 mol % $K_2O$, less than or equal to 0.4 mol % $K_2O$, less than or equal to 0.3 mol % $K_2O$, less than or equal to 0.2 mol % $K_2O$, or less than or equal to 0.1 mol % $K_2O$.

The sum of all alkali oxides is expressed herein as $R_2O$. The alkali oxides aid in decreasing the softening point and molding temperature of the glass composition, thereby offsetting the increase in the softening point and molding temperature of the glass composition due to higher amounts of $SiO_2$ in the glass composition. The decrease in the softening point and molding temperature may be further enhanced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100 \times 10^{-7}/°C$., which may be undesirable.

In embodiments, the amount of $R_2O$ in the glass composition may be in the range from greater than or equal to 11.0 mol % to less than or equal to 23.0 mol %, from greater than or equal to 11.0 mol % to less than or equal to 22.0 mol %, from greater than or equal to 11.0 mol % to less than or equal to 21.0 mol %, from greater than or equal to 11.0 mol % to less than or equal to 20.0 mol %, from greater than or equal to 11.0 mol % to less than or equal to 19.0 mol %, from greater than or equal to 11.0 mol % to less than or equal to 18.0 mol %, from greater than or equal to 11.0 mol % to less than or equal to 17.0 mol %, from greater than or equal to 13.0 mol % to less than or equal to 23.0 mol %, from greater than or equal to 13.0 mol % to less than or equal to 22.0 mol %, from greater than or equal to 13.0 mol % to less than or equal to 21.0 mol %, from greater than or equal to 13.0 mol % to less than or equal to 20.0 mol %, from greater than or equal to 13.0 mol % to less than or equal to 19.0 mol %, from greater than or equal to 13.0 mol % to less than or equal to 18.0 mol %, from greater than or equal to 13.0 mol % to less than or equal to 17.0 mol %, from greater than or equal to 15.0 mol % to less than or equal to 23.0 mol %, from greater than or equal to 15.0 mol % to less than or equal to 22.0 mol %, from greater than or equal to 15.0 mol % to less than or equal to 21.0 mol %, from greater than or equal to 15.0 mol % to less than or equal to 20.0 mol %, from greater than or equal to 15.0 mol % to less than or equal to 19.0 mol %, from greater than or equal to 15.0 mol % to less than or equal to 18.0 mol %, or from greater than or equal to 15.0 mol % to less than or equal to 17.0 mol %. It should be understood that the amount of $R_2O$ in the glass compositions may be within a range formed from any one of the lower bounds of $R_2O$ and any one of the upper bounds of $R_2O$ described herein.

In addition to being a glass network forming component, $Al_2O_3$ aids in increasing the ion exchangeability of the glass composition. Therefore, in embodiments, the amount of $Al_2O_3$ and components that may be ion exchanged may be relatively high. For example, $Li_2O$, $Na_2O$, and $K_2O$ are ion exchangeable components. In embodiments, the amount of $Al_2O_3+R_2O$ in the glass composition may be in the range from greater than or equal to 26.0 mol % to less than or equal to 40.0 mol %, from greater than or equal to 28.0 mol % to less than or equal to 40.0 mol %, from greater than or equal to 30.0 mol % to less than or equal to 40.0 mol %, from greater than or equal to 32.0 mol % to less than or equal to 40.0 mol %, from greater than or equal to 34.0 mol % to less than or equal to 40.0 mol %, from greater than or equal to 26.0 mol % to less than or equal to 38.0 mol %, from greater than or equal to 28.0 mol % to less than or equal to 38.0 mol %, from greater than or equal to 30.0 mol % to less than or equal to 38.0 mol %, from greater than or equal to 32.0 mol % to less than or equal to 38.0 mol %, from greater than or equal to 34.0 mol % to less than or equal to 38.0 mol %, from greater than or equal to 26.0 mol % to less than or equal to 36.0 mol %, from greater than or equal to 28.0 mol % to less than or equal to 36.0 mol %, from greater than or equal to 30.0 mol % to less than or equal to 36.0 mol %, from greater than or equal to 32.0 mol % to less than or equal to 36.0 mol %, or from greater than or equal to 34.0 mol % to less than or equal to 36.0 mol %. It should be understood that the amount of $Al_2O_3+R_2O$ in the glass compositions may be within a range formed from any one of the lower bounds of $Al_2O_3+R_2O$ and any one of the upper bounds of $Al_2O_3+R_2O$ described herein. Having a sum of $Al_2O_3+R_2O$ within the ranges described above provides a high compressive stress in strengthened glass articles and good diffusivity.

In embodiments, the amount of $Al_2O_3+R_2O+B_2O_3$ in the glass composition is greater than or equal to 30.0 mol %, greater than or equal to 32.0 mol %, greater than or equal to 34.0 mol %, greater than or equal to 36.0 mol %, or greater than or equal to 38.0 mol %. In embodiments, the amount of $Al_2O_3+R_2O+B_2O_3$ in the glass composition may be in the range from greater than or equal to 30.0 mol % to less than or equal to 40.0 mol %, from greater than or equal to 30.0 mol % to less than or equal to 38.0 mol %, from greater than or equal to 30.0 mol % to less than or equal to 36.0 mol %, from greater than or equal to 30.0 mol % to less than or equal to 34.0 mol %, from greater than or equal to 30.0 mol % to less than or equal to 32.0 mol %, from greater than or equal to 32.0 mol % to less than or equal to 40.0 mol %, from greater than or equal to 32.0 mol % to less than or equal to 38.0 mol %, from greater than or equal to 32.0 mol % to less than or equal to 36.0 mol %, from greater than or equal to 32.0 mol % to less than or equal to 34.0 mol %, from greater than or equal to 34.0 mol % to less than or equal to 40.0 mol %, from greater than or equal to 34.0 mol % to less than or equal to 38.0 mol %, from greater than or equal to 34.0 mol % to less than or equal to 36.0 mol %, from greater than or equal to 36.0 mol % to less than or equal to 40.0 mol %, from greater than or equal to 36.0 mol % to less than or equal to 38.0 mol %, or from greater than or equal to 38.0 mol % to less than or equal to 40.0 mol %. It should be understood that the amount of $Al_2O_3+R_2O+B_2O_3$ in the glass compositions may be within a range formed from any one of the lower bounds of $Al_2O_3+R_2O+B_2O_3$ and any one of the upper bounds of $Al_2O_3+R_2O+B_2O_3$ described herein. As mentioned above, having a sum of $Al_2O_3+R_2O$ within the ranges described herein provides a high compressive stress in strengthened glass articles and good diffusivity, and $B_2O_3$ lowers the softening point of the glass composition. Accordingly, having a sum of $Al_2O_3+R_2O+B_2O_3$ within the ranges described above allows for glass compositions to have good compressive stress upon ion exchange in conjunction with good formability provided by a lower softening point.

The glass compositions described herein may further comprise MgO. MgO lowers the viscosity of a glass, which enhances the formability, the strain point, and the Young's modulus, and may improve the ion exchangeability. However, when too much MgO is added to the glass composition, the density and the CTE of the glass composition increase. In embodiments, the concentration of MgO in the glass composition may be in the range from 0.0 to 5.0 mol %, from 0.0 to 4.5 mol %, from 0.0 to 4.0 mol %, from 0.0 to 3.5 mol %, from 0.0 to 3.0 mol %, from 0.0 to 2.5 mol %, from 0.0 to 2.0 mol %, from 0.0 to 1.5 mol %, from 0.5 to 5.0 mol %, from 0.5 to 4.5 mol %, from 0.5 to 4.0 mol %, from 0.5 to 3.5 mol %, from 0.5 to 3.0 mol %, from 0.5 to 2.5 mol %, from 0.5 to 2.0 mol %, from 0.5 to 1.5 mol %, from 1.0 to 5.0 mol %, from 1.0 to 4.5 mol %, from 1.0 to 4.0 mol %, from 1.0 to 3.5 mol %, from 1.0 to 3.0 mol %, from 1.0 to 2.5 mol %, from 1.0 to 2.0 mol %, or from 1.0 to 1.5 mol %, or any and all sub-ranges formed from any of these endpoints. In embodiments, the concentration of MgO is less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, or less than or equal to 1.5 mol %. In embodiments, the concentration of MgO in the glass composition may be from greater than 0.0 mol % to less than or equal to 3.0 mol %, from greater than 0.0 mol % to less than or equal to 2.5 mol %, from greater than 0.0 mol % to less than or equal to 2.0 mol %, or from greater than 0.0 mol % to less than or equal to 1.5 mol %.

The glass compositions described herein may further comprise CaO. CaO lowers the viscosity of a glass, which enhances the formability, the strain point and the Young's modulus, and may improve the ion exchangeability. However, when too much CaO is added to the glass composition, the density and the CTE of the glass composition increase. In embodiments, the concentration of CaO in the glass composition may be from 0.0 to 5.0 mol %, from 0.0 to 4.0 mol %, from 0.0 to 3.5 mol %, from 0.0 to 3.0 mol %, from 0.0 to 2.5 mol %, from 0.0 to 2.0 mol %, from 0.0 to 1.5 mol %, from 0.0 to 1.0 mol %, from 0.0 to 0.5 mol %, from 0.0 to 0.1 mol %, from 0.5 to 5.0 mol %, from 0.5 to 4.0 mol %, from 0.5 to 3.5 mol %, from 0.5 to 3.0 mol %, from 0.5 to 2.5 mol %, from 0.5 to 2.0 mol %, from 0.5 to 1.5 mol %, from 0.5 to 1.0 mol %, from 1.0 to 5.0 mol %, from 1.0 to 4.0 mol %, from 1.0 to 3.5 mol %, from 1.0 to 3.0 mol %, from 1.0 to 2.5 mol %, from 1.0 to 2.0 mol %, from 1.5 to 5.0 mol %, from 1.5 to 4.0 mol %, from 1.5 to 3.5 mol %, from 1.5 to 3.0 mol %, from 1.5 to 2.5 mol %, from 1.5 to 2.0 mol %, from 2.0 to 5.0 mol %, from 2.0 to 4.0 mol %, from 2.0 to 3.5 mol %, from 2.0 to 3.0 mol %, from 2.0 to 2.5 mol %, from 2.5 to 5.0 mol %, from 2.5 to 4.0 mol %, from 2.5 to 3.5 mol %, or from 2.5 to 3.0 mol %, or any and all sub-ranges formed from any of these endpoints. In embodiments, the concentration of CaO in the glass composition may be less than or equal to 0.1 mol %. In embodiments, the concentration of CaO in the glass composition may be from greater than 0.0 mol % to less than 0.1 mol %. In embodiments, the glass composition may be substantially free or free of CaO.

The glass compositions described herein may further include one or more fining agents. In embodiments, the fining agents may include, for example, $SnO_2$. In embodiments, the concentration of $SnO_2$ in the glass composition may be from 0.0 to 1.0 mol %, from 0.0 to 0.5 mol %, from 0.0 to 0.4 mol %, from 0.0 to 0.3 mol %, from 0.0 to 0.2 mol %, or from 0.0 to 0.1 mol %, or any and all sub-ranges formed from any of these endpoints. In embodiments, the concentration of $SnO_2$ in the glass composition may be less than or equal to 0.1 mol %. In embodiments, the concentration of $SnO_2$ in the glass composition may be in the range from greater than 0.0 mol % to less than or equal to 0.1 mol %, from greater than 0.0 mol % to less than or equal to 0.5 mol %, or from greater than 0.0 mol % to less than or equal to 1.0 mol %. In embodiments, the glass composition may be substantially free or free of $SnO_2$.

The glass compositions described herein may further include $TiO_2$. $TiO_2$ improves the UV absorbance of the glass composition. In embodiments, the concentration of $TiO_2$ in the glass composition may be from 0.0 to 2.0 mol %, from 0.0 to 1.5 mol %, from 0.0 to 1.0 mol %, from 0.0 to 0.5 mol %, from 0.0 to 0.4 mol %, from 0.0 to 0.3 mol %, from 0.0 to 0.2 mol %, from 0.0 to 0.1 mol %, or any and all sub-ranges formed from any of these endpoints. In embodiments, the concentration of $TiO_2$ in the glass composition may be from greater than 0.0 mol % to less than or equal to 1.5 mol % or from greater than 0.0 mol % to less than or equal to 2.0 mol %. In embodiments, the glass composition may be substantially free or free of $TiO_2$.

The glass compositions described herein may further include $Fe_2O_3$. In embodiments, the concentration of $Fe_2O_3$ in the glass composition may be from 0.0 to 1.0 mol %, from 0.0 to 0.5 mol %, from 0.0 to 0.4 mol %, from 0.0 to 0.3 mol %, from 0.0 to 0.2 mol %, or from 0.0 to 0.1 mol %, or any and all sub-ranges formed from any of these endpoints. In embodiments, the concentration of $Fe_2O_3$ in the glass composition may be less than or equal to 0.1 mol %. In embodiments, the concentration of $Fe_2O_3$ in the glass composition may be greater than 0.0 mol % to less than or equal to 0.1 mol %. In embodiments, the glass composition may be substantially free or free of $Fe_2O_3$.

In embodiments, the glass compositions described herein may further comprise divalent cation oxides (referred herein as RO). As used herein, RO includes, but is not limited to MgO, CaO, SrO, BaO, FeO, and ZnO. In embodiments, the concentration of RO in the glass composition may be from 0.0 to 5.0 mol %, from 0.0 to 4.0 mol %, from 0.0 to 3.0 mol %, from 0.0 to 2.0 mol %, from 0.0 to 1.0 mol %, from 1.0 to 5.0 mol %, from 1.0 to 4.0 mol %, from 1.0 to 3.0 mol %, from 1.0 to 2.0 mol %, from 2.0 to 5.0 mol %, from 2.0 to 4.0 mol %, from 2.0 to 3.0 mol %, from 3.0 to 5.0 mol %, from 3.0 to 4.0 mol %, or from 4.0 to 5.0 mol %, or any and all sub-ranges formed from any of these endpoints.

In embodiments, the glass composition is peraluminous (i.e., the amount of $Al_2O_3$ in the glass composition is greater than the sum of $Li_2O$, $Na_2O$, $K_2O$ and MgO), which may increase the Knoop Scratch threshold of the glass composition. In embodiments, the glass composition may satisfy the relationship $0.9 \leq Al_2O_3/(R_2O+RO) \leq 1.1$ to achieve charge balance, which maximizes the strengthening process by increasing diffusivity. However, when the glass composition becomes peraluminus, the benefits of this charge balance are no longer achieved. Further, as the $Al_2O_3/(R_2O+RO)$ ratio increases above 1.0, the melting point becomes high, making processing and forming difficult.

In embodiments, controlling the amount of $Li_2O$ in the glass composition allows the glass to be peraluminous. In embodiments, the glass composition may satisfy the relationship $-0.1 \leq (Al_2O_3-(R_2O+RO))/Li_2O \leq 0.3$. In embodiments, the glass composition may satisfy the relationship $-0.1 \leq (Al_2O_3-(R_2O+RO))/Li_2O \leq 0.2$, $-0.1 \leq (Al_2O_3-(R_2O+RO))/Li_2O \leq 0.1$, $-0.1 \leq (Al_2O_3-(R_2O+RO))/Li_2O \leq 0.05$, $0.0 \leq (Al_2O_3-(R_2O+RO))/Li_2O \leq 0.3$, $0.0 \leq (Al_2O_3-(R_2O+RO))/Li_2O \leq 0.2$, $0.0 \leq (Al_2O_3-(R_2O+RO))/Li_2O \leq 0.1$, or $0.0 \leq (Al_2O_3-(R_2O+RO))/Li_2O \leq 0.05$. It should be understood that the relationship may be within a sub-range formed from any and all of the foregoing endpoints.

In embodiments, the glass composition may satisfy the relationship $Al_2O_3*(10.832)+B_2O_3*(10.334)+P_2O_5*(-13.761)+Li_2O*(-3.135)+Na_2O*(-7.213)+K_2O*(-13.761)+MgO*(2.159)+CaO*(-4.518)+SrO*(-4.518)>100$. According to embodiments, glass compositions meeting this inequality have a desired fracture toughness. In embodiments, the glass composition may satisfy the relationship $Al_2O_3*(5.99)+B_2O_3*(-3.85)+P_2O_5*(-8.44)+Li_2O*(8.65)+Na_2O*(-4.65)+K_2O*(-10.18)+MgO*(1.86)+CaO*(1.86)+SrO*(1.86)>100$. According to embodiments, glass compositions meeting this inequality have desired compressive stress. In embodiments, the glass composition may satisfy the relationship $Al_2O_3*(4.52)+B_2O*(-8.28)+P_2O_5*(-1.73)+Li_2O*(-10.40)+Na_2O*(-7.65)+K_2O*(-10.52)+MgO*(-4.33)+CaO*(-6.61)+SrO*(-2.60)<-100$. According to embodiments, glass compositions meeting this inequality have a deserved softening point. It should be understood that glass compositions may satisfy one or more of the above inequalities according to embodiments and the desired properties (such as fracture toughness, compressive stress, and softening point) of the glass composition.

In embodiments, the glass compositions described herein may further include tramp materials such as MnO, $MoO_3$, $W_3$, $Y_2O_3$, $La_2O_3$, CdO, $As_2O_3$, $Sb_2O_3$, sulfur-based compounds, such as sulfates, halogens, or combinations thereof. In embodiments, antimicrobial components, or other additional components may be included in the glass compositions.

In embodiments, the glass composition comprises 57.0 mol % to 64.0 mol % $SiO_2$; 17.0 mol % to 19.0 mol % $Al_2O_3$; 1.0 mol % to 3.0 mol % $P_2O_5$; 0.0 mol % to 5.0 mol % $B_2O_3$; 7.5 mol % to 9.0 mol % $Li_2O$; 7.0 mol % to 9.0 mol % $Na_2O$; and 0.0 mol % to 0.3 mol % $K_2O$. The sum of all alkali oxides, $R_2O$, present in the glass composition may be in the range from greater than or equal to 15.0 mol % to less than or equal to 18.0 mol %. The sum of $Al_2O_3$ and $R_2O$ present in the glass composition may be in the range from greater than or equal to 34.0 mol % to less than or equal to 36.0 mol %. The glass composition may satisfy the relationship $-0.1 \leq (Al_2O_3-(R_2O+RO))/Li_2O \leq 0.3$.

In embodiments, the glass composition comprises 57.0 mol % to 67.0 mol % $SiO_2$; 15.0 mol % to 18.0 mol % $Al_2O_3$; 0.5 mol % to 1.5 mol % $P_2O_5$; 2.0 mol % to 7.0 mol % $B_2O_3$; 6.0 mol % to 8.0 mol % $Li_2O$; 4.0 mol % to 9.0 mol % $Na_2O$; and 0.0 mol % to 0.3 mol % $K_2O$. The sum of all alkali oxides, $R_2O$, present in the glass composition may be in the range from greater than or equal to 11.0 mol % to less than or equal to 13.0 mol %. The sum of $Al_2O_3$ and $R_2O$ present in the glass composition may be in the range from greater than or equal to 26.0 mol % to less than or equal to 36.0 mol %. The glass composition may satisfy the relationship $-0.1 \leq (Al_2O_3-(R_2O+RO))/Li_2O \leq 0.3$.

In embodiments, the glass composition comprises 55.0 mol % to 62.0 mol % $SiO_2$; 10.0 mol % to 19.0 mol % $Al_2O_3$; 0.0 mol % to 10.0 mol % $P_2O_5$; 2.0 mol % to 8.0 mol % $B_2O_3$; 6.0 mol % to 8.0 mol % $Li_2O$; 7.0 mol % to 10.0 mol % $Na_2O$; and 0.0 mol % to 0.5 mol % $K_2O$. The sum of all alkali oxides, $R_2O$, present in the glass composition may be in the range from greater than or equal to 15.0 mol % to less than or equal to 19.0 mol %. The sum of $Al_2O_3$ and $R_2O$ present in the glass composition may be in the range from greater than or equal to 28.0 mol % to less than or equal to 36.0 mol %. The glass composition may satisfy the relationship $-0.1 \leq (Al_2O_3-(R_2O+RO))/Li_2O \leq 0.3$.

In embodiments, the glass composition comprises 55.0 mol % to 65.0 mol % $SiO_2$; 14.0 mol % to 20.0 mol % $Al_2O_3$; 0.0 mol % to 3.0 mol % $P_2O_5$; 1.0 mol % to 7.0 mol % $B_2O_3$; 5.0 mol % to 10.0 mol % $Li_2O$; 5.0 mol % to 10.0 mol % $Na_2O$; and 0.0 mol % to 1.0 mol % $K_2O$. The sum of all alkali oxides, $R_2O$, present in the glass composition may be in the range from greater than or equal to 13.0 mol % to less than or equal to 20.0 mol %. The sum of $Al_2O_3$ and $R_2O$ present in the glass composition may be in the range from greater than or equal to 28.0 mol % to less than or equal to 40.0 mol %. The glass composition may satisfy the relationship $-0.1 \leq (Al_2O_3-(R_2O+RO))/Li_2O \leq 0.3$.

In embodiments, the glass composition comprises 55.0 mol % to 63.0 mol % $SiO_2$; 15.0 mol % to 19.0 mol % $Al_2O_3$; 0.5 mol % to 2.5 mol % $P_2O_5$; 2.0 mol % to 6.0 mol % $B_2O_3$; 6.0 mol % to 10.0 mol % $Li_2O$; 6.0 mol % to 10.0 mol % $Na_2O$; and 0.0 mol % to 0.5 mol % $K_2O$. The sum of all alkali oxides, $R_2O$, present in the glass composition may be in the range from greater than or equal to 15.0 mol % to less than or equal to 20.0 mol %. The sum of $Al_2O_3$ and $R_2O$ present in the glass composition may be in the range from greater than or equal to 30.0 mol % to less than or equal to 38.0 mol %. The glass composition may satisfy the relationship $-0.1 \leq (Al_2O_3-(R_2O+RO))/Li_2O \leq 0.3$.

In embodiments, the glass composition comprises 56.0 mol % to 60.0 mol % $SiO_2$; 16.0 mol % to 18.0 mol % $Al_2O_3$; 1.0 mol % to 2.0 mol % $P_2O_5$; 3.0 mol % to 5.0 mol % $B_2O_3$; 6.0 mol % to 9.0 mol % $Li_2O$; 7.0 mol % to 9.0 mol % $Na_2O$; and 0.0 mol % to 0.1 mol % $K_2O$. The sum of all alkali oxides, $R_2O$, present in the glass composition may be in the range from greater than or equal to 15.0 mol % to less than or equal to 17.0 mol %. The sum of $Al_2O_3$ and $R_2O$ present in the glass composition may be in the range from greater than or equal to 32.0 mol % to less than or equal to 36.0 mol %. The glass composition may satisfy the relationship $-0.1 \leq (Al_2O_3-(R_2O+RO))/Li_2O \leq 0.3$.

Physical properties of the alkali aluminosilicate glass compositions as disclosed above will now be discussed. These physical properties can be achieved by modifying the component amounts of the alkali aluminosilicate glass compositions, as will be discussed in more detail with reference to the examples.

The articles formed from the glass compositions described herein may be any suitable thickness (t), which may vary depending on the particular application for use of the glass. The thickness is defined by opposing first and second surfaces of a glass substrate. Glass article embodiments may have a thickness of from 0.3 to 3 mm. In embodiments, the glass article may have a thickness of 5.0 mm or less, 4.5 mm or less, 4.0 mm or less, 3.5 mm or less, 3.0 mm or less, 2.5 mm or less, 2.0 mm or less, 1.0 mm or less, 0.9 mm or less, 0.8 mm or less, 0.7 mm or less, 0.6 mm or less, 0.5 mm or less, 0.4 mm or less, 0.3 mm or less, 0.2 mm or less, 0.1 mm or less, 750.0 μm or less, 500.0 μm or less, or 250.0 μm or less. In embodiments, the glass article may have a thickness of from 200.0 μm to 5.0 mm, from 500.0 μm to 5.0 mm, from 200.0 μm to 4.0 mm, from 500.0 μm to 4.0 mm, from 200.0 μm to 3.0 mm, or from 500.0 μm to 3.0 mm. In embodiments, the glass article may have a thickness in the range from 0.1 mm to 5.0 mm, from 0.2 to 5.0 mm, from 0.3 to 5.0 mm, from 0.4 to 5.0 mm, from 0.5 to 5.0 mm, from 0.1 mm to 3.0 mm, from 0.2 to 3.0 mm, from 0.3 to 3.0 mm, from 0.4 to 3.0 mm, or from 0.5 to 3.0 mm. According to embodiments, the glass article has a thickness greater than or equal to 100 μm and less then or equal to 1000 μm, such as greater than or equal to 400 μm and less than or equal to 800 μm, or greater than or equal to 400 μm and less than or equal to 800 μm. It should be understood that the thickness of the article may be within a sub-range formed from any and all of the foregoing endpoints.

In embodiments, the glass compositions described herein may have a density in the range from greater than or equal to 2.20 to less than or equal to 2.60, from greater than or equal to 2.30 to less than or equal to 2.50, from greater than or equal to 2.30 to less than or equal to 2.45, from greater than or equal to 2.30 to less than or equal to 2.40, from greater than or equal to 2.30 to less than or equal to 2.35, from greater than or equal to 2.35 to less than or equal to 2.50, from greater than or equal to 2.35 to less than or equal to 2.45, from greater than or equal to 2.35 to less than or equal to 2.40, from greater than or equal to 2.40 to less than or equal to 2.50, from greater than or equal to 2.40 to less than or equal to 2.45, from greater than or equal to 2.45 to less than or equal to 2.50, or any and all sub-ranges formed from any of these endpoints.

In embodiments, the liquidus viscosity of the glass composition is in the range from greater than or equal to 5.0 kP to less than or equal to 175.0 kP, from greater than or equal to 5.0 kP to less than or equal to 150.0 kP, from greater than or equal to 5.0 kP to less than or equal to 125.0 kP, from greater than or equal to 5.0 kP to less than or equal to 100.0 kP, from greater than or equal to 5.0 kP to less than or equal to 75.0 kP, from greater than or equal to 5.0 kP to less than or equal to 50.0 kP, from greater than or equal to 5.0 kP to less than or equal to 25.0 kP, from greater than or equal to 25.0 kP to less than or equal to 175.0 kP, from greater than or equal to 25.0 kP to less than or equal to 150.0 kP, from greater than or equal to 25.0 kP to less than or equal to 150.0 kP, from greater than or equal to 25.0 kP to less than or equal to 125.0 kP, from greater than or equal to 25.0 kP to less than or equal to 100.0 kP, from greater than or equal to 25.0 kP to less than or equal to 75.0 kP, from greater than or equal to 25.0 kP to less than or equal to 50.0 kP, from greater than or equal to 50.0 kP to less than or equal to 175.0 kP, from greater than or equal to 50.0 kP to less than or equal to 150.0 kP, from greater than or equal to 50.0 kP to less than or equal to 125.0 kP, from greater than or equal to 50.0 kP to less than or equal to 100.0 kP, from greater than or equal to 50.0 kP to less than or equal to 75.0 kP, from greater than or equal to 75.0 kP to less than or equal to 175.0 kP, from greater than or equal to 75.0 kP to less than or equal to 150.0 kP, from greater than or equal to 75.0 kP to less than or equal to 125.0 kP, from greater than or equal to 75.0 kP to less than or equal to 100.0 kP, from greater than or equal to 80.0 kP to less than or equal to 100.0 kP, from greater than or equal to 90.0 kP to less than or equal to 100.0 kP, from greater than or equal to 75.0 kP to less than or equal to 95.0 kP, or any and all sub-ranges formed from any of these endpoints.

The softening point of the glass composition is also affected by the addition of lithium to the glass composition. In embodiments, to obtain a desired softening point, the glass composition may satisfy the relationship $Al_2O_3*(4.90)+B_2O_3*(-8.97)+P_2O_5*(-1.87)+Li_2O*(-11.26)+Na_2O*(-8.29)+K_2O*(-11.39)+MgO*(-4.69)+CaO*(-7.16)+SrO*(-2.81) < -100$. In embodiments, to obtain a desired softening point, the glass composition may satisfy the relationship $Al_2O_3*(4.52)+B_2O_3*(-8.28)+P_2O_5*(-1.73)+Li_2O*(-10.40)+Na_2O*(-7.65)+K_2O*(-10.52)+MgO*(-4.33)+CaO*(-6.61)+SrO*(-2.60) \leq -100$. In embodiments, to obtain a desired softening point, the glass composition may satisfy the relationship $Al_2O_3*(4.20)+B_2O_3*(-7.69)+P_2O_5*(-1.61)+Li_2O*(-9.66)+Na_2O*(-7.11)+K_2O*(-9.78)+MgO*(-4.03)+CaO*(-6.14)+SrO*(-2.41) \leq -100$. In embodiments, the softening point of the glass composition may be in the range from greater than or equal 650.0° C. to less than or equal to 950.0° C., from greater than or equal to 650.0° C. to less than or equal to 925.0° C., from greater than or equal to 650.0° C. to less than or equal to 905.0° C., from greater than or equal to 650.0° C. to less than or equal to 900.0° C., from greater than or equal to 650.0° C. to less than or equal to 850.0° C., from greater than or equal to 650.0° C. to less than or equal to 800.0° C., from greater than or equal to 650.0° C. to less than or equal to 750.0° C., from greater than or equal to 650.0° C. to less than or equal to 700.0° C., from greater than or equal to 650.0° C. to less than or equal to 690.0° C., from greater than or equal to 660.0° C. to less than or equal to 680.0° C., from greater than or equal to 675.0° C. to less than or equal to 700.0° C., from greater than or equal to 700.0° C. to less than or equal to 950.0° C., from greater than or equal to 750.0° C. to less than or equal to 925.0° C., from greater than or equal to 775.0° C. to less than or equal to 925.0° C., from greater than or equal to 790.0° C. to less than or equal to 910.0° C., from greater than or equal to 795.0° C. to less than or equal to 905.0° C., from greater than or equal to 800.0° C. to less than or equal to 905.0° C., from greater than or equal to 800.0° C. to less than or equal to 900.0° C., from greater than or equal to 800.0° C. to less than or equal to 875.0° C., from greater than or equal to 800.0° C. to less than or equal to 850.0° C., from greater than or equal to 800.0° C. to less than or equal to 825.0° C., from greater than or equal to 825.0° C. to less than or equal to 875.0° C., from greater than or equal to 825.0° C. to less than or equal to 850.0° C., from greater than or equal to 850.0°

C. to less than or equal to 900.0° C., or any and all sub-ranges between the foregoing values. In embodiments, the softening point of the glass composition may be less than or equal to 950.0° C., less than or equal to 925.0° C., less than or equal to 900.0° C., less than or equal to 875.0° C., less than or equal to 860.0° C., less than or equal to 850.0° C., less than or equal to 825.0° C., less than or equal to 800.0° C., less than or equal to 750.0° C., less than or equal to 700.0° C., less than or equal to 675.0° C., or less than or equal to 650.0° C.

Fracture toughness ($K_{1C}$) represents the ability of a glass composition to resist fracture. Fracture toughness is measured on a non-strengthened glass article, such as measuring the $K_{1C}$ value prior to ion exchange (IOX) treatment of the glass article, thereby representing a feature of a glass substrate prior to IOX. The fracture toughness test methods described herein are not suitable for glasses that have been exposed to IOX treatment. The measurements on corresponding underlying glass substrates (without IOX treatment), nonetheless, provide valuable information about the IOX'd glass properties. The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Unless otherwise specified, all fracture toughness values were measured by chevron notched short bar (CNSB) method. In embodiments, the $K_{1C}$ fracture toughness of the glass composition as measured by a chevron notch short bar method may be greater than or equal to 0.70, greater than or equal to 0.71, greater than or equal to 0.72, greater than or equal to 0.73, greater than or equal to 0.74, greater than or equal to 0.75, greater than or equal to 0.76, greater than or equal to 0.77, greater than or equal to 0.78, greater than or equal to 0.79, or greater than or equal to 0.80. In embodiments, the $K_{1C}$ fracture toughness of the glass composition as measured by a chevron notch short bar method may be in the range of from greater than or equal to 0.70 to less than or equal to 0.80 or greater than or equal to 0.73 to less than or equal to 0.75. It should be understood that the fracture toughness may be within a sub-range formed from any and all of the foregoing endpoints.

The critical strain energy release rate is a calculation of the fracture toughness ($K_{1C}$) divided by the Yong's modulus, and can be a good indicator of the mechanical strength of the glass composition. In embodiments, to obtain the desired critical strain energy release rate, Gc (J/m$^2$), the glass composition may satisfy the relationship $Al_2O_3*(10.832)+B_2O_3*(10.334)+P_2O_5*(-13.761)+Li_2O*(-3.135)+Na_2O*(-7.213)+K_2O*(-13.761)+MgO*(2.159)+CaO*(-4.518)+SrO*(-4.518)>100$. In embodiments, to obtain the desired Gc, the glass composition may satisfy the relationship $Al_2O_3*(9.762)+B_2O_3*(9.313)+P_2O_5*(12.402)+Li_2O*(-2.825)+Na_2O*(-6.501)+K_2O*(12.402)+MgO*(1.946)+CaO*(-4.072)+SrO*(-4.072)>100$. In embodiments, to obtain the desired Gc, the glass composition may satisfy the relationship $Al_2O_3*(8.885)+B_2O_3*(8.477)+P_2O_5*(11.288)+Li_2O*(-2.571)+Na_2O*(-5.917)+K_2O*(11.288)+MgO*(1.771)+CaO*(-3.706)+SrO*(-3.706)>100$.

From the above, glass compositions according to embodiments may be formed by any suitable method, such as slot forming, float forming, rolling processes, fusion forming processes, etc.

The glass article may be characterized by the manner in which it is formed. For instance, the glass article may be characterized as float-formable (i.e., formed by a float process), down-drawable and, in particular, fusion-formable or slot-drawable (i.e., formed by a down draw process such as a fusion draw process or a slot draw process).

In embodiments, the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

In embodiments, the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

In embodiments, the glass articles described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

Figure 5:
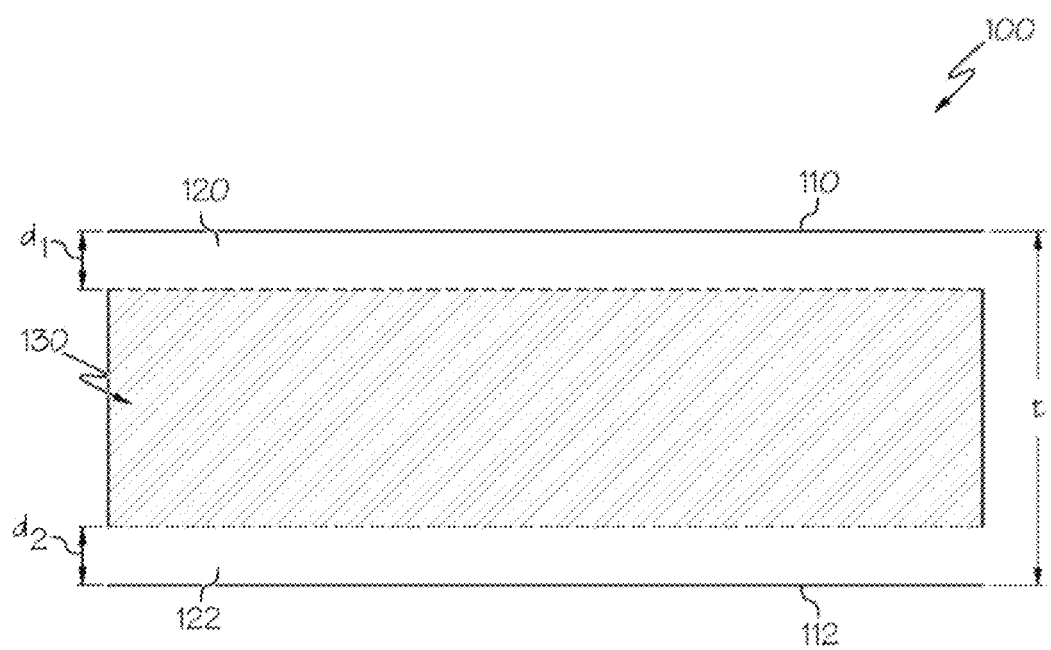
FIG. 5 schematically depicts a cross section of a glass having compressive stress layers on surfaces thereof according to embodiments disclosed and described herein.

As mentioned above, in embodiments, the alkali aluminosilicate glass compositions may be strengthened, such as by ion exchange, making a glass that is damage resistant for applications such as, but not limited to, glass for display covers. With reference to FIG. 5, the glass has a first region under compressive stress (e.g., first and second compressive layers 120, 122 in FIG. 5) extending from the surface to a DOC of the glass and a second region (e.g., central region 130 in FIG. 5) under a tensile stress or CT extending from the DOC into the central or interior region of the glass. A first segment 120 extends from first surface 110 to a depth $d_1$ and a second segment 122 extends from second surface 112 to a depth $d_2$. Together, these segments define a compression or CS of glass 100.

In embodiments, the CS of the glass composition may be in the range from greater than or equal to 450.0 MPa to less than or equal to 950.0 MPa, from greater than or equal to 450.0 MPa to less than or equal to 900.0 MPa, from greater than or equal to 450.0 MPa to less than or equal to 850.0 MPa, from greater than or equal to 450.0 MPa to less than or equal to 800.0 MPa, from greater than or equal to 450.0 MPa to less than or equal to 750.0 MPa, from greater than or equal to 450.0 MPa to less than or equal to 700.0 MPa, from greater than or equal to 450.0 MPa to less than or equal to 650.0 MPa, from greater than or equal to 450.0 MPa to less than or equal to 600.0 MPa, from greater than or equal to 450.0 MPa to less than or equal to 550.0 MPa, from greater than or equal to 500.0 MPa to less than or equal to 950.0 MPa, from greater than or equal to 500.0 MPa to less than or equal to 900.0 MPa, from greater than or equal to 500.0 MPa to less than or equal to 850.0 MPa, from greater than or equal to 500.0 MPa to less than or equal to 800.0 MPa, from greater than or equal to 500.0 MPa to less than or equal to 750.0 MPa, from greater than or equal to 500.0 MPa to less than or equal to 700.0 MPa, from greater than or equal to 500.0 MPa to less than or equal to 650.0 MPa, from greater than or equal to 500.0 MPa to less than or equal to 600.0 MPa, from greater than or equal to 550.0 MPa to less than or equal to 950.0 MPa, from greater than or equal to 550.0 MPa to less than or equal to 900.0 MPa, from greater than or equal to 550.0 MPa to less than or equal to 850.0 MPa, from greater than or equal to 550.0 MPa to less than or equal to 800.0 MPa, from greater than or equal to 550.0 MPa to less than or equal to 750.0 MPa, from greater than or equal to 550.0 MPa to less than or equal to 700.0 MPa, from greater than or equal to 550.0 MPa to less than or equal to 650.0 MPa, from greater than or equal to 600.0 MPa to less than or equal to 950.0 MPa, from greater than or equal to 600.0 MPa to less than or equal to 900.0 MPa, from greater than or equal to 600.0 MPa to less than or equal to 850.0 MPa, from greater than or equal to 600.0 MPa to less than or equal to 800.0 MPa, from greater than or equal to 600.0 MPa to less than or equal to 750.0 MPa, from greater than or equal to 600.0 MPa to less than or equal to 700.0 MPa, from greater than or equal to 650.0 MPa to less than or equal to 950.0 MPa, from greater than or equal to 650.0 MPa to less than or equal to 900.0 MPa, from greater than or equal to 650.0 MPa to less than or equal to 850.0 MPa, from greater than or equal to 650.0 MPa to less than or equal to 800.0 MPa, from greater than or equal to 650.0 MPa to less than or equal to 750.0 MPa, from greater than or equal to 700.0 MPa to less than or equal to 950.0 MPa, from greater than or equal to 700.0 MPa to less than or equal to 900.0 MPa, from greater than or equal to 700.0 MPa to less than or equal to 850.0 MPa, from greater than or equal to 700.0 MPa to less than or equal to 800.0 MPa, from greater than or equal to 750.0 MPa to less than or equal to 950.0 MPa, from greater than or equal to 750.0 MPa to less than or equal to 900.0 MPa, from greater than or equal to 750.0 MPa to less than or equal to 850.0 MPa, from greater than or equal to 800.0 MPa to less than or equal to 950.0 MPa, from greater than or equal to 800.0 MPa to less than or equal to 900.0 MPa, or from greater than or equal to 850.0 MPa to less than or equal to 950.0 MPa, or any and all sub-ranges between the foregoing values. In embodiments, the CS of the glass composition may be greater than or equal to 450.0 mPa, greater than or equal to 500.0 mPa, greater than or equal to 550.0 mPa, greater than or equal to 600.0 MPa, greater than or equal to 650.0 MPa, greater than or equal to 700.0 MPa, greater than or equal to 750.0 MPa, greater than or equal to 800.0 MPa, greater than or equal to 850.0 MPa, or greater than or equal to 900.0 MPa.

In embodiments, to obtain a desired maximum CT, the glass composition may satisfy $0.95 < Al_2O_3*(5.9) - B_2O_3*(3.8) - P_2O_5*(8.3) + Li_2O*(8.5) - Na_2O*(4.6) - K_2O*(10) + (MgO+CaO+SrO+ZnO)*(1.8) < 1.5$. In embodiments, to obtain a desired maximum CT, the glass composition may satisfy the relationship $Al_2O_3*(6.31) + B_2O_3*(-4.05) + P_2O_5*(-8.89) + Li_2O*(9.11) + Na_2O*(-4.90) + K_2O*(-10.73) + MgO*(1.96) + CaO*(1.96) + SrO*(1.96) > 100$. In embodiments, to obtain a desired maximum CT, the glass composition may satisfy the relationship $Al_2O_3*(5.99) + B_2O_3*(-3.85) + P_2O_5*(-8.44) + Li_2O*(8.65) + Na_2O*(-4.65) + K_2O*(-10.18) + MgO*(1.86) + CaO*(1.86) + SrO*(1.86) > 100$. In embodiments, to obtain a desired maximum CT, the glass composition may satisfy the relationship $Al_2O_3*(5.70) + B_2O_3*(-3.66) + P_2O_5*(-8.03) + Li_2O*(8.23) + Na_2O*(-4.43) + K_2O*(-9.69) + MgO*(1.77) + CaO*(1.77) + SrO*(1.77) > 100$. In embodiments, the maximum CT of the glass composition may be in the range from greater than or equal to 20.0 MPa to less than or equal to 150.0 MPa, from greater than or equal to 25.0 MPa to less than or equal to 125.0 MPa, from greater than or equal to 50.0 MPa to less than or equal to 125.0 MPa, from greater than or equal to 60.0 MPa to less than or equal to 100.0 MPa, from greater than or equal to 70.0 MPa to less than or equal to 100.0 MPa, from greater than or equal to 80.0 MPa to less than or equal to 100.0 MPa, from greater than or equal to 90.0 MPa to less than or equal to 100.0 MPa, from greater than or equal to 60.0 MPa to less than or equal to 90.0 MPa, from greater than or equal to 70.0 MPa to less than or equal to 90.0 MPa, from greater than or equal to 80.0 MPa to less than or equal to 90.0 MPa, from greater than or equal to 60.0 MPa to less than or equal to 80.0 MPa, from greater than or equal to 70.0 MPa to less than or equal to 80.0 MPa, from greater than or equal to 60.0 MPa to less than or equal to 70.0 MPa, or any and all sub-ranges between the foregoing values. In embodiments, the maximum CT of the glass composition may be greater than or equal to 20.0 MPa, greater than or equal to 50.0 MPa, greater than or equal to 60.0 MPa, greater than or equal to 65.0 MPa, greater than or equal to 70.0 MPa, greater than or equal to 75.0 MPa, greater than or equal to 80.0 MPa, greater than or equal to 85.0 MPa, greater than or equal to 90.0 MPa, greater than or equal to 95.0 MPa, or greater than or equal to 100.0 MPa.

In embodiments, the DOC of the glass compositions may in the range from greater than or equal to 0.13t to less than or equal to 0.30t where t is the thickness of the articles, from greater than or equal to 0.13t to less than or equal to 0.28t, from greater than or equal to 0.13t to less than or equal to 0.26t, from greater than or equal to 0.13t to less than or equal to 0.24t, from greater than or equal to 0.13t to less than or equal to 0.22t, from greater than or equal to 0.13t to less than or equal to 0.20t, from greater than or equal to 0.13t to less than or equal to 0.18t, from greater than or equal to 0.15t to less than or equal to 0.30t, from greater than or equal to 0.15t to less than or equal to 0.28t, from greater than or equal to 0.15t to less than or equal to 0.26t, from greater than or equal to 0.15t to less than or equal to 0.24t, from greater than or equal to 0.15t to less than or equal to 0.22t, from greater than or equal to 0.15t to less than or equal to 0.20t, from greater than or equal to 0.15t to less than or equal to 0.18t, or any and all sub-ranges between the foregoing values. In embodiments, the DOC of the glass compositions may be greater than or equal to 0.13t where t is the thickness of the articles, greater than or equal to 0.14t, greater than or equal to 0.15t, greater than or equal to 0.16t, greater than or equal to 0.17t, greater than or equal to 0.18t, greater than or equal to 0.19t, greater than or equal to 0.20t, greater than or equal to 0.21t, greater than or equal to 0.22t, greater than or equal to 0.23t, greater than or equal to 0.24t, greater than or equal to 0.25t, greater than or equal to 0.26t, greater than or equal to 0.27t, greater than or equal to 0.28t, greater than or equal to 0.29t, or greater than or equal to 0.30t.

In embodiments, the DOL of the glass composition may be in the range from greater than or equal to 1.0 µm to less than or equal to 25.0 µm, from greater than or equal to 5.0 µm to less than or equal to 20.0 µm, from greater than or equal to 5.0 µm to less than or equal to 18.0 µm, from greater than or equal to 5.0 µm to less than or equal to 15.0 µm, from greater than or equal to 5.0 µm to less than or equal to 12.0 µm, from greater than or equal to 5.0 µm to less than or equal to 10.0 µm, from greater than or equal to 7.0 µm to less than or equal to 20.0 µm, from greater than or equal to 7.0 µm to less than or equal to 18.0 µm, from greater than or equal to 7.0 µm to less than or equal to 15.0 µm, from greater than or equal to 7.0 µm to less than or equal to 12.0 µm, from greater than or equal to 7.0 µm to less than or equal to 10.0 µm, from greater than or equal to 10.0 µm to less than or equal to 20.0 µm, from greater than or equal to 10.0 µm to less than or equal to 18.0 µm, from greater than or equal to 10.0 µm to less than or equal to 15.0 µm, from greater than or equal to 10.0 µm to less than or equal to 12.0 µm, from greater than or equal to 12.0 µm to less than or equal to 20.0 µm, from greater than or equal to 12.0 µm to less than or equal to 18.0 µm, from greater than or equal to 12.0 µm to less than or equal to 15.0 µm, from greater than or equal to 15.0 µm to less than or equal to 20.0 µm, from greater than or equal to 15.0 µm to less than or equal to 18.0 µm, or from greater than or equal to 18.0 µm to less than or equal to 20.0 µm, or any and all sub-ranges between the foregoing values. In embodiments, the DOL may be greater than or equal to 5.0 µm, greater than or equal to 7.0 µm, greater than or equal to 10.0 µm, greater than or equal to 12.0 µm, greater than or equal to 15.0 µm, greater than or equal to 18.0 µm, or greater than or equal to 25.0 µm.

In embodiments, the glass composition may have a compressive stress of greater than or equal to 600.0 MPa, a maximum central tension of greater than or equal to 20.0 MPa, a depth of compression of greater than or equal to 0.15t where t is the thickness of the articles, and a depth of layer of greater than or equal to 5.0 µm. In embodiments, the glass composition may have a compressive stress of greater than or equal to 600.0 MPa, a maximum central tension of greater than or equal to 60.0 MPa, a depth of compression of greater than or equal to 0.18t, and a depth of layer of greater than or equal to 10.0 µm. In embodiments, the glass composition may have a compressive stress greater than or equal to 450.0 mPa, greater than or equal to 500.0 mPa, greater than or equal to 550.0 mPa, greater than or equal to 600.0 MPa, greater than or equal to 650.0 MPa, greater than or equal to 700.0 MPa, greater than or equal to 750.0 MPa, greater than or equal to 800.0 MPa, greater than or equal to 850.0 MPa, or greater than or equal to 900.0 MPa; a maximum central tension greater than or equal to 20.0 MPa, greater than or equal to 50.0 MPa, greater than or equal to 60.0 MPa, greater than or equal to 65.0 MPa, greater than or equal to 70.0 MPa, greater than or equal to 75.0 MPa, greater than or equal to 80.0 MPa, greater than or equal to 85.0 MPa, greater than or equal to 90.0 MPa, greater than or equal to 95.0 MPa, or greater than or equal to 100.0 MPa; a depth of compression of greater than or equal to 0.13t, greater than or equal to 0.14t, greater than or equal to 0.15t, greater than or equal to 0.16t, greater than or equal to 0.17t, greater than or equal to 0.18t, greater than or equal to 0.19t, greater than or equal to 0.20t, greater than or equal to 0.21t, greater than or equal to 0.22t, greater than or equal to 0.23t, greater than or equal to 0.24t, greater than or equal to 0.25t, greater than or equal to 0.26t, greater than or equal to 0.27t, greater than or equal to 0.28t, greater than or equal to 0.29t, or greater than or equal to 0.30t; and a DOL greater than or equal to 5.0 µm, greater than or equal to 7.0 µm, greater than or equal to 10.0 µm, greater than or equal to 12.0 µm, greater than or equal to 15.0 µm, greater than or equal to 18.0 µm, or greater than or equal to 25.0 µm.

In embodiments, the glass composition may have high crack and scratch resistance, as indicated by a Knoop Scratch threshold of at least 6.0 N. In embodiments, the glass composition may have a Knoop Scratch threshold in the range of 6.0 N to 12.0 N. According to embodiments, the Knoop Scratch threshold may be from greater than ore equal to 6.0 N and less than or equal to 9.0 N, such as from greater than or equal to 6.0 N and less than or equal to 12.0 N, greater than or equal to 7.0 N and less than or equal to 12.0 N, greater than or equal to 7.0 N and less than or equal to 11.0 N, or greater than or equal to 7.0 N and less than or equal to 10.0 N. It should be understood that the Knoop Scratch threshold of the glass-ceramics may be within a sub-range formed from any and all of the foregoing endpoints.

In embodiments, the glass composition may have a failure height of greater than or equal to 100.0 cm, greater than or equal to 110.0 cm, greater than or equal to 120.0 cm, greater than or equal to 130.0 cm, greater than or equal to 140.0 cm, greater than or equal to 150.0 cm, greater than or equal to 160.0 cm, greater than or equal to 170.0 cm, greater than or equal to 180.0 cm, greater than or equal to 190.0 cm, or greater than or equal to 200.0 cm as measured for an article having a thickness of 0.5 mm according to the Drop Test Method on 180 grit sandpaper. In embodiments, the glass composition may have a failure height in the range from greater than or equal to 100.0 cm to less than or equal to 200.0 cm, from greater than or equal to 120.0 cm to less than or equal to 180.0 cm, from greater than or equal to 140.0 cm to less than or equal to 160.0 cm, or from greater than or equal to 145.0 cm to less than or equal to 155.0 cm, as measured for an article having a thickness of 0.5 mm according to the Drop Test Method on 180 grit sandpaper. In embodiments, the glass composition may have a failure height of greater than or equal to 150.0 cm, greater than or equal to 160.0 cm, greater than or equal to 170.0 cm, greater than or equal to 180.0 cm, greater than or equal to 190.0 cm, or greater than or equal to 200.0 cm as measured for an article having a thickness of 0.6 mm according to the Drop Test Method on 180 grit sandpaper. In embodiments, the glass composition may have a failure height in the range from greater than or equal to 150.0 cm to less than or equal to 200.0 cm, from greater than or equal to 160.0 cm to less than or equal to 190.0 cm, from greater than or equal to 165.0 cm to less than or equal to 185.0 cm, or from greater than or equal to 170.0 cm to less than or equal to 180.0 cm, as measured for an article having a thickness of 0.6 mm according to the Drop Test Method on 180 grit sandpaper.

In embodiments, the glass composition may have a retained strength of greater than or equal to 150.0 MPa, greater than or equal to 175.0 MPa, greater than or equal to 200.0 MPa, or greater than or equal to 225.0 MPa as measured for an article having a thickness of 600.0 µm after impact with 80 grit sandpaper with a force of 500.0 N. In embodiments, the glass composition may have a retained strength in the range from greater than or equal to 150.0 MPa to less than or equal to 250.0 MPa, greater than or equal to 175.0 MPa to less than or equal to 225.0 MPa, or from greater than or equal to 190.0 MPa to less than or equal to 210.0 MPa as measured for an article having a thickness of 600.0 µm after impact with 80 grit sandpaper with a force of 500.0 N. In embodiments, the glass composition may have a retained strength of greater than or equal to 150.0 MPa, greater than or equal to 175.0 MPa, greater than or equal to 200.0 MPa, greater than or equal to 225.0 MPa, or greater than or equal to 250.0 MPa as measured for an article having a thickness of 600.0 μm after impact with 120 grit sandpaper with a force of 500.0 N. In embodiments, the glass composition may have a retained strength in the range from greater than or equal to 150.0 MPa to less than or equal to 300.0 MPa, from greater than or equal to 175.0 MPa to less than or equal to 275.0 MPa, or from greater than or equal to 200.0 MPa to less than or equal to 250.0 MPa as measured for an article having a thickness of 600.0 μm after impact with 120 grit sandpaper with a force of 500.0 N. In embodiments, the glass composition may have a retained strength of greater than or equal to 200.0 MPa, greater than or equal to 225.0 MPa, greater than or equal to 250.0 MPa, or greater than or equal to 270.0 MPa as measured for an article having a thickness of 600.0 μm after impact with 180 grit sandpaper with a force of 500.0 N. In embodiments, the glass composition may have a retained strength in the range from greater than or equal to 200.0 MPa to less than or equal to 300.0 MPa, from greater than or equal to 225.0 MPa to less than or equal to 290.0 MPa, or from greater than or equal to 250.0 MPa to less than or equal to 270.0 MPa as measured for an article having a thickness of 600.0 μm after impact with 180 grit sandpaper with a force of 500.0 N.

The glass composition may be exposed to the ion exchange solution (e.g., $KNO_3$ and/or $NaNO_3$ molten salt bath) by dipping a glass article made from the glass composition into a bath of the ion exchange solution, spraying the ion exchange solution onto a glass article made from the glass composition, or otherwise physically applying the ion exchange solution to a glass article made from the glass composition. Upon exposure to the glass composition, the ion exchange solution may, according to embodiments, be at a temperature in the range from greater than or equal to 350.0° C. to less than or equal to 500.0° C., from greater than or equal to 360.0° C. to less than or equal to 450.0° C., from greater than or equal to 370.0° C. to less than or equal to 440.0° C., from greater than or equal to 360.0° C. to less than or equal to 420.0° C., from greater than or equal to 370.0° C. to less than or equal to 400.0° C., from greater than or equal to 375.0° C. to less than or equal to 475.0° C., from greater than or equal to 400.0° C. to less than or equal to 500.0° C., from greater than or equal to 410.0° C. to less than or equal to 490.0° C., from greater than or equal to 420.0° C. to less than or equal to 480.0° C., from greater than or equal to 430.0° C. to less than or equal to 470.0° C., or from greater than or equal to 440.0° C. to less than or equal to 460.0° C., or any and all sub-ranges between the foregoing values. In embodiments, the glass composition may be exposed to the ion exchange solution for a duration from greater than or equal to 2 hours to less than or equal to 48 hours, from greater than or equal to 2 hours to less than or equal to 24 hours, from greater than or equal to 2 hours to less than or equal to 12 hours, from greater than or equal to 2 hours to less than or equal to 6 hours, from greater than or equal to 8 hours to less than or equal to 44 hours, from greater than or equal to 12 hours to less than or equal to 40 hours, from greater than or equal to 16 hours to less than or equal to 36 hours, from greater than or equal to 20 hours to less than or equal to 32 hours, or from greater than or equal to 24 hours to less than or equal to 28 hours, or any and all sub-ranges between the foregoing values. The glass compositions described herein may undergo a single ion exchange process, a double ion exchange process, or multiple ion exchange processes. The glass compositions described herein have similar properties after undergoing a single ion exchange process as conventional glass compositions that have undergone multiple ion exchange processes.

The ion exchange process may be performed in an ion exchange solution under processing conditions that provide an improved compressive stress profile as disclosed, for example, in U.S. Patent Application Publication No. 2016/0102011, which is incorporated herein by reference in its entirety.

After an ion exchange process is performed, it should be understood that a composition at the surface of a glass article may be different than the composition of the as-formed glass article (i.e., the glass article before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed (non-ion exchanged) glass utilized to form the glass article.

Figure 6A:
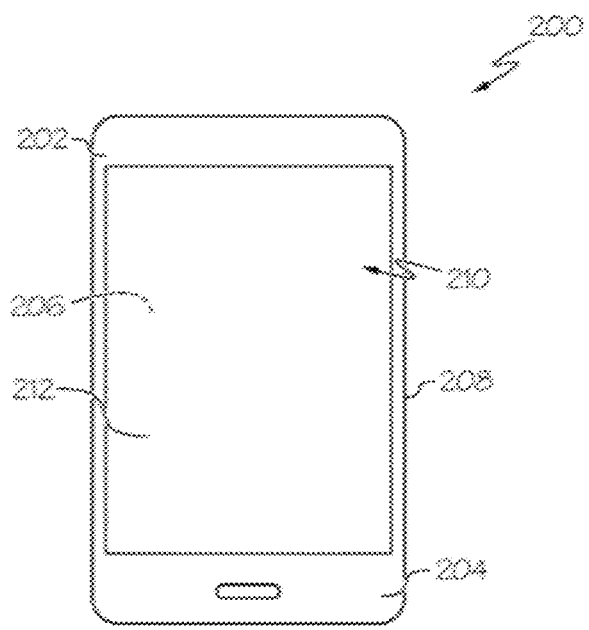
FIG. 6A is a plan view of an exemplary electronic device incorporating any of the glass articles disclosed herein.
Figure 6B:
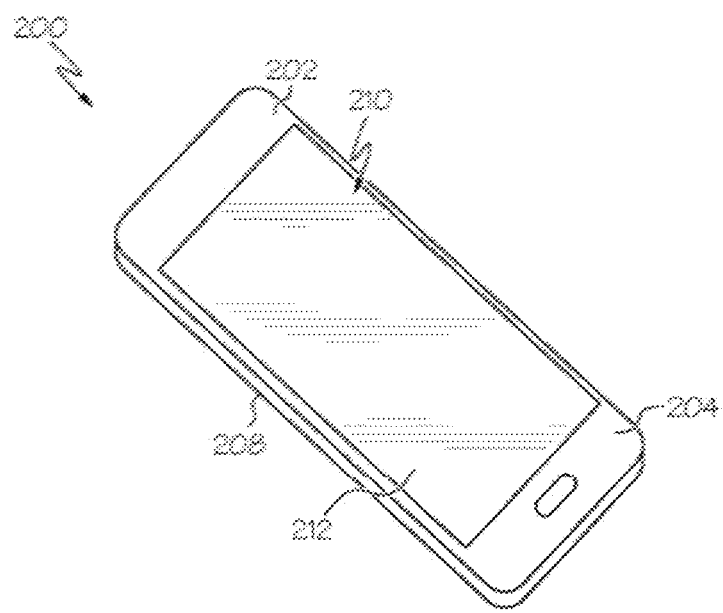
FIG. 6B is a perspective view of the exemplary electronic device of FIG. 6A.

The glass articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 6A and 6B. Specifically, FIGS. 6A and 6B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In embodiments, a portion of the cover substrate 212 and/or a portion of housing 202 may include any of the glass articles disclosed herein.

Examples

The embodiments of the glass compositions described herein will be further clarified by the following examples.

Table 1 shows example and comparative glass compositions (in terms of mol %) and the respective properties of glass compositions. Glasses were formed having the compositions 1-115 and comparative compositions 1-16 listed in Table 1.

Table 2 shows the CS, DOL, and CT of comparative glass compositions 1-4 and example glass compositions 1-10 and 100-102 after applying an ion exchange solution to glass articles made from the example glass compositions at a temperature of 380° C. for 2 hours. The ion exchange solution applied to comparative glass compositions 1 and 2 and example glass compositions 1-10 was a 80 wt % $KNO_3$/20 wt % $NaNO_3$ molten salt bath. The ion exchange solution applied to comparative glass compositions 3 and 4 and example glass compositions 100-102 was a 95 wt % $KNO_3$/5 wt % $NaNO_3$ molten salt bath.

Table 3 shows the CS, DOL, and CT of comparative glass compositions 1 and 2 and example glass compositions 1-10 after applying an ion exchange solution to glass articles made from the example glass compositions at a temperature of 380° C. for 3 hours. The ion exchange solution applied to comparative glass compositions 1 and 2 and example glass compositions 1-10 was a 80 wt % KNO$_3$/20 wt % NaNO$_3$ molten salt bath.

Table 4 shows the CS, DOL, and CT of comparative glass compositions 1-4 and example glass compositions 1-10 and 100-102 after applying an ion exchange solution to glass articles made from the example glass compositions at a temperature of 380° C. for 4 hours. The ion exchange solution applied to comparative glass compositions 1 and 2 and example glass compositions 1-10 was a 80 wt % KNO$_3$/20 wt % NaNO$_3$ molten salt bath. The ion exchange solution applied to comparative glass compositions 3 and 4 and example glass compositions 100-102 was a 95 wt % KNO$_3$/5 wt % NaNO$_3$ molten salt bath.

Table 5 shows the CS, DOL, and CT of comparative glass compositions 3 and 4 and example glass compositions 100-102 after applying an ion exchange solution to glass articles made from the example glass compositions at a temperature of 380° C. for 6 hours. The ion exchange solution applied to comparative glass compositions 3 and 4 and example glass compositions 100-102 was a 95 wt % KNO$_3$/5 wt % NaNO$_3$ molten salt bath.

Table 6 shows the CS, DOL, and CT of comparative glass compositions 5-16 and example glass compositions 29-34 and 37-99 after applying an ion exchange solution to glass articles made from the example glass compositions at a temperature of 430° C. for 4 hours. The ion exchange solution applied to comparative glass compositions 5-16 and example glass compositions 29-34 and 37-99 was a 80 wt % KNO$_3$/20 wt % NaNO$_3$ molten salt bath.

Table 7 shows the CS, DOL, and CT of comparative glass compositions 5-16 and example glass compositions 29-34 and 37-99 after applying an ion exchange solution to glass articles made from the example glass compositions at a temperature of 430° C. for 8 hours. The ion exchange solution applied to comparative glass compositions 5-16 and example glass compositions 29-34 and 37-99 was a 80 wt % KNO$_3$/20 wt % NaNO$_3$ molten salt bath.

Table 8 shows the CS, DOL, and CT of comparative glass compositions 5-16 and example glass compositions 29-34 and 37-99 after applying an ion exchange solution to glass articles made from the example glass compositions at a temperature of 430° C. for 12 hours. The respective properties were measured by testing glasses having a thickness of 0.8 mm. The ion exchange solution applied to comparative glass compositions 5-16 and example glass compositions 29-34 and 37-99 was a 80 wt % KNO$_3$/20 wt % NaNO$_3$ molten salt bath.

TABLE 1

| Example | 1 | 2 | 3 | 4 | 5 | 6 | 7 | 8 |
|---|---|---|---|---|---|---|---|---|
| SiO$_2$ | 63.20 | 62.22 | 61.19 | 60.32 | 59.41 | 58.50 | 60.27 | 59.88 |
| Al$_2$O$_3$ | 17.05 | 17.06 | 17.05 | 17.05 | 17.08 | 17.12 | 17.07 | 17.59 |
| P$_2$O$_5$ | 2.42 | 2.45 | 2.46 | 2.43 | 2.44 | 2.43 | 2.46 | 2.42 |
| B$_2$O$_3$ | 0.00 | 0.96 | 1.95 | 2.88 | 3.71 | 4.62 | 1.92 | 1.92 |
| MgO | 0.02 | 0.02 | 0.02 | 0.03 | 0.03 | 0.02 | 0.98 | 0.97 |
| CaO | 0.04 | 0.04 | 0.04 | 0.04 | 0.05 | 0.04 | 0.05 | 0.05 |
| SrO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| Li$_2$O | 8.89 | 8.85 | 8.88 | 8.85 | 8.87 | 8.84 | 8.86 | 8.80 |
| Na$_2$O | 7.99 | 8.01 | 8.01 | 8.02 | 8.04 | 8.05 | 8.01 | 7.99 |
| K$_2$O | 0.29 | 0.29 | 0.29 | 0.29 | 0.29 | 0.28 | 0.29 | 0.29 |
| TiO$_2$ | 0.00 | 0.00 | 0.00 | 0.00 | 0.00 | 0.00 | 0.01 | 0.01 |
| SnO$_2$ | 0.05 | 0.05 | 0.05 | 0.05 | 0.05 | 0.05 | 0.05 | 0.05 |
| Fe2O$_3$ | 0.02 | 0.02 | 0.02 | 0.02 | 0.02 | 0.02 | 0.02 | 0.02 |
| ZrO$_2$ | 0.00 | 0.00 | 0.00 | 0.00 | 0.00 | 0.00 | 0.00 | 0.00 |
| RO | 0.06 | 0.06 | 0.06 | 0.07 | 0.08 | 0.06 | 1.03 | 1.02 |
| R$_2$O | 17.17 | 17.15 | 17.18 | 17.16 | 17.20 | 17.17 | 17.16 | 17.08 |
| Al$_2$O$_3$ + R$_2$O | 34.22 | 34.21 | 34.23 | 34.21 | 34.28 | 34.29 | 34.23 | 34.67 |
| Al$_2$O$_3$ + R$_2$O + B$_2$O$_3$ | 34.22 | 35.17 | 36.18 | 37.09 | 37.99 | 38.91 | 36.15 | 36.59 |
| (Al$_2$O$_3$ − (R$_2$O + RO))/Li$_2$O | −0.02 | −0.02 | −0.02 | −0.02 | −0.02 | −0.01 | −0.13 | −0.06 |
| (B$_2$O$_3$ + P$_2$O$_5$ + Al$_2$O$_3$)/SiO$_2$ | 0.31 | 0.33 | 0.35 | 0.37 | 0.39 | 0.41 | 0.36 | 0.37 |
| Density (g/cm$^3$) | 2.406 | 2.404 | 2.4 | 2.397 | 2.392 | 2.388 | 2.409 | 2.411 |
| CTE (ppm)(fiber) | — | — | — | — | — | — | — | — |
| Strain Pt. (fiber) | — | — | — | — | — | — | — | — |
| Anneal Pt. (fiber) | — | — | — | — | — | — | — | — |
| Softening Pt. (fiber) | — | — | — | — | — | — | — | — |
| 10^11 Poises | — | — | — | — | — | — | — | — |
| Strain Pt. (° C.) | 600.5 | 579.3 | 559.4 | 541.9 | 533.2 | 521.7 | 545.6 | 553.5 |
| Anneal Pt. (° C.) | 651.4 | 629.6 | 609.9 | 592.2 | 583.1 | 570.1 | 594.7 | 602.8 |
| Softening Pt. (° C.) | 903.6 | 877.4 | 856.5 | 836.8 | 821.5 | 805.2 | 838.4 | 844.6 |
| CTE at 500° C. cooling (ppm) | — | — | — | — | — | — | — | — |
| CTE at 300° C. cooling (ppm) | — | — | — | — | — | — | — | — |
| CTE at 50° C. cooling (ppm | — | — | — | — | — | — | — | — |
| Fulchers A | −3.707 | −3.639 | −3.502 | −3.151 | −3.197 | −3.499 | −3.132 | −3.62 |
| Fulchers B | 9331.9 | 9235.9 | 8676.1 | 8489.8 | 8112 | 8653.7 | 7883 | 8840 |
| Fulchers To | 70.4 | 50.6 | 79.6 | −1.0 | 67.6 | 24.0 | 103.3 | 54.6 |
| 200 P Temperature (° C.) | 1624 | 1605 | 1575 | 1556 | 1543 | 1516 | 1554 | 1548 |
| 35000 P Temperature (° C.) | 1201 | 1179 | 1158 | 1102 | 1116 | 1100 | 1130 | 1137 |
| 200000 P Temperature (° C.) | 1106 | 1084 | 1065 | 1003 | 1022 | 1007 | 1038 | 1046 |
| Liquidus Viscosity (kP) | 95 | 91 | 83 | 50 | 86 | 86 | 55 | 69 |
| $K_{1C}$ (CN) | — | — | — | — | — | — | — | — |
| Standard Deviation (CN) | — | — | — | — | — | — | — | — |
| SOC (nm/mm/MPa) | 2.93 | 2.963 | 3.007 | 3.03 | 3.08 | 3.091 | 2.964 | 2.964 |
| Refractive index | 1.5064 | 1.5066 | 1.5068 | 1.5067 | 1.5068 | 1.5068 | 1.5088 | 1.5092 |
| Young's Modulus (GPa) | 77.99 | 77.10 | 76.34 | 75.51 | 74.62 | 73.59 | 77.3 | 77.7 |

TABLE 1-continued

| | | | | | | | | |
|---|---|---|---|---|---|---|---|---|
| Shear modulus (GPa) | 32.1074 | 31.8318 | 31.4184 | 31.0739 | 30.5916 | 30.3849 | 31.8 | 31.9 |
| Poisson's ratio | 0.213 | 0.212 | 0.216 | 0.216 | 0.219 | 0.211 | 0.218 | 0.218 |

| Example | 9 | 10 | 11 | 12 | 13 | 14 | 15 | 16 |
|---|---|---|---|---|---|---|---|---|
| $SiO_2$ | 59.32 | 58.75 | 59.99 | 59.71 | 59.44 | 59.21 | 59.04 | 58.70 |
| $Al_2O_3$ | 18.05 | 18.54 | 17.27 | 17.53 | 17.79 | 18.01 | 18.28 | 18.52 |
| $P_2O_5$ | 2.44 | 2.44 | 2.43 | 2.45 | 2.46 | 2.45 | 2.43 | 2.44 |
| $B_2O_3$ | 1.92 | 1.96 | 2.79 | 2.75 | 2.78 | 2.74 | 2.75 | 2.79 |
| MgO | 0.98 | 0.98 | 0.02 | 0.02 | 0.02 | 0.03 | 0.02 | 0.03 |
| CaO | 0.05 | 0.05 | 0.04 | 0.04 | 0.04 | 0.04 | 0.04 | 0.04 |
| SrO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $Li_2O$ | 8.85 | 8.92 | 8.93 | 8.97 | 8.94 | 8.98 | 8.91 | 8.94 |
| $Na_2O$ | 8.00 | 7.97 | 8.18 | 8.17 | 8.17 | 8.20 | 8.19 | 8.19 |
| $K_2O$ | 0.29 | 0.29 | 0.27 | 0.27 | 0.27 | 0.27 | 0.27 | 0.27 |
| $TiO_2$ | 0.01 | 0.01 | 0.01 | 0.01 | 0.01 | 0.01 | 0.01 | 0.01 |
| $SnO_2$ | 0.05 | 0.05 | 0.05 | 0.05 | 0.05 | 0.05 | 0.05 | 0.05 |
| $Fe_2O_3$ | 0.02 | 0.02 | 0.02 | 0.02 | 0.02 | 0.02 | 0.02 | 0.02 |
| $ZrO_2$ | 0.00 | 0.00 | 0.00 | 0.00 | 0.00 | 0.00 | 0.00 | 0.00 |
| RO | 1.03 | 1.03 | 0.06 | 0.06 | 0.06 | 0.07 | 0.06 | 0.07 |
| $R_2O$ | 17.14 | 17.18 | 17.38 | 17.41 | 17.38 | 17.45 | 17.37 | 17.40 |
| $Al_2O_3 + R_2O$ | 35.19 | 35.72 | 34.65 | 34.94 | 35.17 | 35.46 | 35.65 | 35.92 |
| $Al_2O_3 + R_2O + B_2O_3$ | 37.11 | 37.68 | 37.44 | 37.69 | 37.95 | 38.20 | 38.40 | 38.71 |
| $(Al_2O_3 - (R_2O + RO))/Li_2O$ | −0.01 | 0.04 | −0.02 | 0.01 | 0.04 | 0.05 | 0.10 | 0.12 |
| $(B_2O_3 + P_2O_5 + Al_2O_3)/SiO_2$ | 0.38 | 0.39 | 0.37 | 0.38 | 0.39 | 0.39 | 0.40 | 0.40 |
| Density (g/cm³) | 2.413 | 2.415 | 2.398 | 2.399 | 2.400 | 2.401 | 2.402 | 2.403 |
| CTE (ppm)(fiber) | — | — | — | — | — | — | — | — |
| Strain Pt. (fiber) | — | — | — | — | — | — | — | — |
| Anneal Pt. (fiber) | — | — | — | — | — | — | — | — |
| Softening Pt. (fiber) | — | — | — | — | — | — | — | — |
| 10^11 Poises | — | — | — | — | — | — | — | — |
| Strain Pt. (° C.) | 562.2 | 568.9 | 550.6 | 554.2 | 559 | 560.3 | 561.7 | 563.7 |
| Anneal Pt. (° C.) | 611.3 | 617.9 | 600.6 | 603.5 | 608.3 | 610.4 | 611 | 613.1 |
| Softening Pt. (° C.) | 849.2 | 853.2 | 838.2 | 840.4 | 843.5 | 848.3 | 848.2 | 850.7 |
| CTE at 500° C. cooling (ppm) | — | — | 8.49 | 8.43 | 8.31 | 8.35 | 8.20 | 8.24 |
| CTE at 300° C. cooling (ppm) | — | — | 7.93 | 7.84 | 7.77 | 7.82 | 7.65 | 7.72 |
| CTE at 50° C. cooling (ppm | — | — | 6.82 | 6.77 | 6.81 | 6.82 | 6.65 | 6.78 |
| Fulchers A | −3.462 | −3.352 | −2.976 | −3.169 | −3.485 | −3.269 | −3.086 | −2.881 |
| Fulchers B | 8462.7 | 8127.1 | 7499.5 | 7935.7 | 8620 | 8099 | 7556.7 | 7017.6 |
| Fulchers To | 78.6 | 108.8 | 129 | 99.6 | 59.2 | 97.3 | 143.1 | 186.1 |
| 200 P Temperature (° C.) | 1547 | 1546 | 1550 | 1550 | 1549 | 1551 | 1546 | 1540 |
| 35000 P Temperature (° C.) | 1136 | 1138 | 1126 | 1128 | 1133 | 1134 | 1133 | 1131 |
| 200000 P Temperature (° C.) | 1044 | 1048 | 1035 | 1037 | 1040 | 1042 | 1044 | 1044 |
| Liquidus Viscosity (kP) | 67 | 77 | 163 | 284 | 276 | 260 | 105 | 93 |
| $K_{1C}$ (CN) | — | — | — | — | — | — | — | — |
| Standard Deviation (CN) | — | — | — | — | — | — | — | — |
| SOC (nm/mm/MPa) | 2.972 | 2.948 | 3.025 | 3.043 | 3.039 | 3.042 | 3.036 | 3.031 |
| Refractive index | 1.5096 | 1.5104 | 1.5070 | 1.5073 | 1.5075 | 1.5076 | 1.5079 | 1.5083 |
| Young's Modulus (GPa) | 78.0 | 77.9 | 75.6 | 75.6 | 75.5 | 76.2 | 76.1 | 76.4 |
| Shear modulus (GPa) | 32.0 | 32.0 | 31.2 | 31.2 | 31.2 | 31.2 | 31.2 | 31.4 |
| Poisson's ratio | 0.22 | 0.219 | 0.213 | 0.212 | 0.211 | 0.220 | 0.219 | 0.218 |

| Example | 17 | 18 | 19 | 20 | 21 | 22 | 23 | 24 |
|---|---|---|---|---|---|---|---|---|
| $SiO_2$ | 60.04 | 59.58 | 59.39 | 59.18 | 59.09 | 58.71 | 59.17 | 58.75 |
| $Al_2O_3$ | 17.29 | 17.52 | 17.75 | 18.01 | 18.33 | 18.50 | 17.50 | 17.52 |
| $P_2O_5$ | 1.94 | 1.98 | 1.96 | 1.97 | 1.97 | 1.97 | 2.47 | 2.46 |
| $B_2O_3$ | 3.23 | 3.38 | 3.28 | 3.35 | 3.16 | 3.22 | 2.81 | 2.78 |
| MgO | 0.02 | 0.02 | 0.04 | 0.03 | 0.03 | 0.03 | 0.02 | 0.03 |
| CaO | 0.04 | 0.04 | 0.05 | 0.04 | 0.04 | 0.04 | 0.04 | 0.05 |
| SrO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $Li_2O$ | 8.92 | 8.97 | 8.99 | 8.93 | 8.89 | 9.00 | 8.95 | 8.94 |
| $Na_2O$ | 8.17 | 8.17 | 8.19 | 8.15 | 8.15 | 8.19 | 8.20 | 8.15 |
| $K_2O$ | 0.26 | 0.26 | 0.27 | 0.26 | 0.26 | 0.27 | 0.27 | 0.26 |
| $TiO_2$ | 0.01 | 0.01 | 0.01 | 0.01 | 0.01 | 0.01 | 0.50 | 0.99 |
| $SnO_2$ | 0.05 | 0.06 | 0.05 | 0.06 | 0.05 | 0.05 | 0.06 | 0.05 |
| $Fe_2O_3$ | 0.02 | 0.02 | 0.02 | 0.02 | 0.02 | 0.02 | 0.02 | 0.02 |
| $ZrO_2$ | 0.00 | 0.00 | 0.00 | 0.00 | 0.00 | 0.00 | 0.00 | 0.00 |
| RO | 0.06 | 0.06 | 0.09 | 0.07 | 0.07 | 0.07 | 0.06 | 0.08 |
| $R_2O$ | 17.35 | 17.40 | 17.45 | 17.34 | 17.30 | 17.46 | 17.42 | 17.35 |
| $Al_2O_3 + R_2O$ | 34.64 | 34.92 | 35.20 | 35.35 | 35.63 | 35.96 | 34.92 | 34.87 |
| $Al_2O_3 + R_2O + B_2O_3$ | 37.87 | 38.30 | 38.48 | 38.70 | 38.79 | 39.18 | 37.73 | 37.65 |
| $(Al_2O_3 - (R_2O + RO))/Li_2O$ | −0.01 | 0.01 | 0.02 | 0.07 | 0.11 | 0.11 | 0.00 | 0.01 |
| $(B_2O_3 + P_2O_5 + Al_2O_3)/SiO_2$ | 0.37 | 0.38 | 0.39 | 0.39 | 0.40 | 0.40 | 0.38 | 0.39 |
| Density (g/cm³) | 2.398 | 2.399 | 2.400 | 2.401 | 2.402 | 2.403 | 2.404 | 2.408 |
| CTE (ppm)(fiber) | — | — | — | — | — | — | — | — |
| Strain Pt. (fiber) | — | — | — | — | — | — | — | — |
| Anneal Pt. (fiber) | — | — | — | — | — | — | — | — |

TABLE 1-continued

| | | | | | | | | |
|---|---|---|---|---|---|---|---|---|
| Softening Pt. (fiber) | — | — | — | — | — | — | — | — |
| 10^11 Poises | — | — | — | — | — | — | — | — |
| Strain Pt. (° C.) | 545.4 | 548.6 | 555.5 | 555.5 | 564.3 | 565.3 | 547.4 | 543.1 |
| Anneal Pt. (° C.) | 595.2 | 598.2 | 605.3 | 605.9 | 613.8 | 614.6 | 596.5 | 592 |
| Softening Pt. (° C.) | 835.0 | 833.5 | 838.6 | 842.8 | 848.0 | 847.8 | 833.5 | 828.0 |
| CTE at 500° C. cooling (ppm) | — | — | — | — | — | — | 8.37 | 8.37 |
| CTE at 300° C. cooling (ppm) | 7.77 | 7.81 | 7.79 | 7.77 | 7.77 | 7.72 | 7.87 | 7.83 |
| CTE at 50° C. cooling (ppm | 6.86 | 6.91 | 6.90 | 6.87 | 6.87 | 6.83 | 6.92 | 6.91 |
| Fulchers A | −3.025 | −3.09 | −3.201 | −4.203 | −3.347 | −2.797 | −3.306 | −3.298 |
| Fulchers B | 7672.8 | 7651.2 | 7943.9 | 10209 | 8134.8 | 6852.3 | 8199 | 8055.6 |
| Fulchers To | 109.4 | 118.3 | 96 | −42 | 97.9 | 189.3 | 81.6 | 82 |
| 200 P Temperature (° C.) | 1550 | 1538 | 1540 | 1528 | 1538 | 1533 | 1544 | 1521 |
| 35000 P Temperature (° C.) | 1123 | 1121 | 1122 | 1125 | 1129 | 1123 | 1126 | 1109 |
| 200000 P Temperature (° C.) | 1031 | 1030 | 1030 | 1032 | 1039 | 1035 | 1034 | 1019 |
| Liquidus Viscosity (kP) | 101 | 108 | 148 | 115 | 194 | 79 | 98 | 79 |
| $K_{1C}$ (CN) | — | — | — | — | — | — | — | — |
| Standard Deviation (CN) | — | — | — | — | — | — | — | — |
| SOC (nm/mm/MPa) | 3.045 | 3.044 | 3.026 | 3.027 | 3.030 | 3.039 | 3.064 | 3.098 |
| Refractive index | 1.5079 | 1.5081 | 1.5085 | 1.5087 | 1.5091 | 1.5096 | 1.5103 | 1.5128 |
| Young's Modulus (GPa) | 75.8 | 75.6 | 75.5 | 76.2 | 76.3 | 76.4 | 75.4 | 75.4 |
| Shear modulus (GPa) | 31.1 | 31.0 | 31.2 | 31.2 | 31.3 | 31.4 | 31.0 | 31.0 |
| Poisson's ratio | 0.22 | 0.218 | 0.212 | 0.22 | 0.219 | 0.218 | 0.217 | 0.214 |

| Example | 25 | 26 | 27 | 28 | 29 | 30 | 31 | 32 |
|---|---|---|---|---|---|---|---|---|
| $SiO_2$ | 58.28 | 58.69 | 58.23 | 57.81 | 62.26 | 62.30 | 62.24 | 62.26 |
| $Al_2O_3$ | 17.53 | 18.00 | 18.01 | 18.00 | 15.09 | 15.09 | 16.09 | 15.10 |
| $P_2O_5$ | 2.45 | 2.47 | 2.46 | 2.43 | 0.49 | 0.49 | 0.49 | 0.49 |
| $B_2O_3$ | 2.78 | 2.84 | 2.84 | 2.82 | 6.08 | 6.08 | 6.14 | 6.59 |
| MgO | 0.03 | 0.03 | 0.03 | 0.03 | 2.02 | 1.02 | 1.02 | 1.04 |
| CaO | 0.05 | 0.04 | 0.05 | 0.04 | 1.22 | 2.20 | 1.21 | 1.23 |
| SrO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $Li_2O$ | 8.93 | 8.95 | 8.92 | 8.89 | 6.91 | 6.94 | 6.88 | 7.45 |
| $Na_2O$ | 8.15 | 8.16 | 8.14 | 8.15 | 5.66 | 5.61 | 5.66 | 5.58 |
| $K_2O$ | 0.26 | 0.26 | 0.26 | 0.27 | 0.22 | 0.21 | 0.22 | 0.21 |
| $TiO_2$ | 1.48 | 0.50 | 0.99 | 1.48 | 0.00 | 0.00 | 0.00 | 0.00 |
| $SnO_2$ | 0.05 | 0.05 | 0.06 | 0.05 | 0.05 | 0.06 | 0.05 | 0.05 |
| $Fe2O_3$ | 0.02 | 0.02 | 0.02 | 0.02 | 0.01 | 0.01 | 0.01 | 0.01 |
| $ZrO_2$ | 0.00 | 0.00 | 0.00 | 0.00 | 0.00 | 0.00 | 0.00 | 0.00 |
| RO | 0.08 | 0.07 | 0.08 | 0.07 | 3.24 | 3.22 | 2.23 | 2.27 |
| $R_2O$ | 17.34 | 17.37 | 17.32 | 17.31 | 12.79 | 12.76 | 12.76 | 13.24 |
| $Al_2O_3 + R_2O$ | 34.87 | 35.37 | 35.33 | 35.31 | 27.88 | 27.85 | 28.85 | 28.34 |
| $Al_2O_3 + R_2O + B_2O_3$ | 37.65 | 38.21 | 38.17 | 38.13 | 33.96 | 33.93 | 34.99 | 34.93 |
| $(Al_2O_3 − (R_2O + RO))/Li_2O$ | 0.01 | 0.06 | 0.07 | 0.07 | −0.14 | −0.13 | 0.16 | −0.06 |
| $B_2O_3 + P_2O_5 + Al_2O_3)/SiO_2$ | 0.39 | 0.40 | 0.40 | 0.40 | 0.35 | 0.35 | 0.37 | 0.36 |
| Density (g/cm³) | 2.413 | 2.405 | 2.409 | 2.414 | 2.389 | 2.394 | 2.385 | 2.380 |
| CTE (ppm)(fiber) | — | — | — | — | 5.99 | 6.24 | 5.93 | 6.19 |
| Strain Pt. (fiber) | — | — | — | — | 541.0 | 541.0 | 559.0 | 535.0 |
| Anneal Pt. (fiber) | — | — | — | — | 587.0 | 586.0 | 608.0 | 583.0 |
| Softening Pt. (fiber) | — | — | — | — | 820.5 | 816.3 | 845.7 | 817.1 |
| 10^11 Poises | — | — | — | — | 664 | 664 | 689 | 663 |
| Strain Pt. (° C.) | 541.2 | 553.4 | 550.9 | 547.1 | — | — | — | — |
| Anneal Pt. (° C.) | 588.9 | 602.3 | 600.3 | 595.3 | — | — | — | — |
| Softening Pt. (° C.) | 820.4 | 838.2 | 832.6* | 824.8 | — | — | — | — |
| CTE at 500° C. cooling (ppm) | 8.33 | 8.34 | 8.26 | 8.35 | — | — | — | — |
| CTE at 300° C. cooling (ppm) | 7.81 | 7.83 | 7.73 | 7.79 | 6.12 | 6.17 | 6.12 | 6.29 |
| CTE at 50° C. cooling (ppm | 6.75 | 6.89 | 6.79 | 6.80 | 5.26 | 5.36 | 5.29 | 5.39 |
| Fulchers A | −3.273 | −3.12 | −3.213 | −3.538 | −3.196 | −3.196 | −3.251 | −3.267 |
| Fulchers B | 8016.7 | 7659.2 | 7844.3 | 8481.3 | 7977.5 | 7977.5 | 7950.8 | 8261.8 |
| Fulchers To | 76.2 | 126.2 | 101.3 | 57.2 | 82.5 | 82.5 | 114.3 | 53.7 |
| 200 P Temperature (° C.) | 1514 | 1539 | 1524 | 1510 | 1534 | 1534 | 1546 | 1537 |
| 35000 P Temperature (° C.) | 1102 | 1126 | 1113 | 1107 | 1113 | 1113 | 1134 | 1111 |
| 200000 P Temperature (° C.) | 1011 | 1036 | 1023 | 1017 | 1021 | 1021 | 1044 | 1018 |
| Liquidus Viscosity (kP) | 100 | 81 | 58 | 62 | 102 | 112 | 59 | 61 |
| $K_{1C}$ (CN) | — | — | — | — | — | — | — | — |
| Standard Deviation (CN) | — | — | — | — | — | — | — | — |
| SOC (nm/mm/MPa) | 3.140 | 3.072 | 3.114 | 3.103 | 3.143 | 3.132 | 3.176 | 3.200 |
| Refractive index | 1.5156 | 1.5105 | 1.5132 | 1.5160 | 1.5098 | 1.5107 | 1.5090 | 1.5085 |
| Young's Modulus (GPa) | 75.6 | 75.7 | 75.6 | 75.6 | 76.5 | 76.1 | 75.8 | 75.0 |
| Shear modulus (GPa) | 31.2 | 31.2 | 31.2 | 31.2 | 31.3 | 31.2 | 31.0 | 30.7 |
| Poisson's ratio | 0.214 | 0.215 | 0.213 | 0.212 | 0.223 | 0.22 | 0.222 | 0.222 |

| Example | 33 | 34 | 35 | 36 | 37 | 38 | 39 | 40 |
|---|---|---|---|---|---|---|---|---|
| $SiO_2$ | 62.14 | 62.37 | 62.30 | 58.65 | 62.26 | 61.69 | 61.79 | 62.34 |
| $Al_2O_3$ | 15.04 | 15.59 | 15.04 | 17.85 | 15.07 | 15.03 | 15.06 | 15.09 |
| $P_2O_5$ | 0.49 | 0.49 | 0.98 | 1.47 | 0.98 | 0.97 | 0.97 | 0.49 |
| $B_2O_3$ | 6.15 | 5.95 | 6.02 | 4.22 | 6.02 | 6.66 | 6.58 | 6.51 |
| MgO | 1.02 | 1.02 | 1.02 | 1.19 | 1.01 | 1.03 | 1.01 | 1.02 |

TABLE 1-continued

| | | | | | | | | |
|---|---|---|---|---|---|---|---|---|
| CaO | 1.22 | 1.22 | 1.23 | 0.00 | 1.22 | 1.22 | 1.22 | 1.22 |
| SrO | 1.03 | 1.03 | 1.03 | 0.00 | 1.02 | 1.03 | 1.02 | 0.51 |
| ZnO | 0.00 | 0.00 | 0.00 | 0.00 | 0.00 | 0.00 | 0.00 | 0.00 |
| $Li_2O$ | 7.49 | 7.92 | 7.46 | 7.70 | 7.95 | 7.47 | 7.96 | 7.41 |
| $Na_2O$ | 5.14 | 4.14 | 4.65 | 8.72 | 4.18 | 4.62 | 4.12 | 5.13 |
| $K_2O$ | 0.21 | 0.21 | 0.21 | 0.07 | 0.22 | 0.21 | 0.21 | 0.22 |
| $TiO_2$ | 0.00 | 0.00 | 0.00 | 0.10 | 0.00 | 0.00 | 0.00 | 0.00 |
| $SnO_2$ | 0.05 | 0.05 | 0.05 | 0.04 | 0.05 | 0.05 | 0.05 | 0.06 |
| $Fe_2O_3$ | 0.01 | 0.01 | 0.01 | 0.00 | 0.01 | 0.01 | 0.01 | 0.01 |
| $ZrO_2$ | 0.00 | 0.00 | 0.00 | 0.00 | 0.00 | 0.00 | 0.00 | 0.00 |
| RO | 3.27 | 3.27 | 3.28 | 1.19 | 3.25 | 3.28 | 3.25 | 2.75 |
| $R_2O$ | 12.84 | 12.27 | 12.32 | 16.49 | 12.35 | 12.30 | 12.29 | 12.76 |
| $Al_2O_3 + R_2O$ | 27.88 | 27.86 | 27.36 | 34.34 | 27.42 | 27.33 | 27.35 | 27.85 |
| $Al_2O_3 + R_2O + B_2O_3$ | 34.03 | 33.81 | 33.38 | 38.56 | 33.44 | 33.99 | 33.93 | 34.36 |
| $(Al_2O_3 - (R_2O + RO))/Li_2O$ | −0.14 | 0.01 | −0.08 | 0.02 | −0.07 | −0.07 | −0.06 | −0.06 |
| $B_2O_3 + P_2O_5 + Al_2O_3)/SiO_2$ | 0.35 | 0.35 | 0.35 | 0.40 | 0.35 | 0.37 | 0.37 | 0.35 |
| Density (g/cm$^3$) | 2.408 | 2.405 | 2.400 | 2.401 | 2.399 | 2.398 | 2.397 | 2.390 |
| CTE (ppm)(fiber) | 6.10 | 5.80 | 5.91 | 7.25 | 5.85 | 5.93 | 5.85 | 6.02 |
| Strain Pt. (fiber) | 537.0 | 553.0 | 544.0 | 543.0 | 545.0 | 541.0 | 538.0 | 546.0 |
| Anneal Pt. (fiber) | 583.0 | 600.0 | 591.0 | 591.0 | 592.0 | 588.0 | 584.0 | 593.0 |
| Softening Pt. (fiber) | 812.9 | 830.5 | 825.8 | 827.2 | 822.4 | 819.3 | 814.3 | 824.1 |
| 10^11 Poises | 660 | 678 | 670 | 670 | 670 | 666 | 661 | 670 |
| Strain Pt. (° C.) | — | — | — | — | — | — | — | — |
| Anneal Pt. (° C.) | — | — | — | — | — | — | — | — |
| Softening Pt. (° C.) | — | — | — | — | — | — | — | — |
| CTE at 500° C. cooling (ppm) | — | — | — | — | — | — | — | — |
| CTE at 300° C. cooling (ppm) | 6.38 | 6.06 | 6.19 | — | 6.12 | 6.17 | 6.12 | 6.29 |
| CTE at 50° C. cooling (ppm | 5.52 | 5.22 | 5.33 | — | 5.26 | 5.36 | 5.29 | 5.39 |
| Fulchers A | −2.926 | −2.735 | −3.113 | −3.372 | −3.049 | −2.815 | −3.066 | −2.983 |
| Fulchers B | 7488.9 | 6806.1 | 7800.8 | 8122.9 | 7690.2 | 7125.0 | 7609.2 | 7549.8 |
| Fulchers To | 104.3 | 177.8 | 101.7 | 75.3 | 100.5 | 133.1 | 103.8 | 103.1 |
| 200 P Temperature (° C.) | 1537 | 1529 | 1543 | 1507 | 1538 | 1526 | 1522 | 1532 |
| 35000 P Temperature (° C.) | 1107 | 1113 | 1120 | 1101 | 1113 | 1101 | 1104 | 1106 |
| 200000 P Temperature (° C.) | 1015 | 1025 | 1029 | 1012 | 1021 | 1011 | 1013 | 1014 |
| Liquidus Viscosity (kP) | 56 | 34 | 60 | 137 | 44 | 62 | 49 | 51 |
| $K_{1C}$ (CN) | — | — | — | — | — | — | — | — |
| Standard Deviation (CN) | — | — | — | — | — | — | — | — |
| SOC (nm/mm/MPa) | 3.138 | 3.135 | 3.156 | — | 3.143 | 3.155 | 3.175 | 3.174 |
| Refractive index | 1.5116 | 1.5123 | 1.5102 | 1.5090 | 1.5110 | 1.5102 | 1.5108 | 1.5099 |
| Young's Modulus (GPa) | 76.8 | 77.2 | 75.8 | — | 76.5 | 75.4 | 76.0 | 75.8 |
| Shear modulus (GPa) | 31.2 | 31.4 | 31.0 | — | 31.2 | 30.8 | 31.0 | 30.9 |
| Poisson's ratio | 0.228 | 0.227 | 0.221 | — | 0.227 | 0.223 | 0.224 | 0.227 |

| Example | 41 | 42 | 43 | 44 | 45 | 46 | 47 | 48 |
|---|---|---|---|---|---|---|---|---|
| $SiO_2$ | 62.24 | 62.23 | 62.30 | 61.33 | 61.86 | 63.44 | 62.89 | 62.90 |
| $Al_2O_3$ | 15.58 | 16.04 | 16.07 | 16.32 | 16.07 | 15.14 | 15.68 | 16.24 |
| $P_2O_5$ | 0.49 | 0.97 | 0.97 | 1.00 | 0.97 | 0.50 | 0.50 | 0.49 |
| $B_2O_3$ | 6.55 | 6.13 | 6.08 | 6.55 | 6.52 | 5.92 | 5.91 | 5.49 |
| MgO | 1.02 | 1.02 | 1.02 | 1.05 | 1.02 | 0.02 | 0.02 | 0.02 |
| CaO | 1.23 | 1.22 | 1.21 | 1.25 | 1.22 | 0.03 | 0.03 | 0.03 |
| SrO | 0.52 | 0.00 | 0.00 | 0.00 | 0.00 | 2.91 | 2.93 | 2.93 |
| ZnO | 0.00 | 0.00 | 0.00 | 0.00 | 0.00 | 0.00 | 0.00 | 0.00 |
| $Li_2O$ | 7.94 | 7.50 | 7.91 | 7.51 | 7.91 | 6.72 | 6.67 | 6.60 |
| $Na_2O$ | 4.16 | 4.62 | 4.16 | 4.69 | 4.15 | 5.06 | 5.09 | 5.03 |
| $K_2O$ | 0.21 | 0.22 | 0.21 | 0.22 | 0.22 | 0.21 | 0.22 | 0.21 |
| $TiO_2$ | 0.00 | 0.00 | 0.00 | 0.00 | 0.00 | 0.00 | 0.00 | 0.00 |
| $SnO_2$ | 0.05 | 0.05 | 0.05 | 0.07 | 0.05 | 0.04 | 0.05 | 0.04 |
| $Fe_2O_3$ | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 |
| RO | 2.77 | 2.24 | 2.23 | 2.30 | 2.24 | 2.96 | 2.98 | 2.98 |
| $R_2O$ | 12.31 | 12.34 | 12.28 | 12.42 | 12.28 | 11.99 | 11.98 | 11.84 |
| $Al_2O_3 + R_2O$ | 27.89 | 28.38 | 28.35 | 28.74 | 28.35 | 27.13 | 27.66 | 28.08 |
| $Al_2O_3 + R_2O + B_2O_3$ | 34.44 | 34.51 | 34.43 | 35.29 | 34.87 | 33.05 | 33.57 | 33.57 |
| $(Al_2O_3 - (R_2O + RO))/Li_2O$ | 0.06 | 0.19 | 0.20 | 0.21 | 0.20 | 0.03 | 0.11 | 0.22 |
| $B_2O_3 + P_2O_5 + Al_2O_3)/SiO_2$ | 0.36 | 0.37 | 0.37 | 0.39 | 0.38 | 0.34 | 0.35 | 0.35 |
| Density (g/cm$^3$) | 2.388 | 2.379 | 2.376 | 2.376 | 2.375 | 2.433 | 2.434 | 2.437 |
| CTE (ppm)(fiber) | 5.69 | 5.59 | 5.60 | 5.62 | 5.61 | 6.16 | 6.14 | 6.08 |
| Strain Pt. (fiber) | 556.0 | 562.0 | 558.0 | 559.0 | 557.0 | 564.0 | 551.7 | 573.7 |
| Anneal Pt. (fiber) | 603.0 | 611.0 | 607.0 | 608.0 | 605.0 | 595.2 | 601.5 | 624.3 |
| Softening Pt. (fiber) | 834.3 | 850.3 | 844.4 | 843.6 | 839.3 | 830.2 | 838.3 | 857.0 |
| 10^11 Poises | 680 | 690 | 685 | 685 | 680 | 670 | 680 | 700 |
| Strain Pt. (° C.) | — | — | — | — | — | — | — | — |
| Anneal Pt. (° C.) | — | — | — | — | — | — | — | — |
| Softening Pt. (° C.) | — | — | — | — | — | — | — | — |
| CTE at 500° C. cooling (ppm) | — | — | — | — | — | — | — | — |
| CTE at 300° C. cooling (ppm) | 6.00 | 5.83 | 5.90 | 5.91 | 5.89 | — | — | — |
| CTE at 50° C. cooling (ppm | 5.16 | 4.89 | 5.09 | 5.09 | 5.06 | — | — | — |
| Fulchers A | −2.814 | −3.042 | −2.909 | −2.964 | −2.789 | −3.144 | −3.212 | −3.472 |
| Fulchers B | 6877.5 | 7510.6 | 7082.9 | 7265.6 | 6806.1 | 8041.5 | 8007.3 | 8416.1 |

TABLE 1-continued

| | | | | | | | | |
|---|---|---|---|---|---|---|---|---|
| Fulchers To | 176.8 | 141.8 | 168.7 | 158.2 | 187.8 | 85.3 | 102.5 | 86.1 |
| 200 P Temperature (° C.) | 1521 | 1547 | 1528 | 1538 | 1525 | 1562 | 1555 | 1544 |
| 35000 P Temperature (° C.) | 1111 | 1132 | 1119 | 1126 | 1116 | 1131 | 1135 | 1136 |
| 200000 P Temperature (° C.) | 1024 | 1042 | 1031 | 1037 | 1029 | 1038 | 1043 | 1045 |
| Liquidus Viscosity (kP) | 36 | 28 | 20 | 21 | 23 | 30 | 25 | 23 |
| $K_{IC}$ (CN) | — | — | — | — | — | — | — | — |
| Standard Deviation (CN) | — | — | — | — | — | — | — | — |
| SOC (nm/mm/MPa) | 3.173 | 3.197 | 3.160 | 3.217 | 3.203 | 3.102 | 3.114 | 3.080 |
| Refractive index | 1.5106 | 1.5088 | 1.5080 | 1.5080 | 1.5087 | 1.5110 | 1.5116 | 1.5122 |
| Young's Modulus (GPa) | 76.5 | 76.1 | 76.1 | 75.7 | 75.7 | 75.5 | 74.3 | 76.0 |
| Shear modulus (GPa) | 31.2 | 31.0 | 31.0 | 30.8 | 31.0 | 30.9 | 30.3 | 31.0 |
| Poisson's ratio | 0.227 | 0.227 | 0.227 | 0.229 | 0.223 | 0.223 | 0.224 | 0.224 |

| Example | 49 | 50 | 51 | 52 | 53 | 54 | 55 | 56 |
|---|---|---|---|---|---|---|---|---|
| $SiO_2$ | 62.91 | 62.63 | 62.09 | 63.57 | 63.02 | 62.48 | 62.87 | 62.25 |
| $Al_2O_3$ | 15.11 | 15.67 | 16.19 | 15.17 | 15.68 | 16.15 | 15.14 | 15.63 |
| $P_2O_5$ | 1.00 | 0.98 | 1.00 | 0.49 | 0.50 | 0.49 | 1.00 | 1.00 |
| $B_2O_3$ | 5.95 | 5.79 | 5.75 | 5.87 | 5.67 | 5.82 | 5.88 | 5.99 |
| MgO | 0.03 | 0.02 | 0.02 | 0.99 | 1.01 | 1.00 | 1.01 | 1.01 |
| CaO | 0.03 | 0.03 | 0.03 | 0.03 | 0.03 | 0.03 | 0.03 | 0.03 |
| SrO | 2.92 | 2.92 | 2.96 | 1.95 | 1.98 | 1.96 | 1.97 | 1.96 |
| ZnO | 0.00 | 0.00 | 0.00 | 0.00 | 0.00 | 0.00 | 0.00 | 0.00 |
| $Li_2O$ | 6.70 | 6.65 | 6.62 | 6.67 | 6.76 | 6.74 | 6.72 | 6.77 |
| $Na_2O$ | 5.08 | 5.05 | 5.06 | 5.02 | 5.08 | 5.06 | 5.11 | 5.11 |
| $K_2O$ | 0.22 | 0.21 | 0.22 | 0.21 | 0.21 | 0.21 | 0.21 | 0.21 |
| $TiO_2$ | 0.00 | 0.00 | 0.00 | 0.00 | 0.00 | 0.00 | 0.00 | 0.00 |
| $SnO_2$ | 0.04 | 0.04 | 0.05 | 0.04 | 0.05 | 0.05 | 0.05 | 0.04 |
| $Fe2O_3$ | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 |
| RO | 2.98 | 2.97 | 3.01 | 2.97 | 3.02 | 2.99 | 3.01 | 3.00 |
| $R_2O$ | 12.00 | 11.91 | 11.90 | 11.90 | 12.05 | 12.01 | 12.04 | 12.09 |
| $Al_2O_3 + R_2O$ | 27.11 | 27.58 | 28.09 | 27.07 | 27.73 | 28.16 | 27.18 | 27.72 |
| $Al_2O_3 + R_2O + B_2O_3$ | 33.06 | 33.37 | 33.84 | 32.94 | 33.40 | 33.98 | 33.06 | 33.71 |
| $(Al_2O_3 - (R_2O + RO))/Li_2O$ | 0.02 | 0.12 | 0.19 | 0.04 | 0.09 | 0.17 | 0.01 | 0.08 |
| $(B_2O_3 + P_2O_5 + Al_2O_3)/SiO_2$ | 0.35 | 0.36 | 0.37 | 0.34 | 0.35 | 0.36 | 0.35 | 0.36 |
| Density (g/cm³) | 2.430 | 2.432 | 2.434 | 2.414 | 2.416 | 2.420 | 2.411 | 2.414 |
| CTE (ppm)(fiber) | 6.19 | 6.20 | 6.01 | 6.00 | 5.93 | 5.95 | 5.97 | 6.01 |
| Strain Pt. (fiber) | 543.3 | 551.2 | 558.9 | 555.0 | 557.0 | 561.0 | 544.0 | 549.0 |
| Anneal Pt. (fiber) | 592.6 | 602.0 | 609.3 | 604.0 | 605.0 | 609.0 | 593.0 | 597.0 |
| Softening Pt. (fiber) | 828.5 | 844.6 | 845.1 | 839.4 | 843.8 | 848.5 | 833.4 | 838.0 |
| 10^11 Poises | 670 | 680 | 680 | 680 | 680 | 690 | 670 | 670 |
| Strain Pt. (° C.) | — | — | — | — | — | — | — | — |
| Anneal Pt. (° C.) | — | — | — | — | — | — | — | — |
| Softening Pt. (° C.) | — | — | — | — | — | — | — | — |
| CTE at 500° C. cooling (ppm) | — | — | — | — | — | — | — | — |
| CTE at 300° C. cooling (ppm) | — | — | — | — | — | — | — | — |
| CTE at 50° C. cooling (ppm | — | — | — | — | — | — | — | — |
| Fulchers A | −3.593 | −3.602 | −3.210 | −3.009 | −3.172 | −3.136 | −3.309 | −3.186 |
| Fulchers B | 9076.8 | 8883.1 | 7844.4 | 7752.3 | 7818.2 | 7662.5 | 8351.7 | 7941.3 |
| Fulchers To | 11.4 | 43.2 | 119.8 | 76.1 | 115.0 | 130.4 | 64.4 | 101.0 |
| 200 P Temperature (° C.) | 1551 | 1548 | 1543 | 1536 | 1543 | 1540 | 1553 | 1548 |
| 35000 P Temperature (° C.) | 1127 | 1134 | 1131 | 1102 | 1128 | 1128 | 1128 | 1128 |
| 200000 P Temperature (° C.) | 1032 | 1041 | 1041 | 1009 | 1038 | 1039 | 1034 | 1037 |
| Liquidus Viscosity (kP) | 43 | 41 | 36 | 40 | 58 | 37 | 146 | 84 |
| $K_{IC}$ (CN) | — | — | — | — | — | — | — | — |
| Standard Deviation (CN) | — | — | — | — | — | — | — | — |
| SOC (nm/mm/MPa) | 3.110 | 3.133 | 3.100 | 3.144 | 3.134 | 3.121 | 3.134 | 3.141 |
| Refractive index | 1.5099 | 1.5106 | 1.5111 | 1.5099 | 1.5106 | 1.5113 | 1.5090 | 1.5096 |
| Young's Modulus (GPa) | 74.5 | 74.8 | 75.4 | 75.7 | 75.8 | 76.3 | 75.1 | 75.4 |
| Shear modulus (GPa) | 30.4 | 30.5 | 30.7 | 30.9 | 31.0 | 31.1 | 30.8 | 30.8 |
| Poisson's ratio | 0.225 | 0.224 | 0.228 | 0.224 | 0.223 | 0.227 | 0.222 | 0.224 |

| Example | 57 | 58 | 59 | 60 | 61 | 62 | 63 | 64 |
|---|---|---|---|---|---|---|---|---|
| $SiO_2$ | 61.80 | 63.23 | 62.75 | 62.77 | 62.77 | 62.36 | 61.91 | 63.44 |
| $Al_2O_3$ | 16.10 | 15.11 | 15.61 | 16.20 | 15.11 | 15.62 | 16.13 | 15.12 |
| $P_2O_5$ | 1.00 | 0.50 | 0.50 | 0.49 | 1.00 | 0.99 | 0.99 | 0.49 |
| $B_2O_3$ | 5.95 | 5.91 | 5.85 | 5.49 | 5.84 | 5.76 | 5.74 | 5.72 |
| MgO | 1.00 | 0.02 | 0.02 | 0.02 | 0.02 | 0.02 | 0.03 | 0.99 |
| CaO | 0.03 | 0.02 | 0.03 | 0.03 | 0.03 | 0.03 | 0.03 | 0.03 |
| SrO | 1.96 | 1.94 | 1.95 | 1.94 | 1.95 | 1.94 | 1.94 | 0.97 |
| ZnO | 0.00 | 0.96 | 0.97 | 0.95 | 0.97 | 0.96 | 0.96 | 0.96 |
| $Li_2O$ | 6.79 | 6.97 | 6.95 | 6.83 | 6.93 | 6.95 | 6.92 | 6.89 |
| $Na_2O$ | 5.10 | 5.07 | 5.10 | 5.03 | 5.11 | 5.10 | 5.09 | 5.12 |
| $K_2O$ | 0.21 | 0.21 | 0.21 | 0.20 | 0.21 | 0.22 | 0.21 | 0.21 |
| $TiO_2$ | 0.00 | 0.00 | 0.00 | 0.00 | 0.00 | 0.00 | 0.00 | 0.00 |
| $SnO_2$ | 0.05 | 0.05 | 0.04 | 0.04 | 0.04 | 0.04 | 0.04 | 0.05 |
| $Fe2O_3$ | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 |

TABLE 1-continued

| | | | | | | | | |
|---|---|---|---|---|---|---|---|---|
| RO | 2.99 | 2.94 | 2.97 | 2.94 | 2.97 | 2.95 | 2.96 | 2.95 |
| $R_2O$ | 12.10 | 12.25 | 12.26 | 12.06 | 12.25 | 12.27 | 12.22 | 12.22 |
| $Al_2O_3 + R_2O$ | 28.20 | 27.36 | 27.87 | 28.26 | 27.36 | 27.89 | 28.35 | 27.34 |
| $Al_2O_3 + R_2O + B_2O_3$ | 34.15 | 33.27 | 33.72 | 33.75 | 33.20 | 33.65 | 34.09 | 33.06 |
| $(Al_2O_3 - (R_2O + RO))/Li_2O$ | 0.15 | −0.01 | 0.05 | 0.18 | −0.02 | 0.06 | 0.14 | −0.01 |
| $B_2O_3 + P_2O_5 + Al_2O_3)/SiO_2$ | 0.37 | 0.34 | 0.35 | 0.35 | 0.35 | 0.36 | 0.37 | 0.34 |
| Density (g/cm³) | 2.417 | 2.426 | 2.429 | 2.433 | 2.424 | 2.426 | 2.430 | 2.410 |
| CTE (ppm)(fiber) | 5.87 | — | — | — | — | — | — | 5.71 |
| Strain Pt. (fiber) | 553.0 | — | — | — | — | — | — | — |
| Anneal Pt. (fiber) | 602.0 | — | — | — | — | — | — | — |
| Softening Pt. (fiber) | 841.9 | — | — | — | — | — | — | — |
| 10^11 Poises | 680 | — | — | — | — | — | — | — |
| Strain Pt. (° C.) | — | 533.9 | 532.8 | 552.3 | 536 | 538.6 | 550.6 | 537.1 |
| Anneal Pt. (° C.) | — | 583.3 | 593.1 | 602 | 584.4 | 588.9 | 600.8 | 586.4 |
| Softening Pt. (° C.) | — | 827.4 | 831.9 | 842.6 | 827.9 | 829.9 | 836.7 | 832.8 |
| CTE at 500° C. cooling (ppm) | — | — | — | — | — | — | — | — |
| CTE at 300° C. cooling (ppm) | — | — | — | — | — | — | — | — |
| CTE at 50° C. cooling (ppm | — | — | — | — | — | — | — | — |
| Fulchers A | −3.086 | −3.451 | −3.512 | −2.985 | −3.455 | −3.072 | −3.439 | −3.557 |
| Fulcher B | 7621.4 | 8743.6 | 8737.4 | 7370.3 | 8772.2 | 7697.8 | 8419.2 | 8908.2 |
| Fulchers To | 127.6 | 31.7 | 45.5 | 147.9 | 23.1 | 111.1 | 70.9 | 27.3 |
| 200 P Temperature (° C.) | 1542 | 1552 | 1549 | 1542 | 1547 | 1544 | 1538 | 1548 |
| 35000 P Temperature (° C.) | 1126 | 1125 | 1130 | 1127 | 1120 | 1122 | 1126 | 1127 |
| 200000 P Temperature (° C.) | 1036 | 1031 | 1037 | 1037 | 1025 | 1030 | 1034 | 1033 |
| Liquidus Viscosity (kP) | 91 | 16 | 14 | 13 | 41 | 26 | 20 | 16 |
| $K_{IC}$ (CN) | — | — | — | — | — | — | — | — |
| Standard Deviation (CN) | — | — | — | — | — | — | — | — |
| SOC (nm/mm/MPa) | 3.110 | 3.184 | 3.177 | 3.167 | 3.188 | 3.153 | 3.154 | 3.169 |
| Refractive index | 1.5105 | 1.5116 | 1.5115 | 1.5124 | 1.5100 | 1.5105 | 1.5116 | 1.5098 |
| Young's Modulus (GPa) | 75.6 | 75.4 | 75.4 | 76.1 | 74.9 | 75.0 | 75.5 | 76.1 |
| Shear modulus (GPa) | 30.8 | 30.8 | 30.8 | 31.0 | 30.6 | 30.6 | 31.0 | 31.0 |
| Poisson's ratio | 0.225 | 0.223 | 0.223 | 0.226 | 0.224 | 0.224 | 0.220 | 0.226 |

| Example | 65 | 66 | 67 | 68 | 69 | 70 | 71 | 72 |
|---|---|---|---|---|---|---|---|---|
| $SiO_2$ | 62.74 | 62.30 | 62.77 | 62.36 | 61.67 | 62.53 | 62.09 | 62.12 |
| $Al_2O_3$ | 15.60 | 16.11 | 15.11 | 15.61 | 16.09 | 15.62 | 15.82 | 16.14 |
| $P_2O_5$ | 0.49 | 0.50 | 0.99 | 0.98 | 0.99 | 0.50 | 0.50 | 0.49 |
| $B_2O_3$ | 5.93 | 5.87 | 5.84 | 5.79 | 5.90 | 5.74 | 5.95 | 5.77 |
| MgO | 1.00 | 1.00 | 1.00 | 1.00 | 1.01 | 0.08 | 0.08 | 0.08 |
| CaO | 0.03 | 0.03 | 0.03 | 0.03 | 0.03 | 3.24 | 3.27 | 3.23 |
| SrO | 0.97 | 0.98 | 0.98 | 0.98 | 0.99 | 0.00 | 0.00 | 0.00 |
| ZnO | 0.96 | 0.96 | 0.97 | 0.96 | 0.98 | 0.00 | 0.00 | 0.00 |
| $Li_2O$ | 6.91 | 6.89 | 6.93 | 6.93 | 6.98 | 6.97 | 7.01 | 6.93 |
| $Na_2O$ | 5.09 | 5.11 | 5.12 | 5.09 | 5.10 | 5.04 | 5.01 | 4.99 |
| $K_2O$ | 0.21 | 0.21 | 0.21 | 0.21 | 0.21 | 0.22 | 0.21 | 0.21 |
| $TiO_2$ | 0.00 | 0.00 | 0.00 | 0.00 | 0.00 | 0.00 | 0.00 | 0.00 |
| $SnO_2$ | 0.05 | 0.05 | 0.05 | 0.05 | 0.05 | 0.05 | 0.05 | 0.05 |
| $Fe2O_3$ | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 |
| RO | 2.96 | 2.97 | 2.98 | 2.97 | 3.01 | 3.32 | 3.35 | 3.31 |
| $R_2O$ | 12.21 | 12.21 | 12.26 | 12.23 | 12.29 | 12.23 | 12.23 | 12.13 |
| $Al_2O_3 + R_2O$ | 27.81 | 28.32 | 27.37 | 27.84 | 28.38 | 27.85 | 28.05 | 28.27 |
| $Al_2O_3 + R_2O + B_2O_3$ | 33.74 | 34.19 | 33.21 | 33.63 | 34.28 | 33.59 | 34.00 | 34.04 |
| $(Al_2O_3 - (R_2O + RO))/Li_2O$ | 0.06 | 0.13 | −0.02 | 0.06 | 0.11 | 0.01 | 0.03 | 0.10 |
| $B_2O_3 + P_2O_5 + Al_2O_3)/SiO_2$ | 0.35 | 0.36 | 0.35 | 0.36 | 0.37 | 0.35 | 0.36 | 0.36 |
| Density (g/cm³) | 2.413 | 2.417 | 2.407 | 2.410 | 2.413 | 2.396 | 2.397 | 2.399 |
| CTE (ppm)(fiber) | 5.68 | 5.67 | 5.85 | 5.70 | 5.64 | 5.94 | 6.00 | 5.95 |
| Strain Pt. (fiber) | — | — | — | — | — | — | — | — |
| Anneal Pt. (fiber) | — | — | — | — | — | — | — | — |
| Softening Pt. (fiber) | — | — | — | — | — | — | — | — |
| 10^11 Poises | — | — | — | — | — | — | — | — |
| Strain Pt. (° C.) | 541.9 | 549.5 | 536.1 | 539.0 | 546.0 | 551.9 | 552.3 | 559.1 |
| Anneal Pt. (° C.) | 591.6 | 599.1 | 585.2 | 589.1 | 594.9 | 600.7 | 601.8 | 609.1 |
| Softening Pt. (° C.) | 832.3 | 841.6 | 829.0 | 829.8 | 833.0 | 835.0 | 835.6 | 837.7 |
| CTE at 500° C. cooling (ppm) | — | — | — | — | — | — | — | — |
| CTE at 300° C. cooling (ppm) | — | — | — | — | — | 6.19 | 6.08 | 6.14 |
| CTE at 50° C. cooling (ppm | — | — | — | — | — | 5.53 | 5.36 | 5.5 |
| Fulchers A | −3.316 | −3.012 | −3.664 | −3.447 | −3.661 | −3.213 | −3.048 | −3.151 |
| Fulchers B | 8164.3 | 7349.8 | 9129.5 | 8544.5 | 8922.5 | 7971.3 | 7478.2 | 7732.2 |
| Fulchers To | 85.7 | 144.0 | 14.7 | 55.2 | 36.9 | 84.8 | 121 | 120.7 |
| 200 P Temperature (° C.) | 1539 | 1527 | 1545 | 1542 | 1533 | 1530 | 1519 | 1539 |
| 35000 P Temperature (° C.) | 1124 | 1117 | 1127 | 1124 | 1124 | 1112 | 1106 | 1126 |
| 200000 P Temperature (° C.) | 1033 | 1028 | 1033 | 1032 | 1032 | 1021 | 1017 | 1036 |
| Liquidus Viscosity (kP) | 13 | 8 | 19 | 10 | 12 | 48 | 36 | 56 |
| $K_{IC}$ (CN) | — | — | — | — | — | — | — | — |
| Standard Deviation (CN) | — | — | — | — | — | — | — | — |
| SOC (nm/mm/MPa) | 3.166 | 3.157 | 3.213 | 3.194 | 3.178 | 3.111 | 3.137 | 3.113 |
| Refractive index | 1.5105 | 1.5113 | 1.5087 | 1.5096 | 1.5104 | 1.5124 | 1.5121 | 1.5132 |
| Young's Modulus (GPa) | 76.7 | 76.7 | 75.4 | 75.7 | 76.0 | 76.5 | 76.6 | 76.7 |

TABLE 1-continued

| | | | | | | | | |
|---|---|---|---|---|---|---|---|---|
| Shear modulus (GPa) | 31.2 | 31.4 | 30.8 | 31.0 | 31.1 | 31.2 | 31.3 | 31.2 |
| Poisson's ratio | 0.226 | 0.222 | 0.222 | 0.223 | 0.223 | 0.225 | 0.225 | 0.227 |

| Example | 73 | 74 | 75 | 76 | 77 | 78 | 79 | 80 |
|---|---|---|---|---|---|---|---|---|
| $SiO_2$ | 62.33 | 62.40 | 62.26 | 62.67 | 63.66 | 64.61 | 62.63 | 63.59 |
| $Al_2O_3$ | 15.86 | 15.88 | 15.87 | 16.02 | 16.03 | 16.01 | 16.03 | 16.02 |
| $P_2O_5$ | 0.49 | 0.49 | 0.49 | 0.50 | 0.49 | 0.50 | 0.50 | 0.50 |
| $B_2O_3$ | 5.77 | 5.75 | 5.92 | 5.01 | 4.04 | 3.09 | 5.02 | 4.08 |
| MgO | 0.09 | 0.08 | 0.08 | 0.08 | 0.09 | 0.08 | 0.08 | 0.08 |
| CaO | 3.23 | 3.22 | 3.24 | 3.25 | 3.25 | 3.27 | 3.28 | 3.29 |
| SrO | 0.00 | 0.00 | 0.00 | 0.00 | 0.00 | 0.00 | 0.00 | 0.00 |
| ZnO | 0.00 | 0.00 | 0.00 | 0.01 | 0.01 | 0.01 | 0.01 | 0.01 |
| $Li_2O$ | 7.17 | 7.38 | 7.58 | 7.35 | 7.33 | 7.29 | 7.60 | 7.56 |
| $Na_2O$ | 4.79 | 4.54 | 4.29 | 4.83 | 4.82 | 4.85 | 4.58 | 4.58 |
| $K_2O$ | 0.21 | 0.21 | 0.21 | 0.21 | 0.21 | 0.21 | 0.21 | 0.21 |
| $TiO_2$ | 0.00 | 0.00 | 0.00 | 0.01 | 0.01 | 0.01 | 0.01 | 0.01 |
| $SnO_2$ | 0.05 | 0.04 | 0.05 | 0.05 | 0.05 | 0.05 | 0.05 | 0.06 |
| $Fe_2O_3$ | 0.01 | 0.01 | 0.01 | 0.01 | 0.01 | 0.01 | 0.01 | 0.01 |
| $ZrO_2$ | 0.00 | 0.00 | 0.00 | 0.00 | 0.00 | 0.00 | 0.00 | 0.00 |
| RO | 3.32 | 3.30 | 3.32 | 3.34 | 3.35 | 3.36 | 3.37 | 3.38 |
| $R_2O$ | 12.17 | 12.13 | 12.08 | 12.39 | 12.36 | 12.35 | 12.39 | 12.35 |
| $Al_2O_3 + R_2O$ | 28.03 | 28.01 | 27.95 | 28.41 | 28.39 | 28.36 | 28.42 | 28.37 |
| $Al_2O_3 + R_2O + B_2O_3$ | 33.80 | 33.76 | 33.87 | 33.42 | 32.43 | 31.45 | 33.44 | 32.45 |
| $(Al_2O_3 - (R_2O + RO))/Li_2O$ | 0.05 | 0.06 | 0.06 | 0.04 | 0.04 | 0.04 | 0.04 | 0.04 |
| $B_2O_3 + P_2O_5 + Al_2O_3)/SiO_2$ | 0.35 | 0.35 | 0.36 | 0.34 | 0.32 | 0.30 | 0.34 | 0.32 |
| Density (g/cm³) | 2.397 | 2.396 | 2.396 | 2.402 | 2.407 | 2.410 | 2.401 | 2.406 |
| CTE (ppm)(fiber) | 5.84 | 5.90 | 5.84 | — | — | — | — | — |
| Strain Pt. (fiber) | — | — | — | — | — | — | — | — |
| Anneal Pt. (fiber) | — | — | — | — | — | — | — | — |
| Softening Pt. (fiber) | — | — | — | — | — | — | — | — |
| 10^11 Poises | — | — | — | — | — | — | — | — |
| Strain Pt. (° C.) | 556.6 | 556.0 | 559.3 | 570.3 | 579.7 | 591.9 | 570.7 | 579.6 |
| Anneal Pt. (° C.) | 605.4 | 605.4 | 608.3 | 619.5 | 629.5 | 642.5 | 619.5 | 629.1 |
| Softening Pt. (° C.) | 833.5 | 837.1 | 834.0 | 845.7 | 863.3 | 877.8 | 848.2 | 862.7 |
| CTE at 500° C. cooling (ppm) | — | 6.62 | 6.51 | — | — | — | — | — |
| CTE at 300° C. cooling (ppm) | 6.18 | 6.11 | 6.00 | — | — | — | — | — |
| CTE at 50° C. cooling (ppm) | 5.56 | 5.29 | 5.23 | — | — | — | — | — |
| Fulchers A | −3.217 | −2.706 | −3.219 | −3.361 | −3.375 | −3.230 | −3.019 | −2.946 |
| Fulchers B | 7909.5 | 6657.5 | 7819.8 | 8084.3 | 8299.3 | 8109.8 | 7298.5 | 7352.0 |
| Fulchers To | 100.3 | 198.9 | 103.0 | 110.0 | 105.5 | 129.0 | 164.9 | 163.1 |
| 200 P Temperature (° C.) | 1534 | 1529 | 1520 | 1538 | 1568 | 1595 | 1537 | 1564 |
| 35000 P Temperature (° C.) | 1119 | 1117 | 1110 | 1133 | 1154 | 1172 | 1130 | 1145 |
| 200000 P Temperature (° C.) | 1029 | 1030 | 1021 | 1043 | 1062 | 1080 | 1042 | 1055 |
| Liquidus Viscosity (kP) | 65 | 53 | 38 | 58 | 53 | 52 | 67 | 42 |
| $K_{1C}$ (CN) | — | — | — | — | — | — | — | — |
| Standard Deviation (CN) | — | — | — | — | — | — | — | — |
| SOC (nm/mm/MPa) | 3.129 | 3.088 | 3.113 | 3.069 | 3.052 | 2.999 | 3.085 | 3.034 |
| Refractive index | 1.5129 | 1.5128 | 1.5131 | 1.5128 | 1.5128 | 1.5129 | 1.5130 | 1.5131 |
| Young's Modulus (GPa) | 76.9 | 76.8 | 77.2 | 77.2 | 78.1 | 79.0 | 77.4 | 78.2 |
| Shear modulus (GPa) | 31.4 | 31.4 | 31.5 | 31.7 | 32.2 | 32.7 | 31.9 | 32.1 |
| Poisson's ratio | 0.226 | 0.225 | 0.224 | 0.218 | 0.213 | 0.209 | 0.216 | 0.217 |

| Example | 81 | 82 | 83 | 84 | 85 | 86 | 87 | 88 |
|---|---|---|---|---|---|---|---|---|
| $SiO_2$ | 64.62 | 63.28 | 64.31 | 65.16 | 63.39 | 64.20 | 65.16 | 62.64 |
| $Al_2O_3$ | 16.03 | 15.56 | 15.56 | 15.51 | 15.58 | 15.55 | 15.54 | 16.06 |
| $P_2O_5$ | 0.49 | 0.48 | 0.49 | 0.48 | 0.49 | 0.50 | 0.50 | 0.99 |
| $B_2O_3$ | 3.06 | 5.05 | 3.83 | 3.06 | 4.78 | 3.94 | 3.00 | 4.87 |
| MgO | 0.09 | 0.08 | 0.08 | 0.08 | 0.08 | 0.08 | 0.09 | 0.95 |
| CaO | 3.26 | 3.19 | 3.27 | 3.21 | 3.24 | 3.29 | 3.26 | 0.02 |
| SrO | 0.00 | 0.00 | 0.00 | 0.00 | 0.00 | 0.00 | 0.00 | 2.03 |
| ZnO | 0.01 | 0.00 | 0.00 | 0.00 | 0.00 | 0.00 | 0.00 | 0.00 |
| $Li_2O$ | 7.59 | 7.34 | 7.36 | 7.40 | 7.59 | 7.59 | 7.58 | 7.62 |
| $Na_2O$ | 4.58 | 4.75 | 4.81 | 4.83 | 4.57 | 4.58 | 4.60 | 4.55 |
| $K_2O$ | 0.21 | 0.20 | 0.21 | 0.21 | 0.21 | 0.21 | 0.21 | 0.21 |
| $TiO_2$ | 0.01 | 0.01 | 0.01 | 0.01 | 0.01 | 0.01 | 0.01 | 0.01 |
| $SnO_2$ | 0.05 | 0.05 | 0.05 | 0.05 | 0.04 | 0.05 | 0.05 | 0.05 |
| $Fe_2O_3$ | 0.01 | 0.01 | 0.01 | 0.01 | 0.01 | 0.01 | 0.01 | 0.00 |
| $ZrO_2$ | 0.00 | 0.00 | 0.00 | 0.00 | 0.00 | 0.00 | 0.00 | 0.00 |
| RO | 3.36 | 3.27 | 3.35 | 3.29 | 3.32 | 3.37 | 3.35 | 3.00 |
| $R_2O$ | 12.38 | 12.29 | 12.38 | 12.44 | 12.37 | 12.38 | 12.39 | 12.38 |
| $Al_2O_3 + R_2O$ | 28.41 | 27.85 | 27.94 | 27.95 | 27.95 | 27.93 | 27.93 | 28.44 |
| $Al_2O_3 + R_2O + B_2O_3$ | 31.47 | 32.90 | 31.77 | 31.01 | 32.73 | 31.87 | 30.93 | 33.31 |
| $(Al_2O_3 - (R_2O + RO))/Li_2O$ | 0.04 | 0.00 | −0.02 | −0.03 | −0.01 | −0.03 | −0.03 | 0.09 |
| $B_2O_3 + P_2O_5 + Al_2O_3)/SiO_2$ | 0.30 | 0.33 | 0.31 | 0.29 | 0.33 | 0.31 | 0.29 | 0.35 |
| Density (g/cm³) | 2.410 | 2.399 | 2.404 | 2.408 | 2.399 | 2.402 | 2.407 | 2.420 |
| CTE (ppm)(fiber) | — | — | — | — | — | — | — | — |
| Strain Pt. (fiber) | — | — | — | — | — | — | — | — |
| Anneal Pt. (fiber) | — | — | — | — | — | — | — | — |

TABLE 1-continued

| | | | | | | | | |
|---|---|---|---|---|---|---|---|---|
| Softening Pt. (fiber) | — | — | — | — | — | — | — | — |
| 10^11 Poises | — | — | — | — | — | — | — | — |
| Strain Pt. (° C.) | 588.5 | 566.5 | 571.8 | 587.6 | 566.8 | 575.8 | 584.9 | 561.7 |
| Anneal Pt. (° C.) | 638.8 | 615.3 | 622.2 | 637.8 | 616.3 | 625.0 | 634.5 | 611.7 |
| Softening Pt. (° C.) | 878.7 | 841.6 | 856.5 | 872.7 | 843.1 | 858.0 | 872.4 | 849.4 |
| CTE at 500° C. cooling (ppm) | — | — | — | — | — | — | — | — |
| CTE at 300° C. cooling (ppm) | — | — | — | — | — | — | — | — |
| CTE at 50° C. cooling (ppm | — | — | — | — | — | — | — | — |
| Fulchers A | −3.222 | −3.144 | −3.150 | −3.160 | −2.935 | −3.109 | −3.129 | −3.194 |
| Fulchers B | 7976.4 | 7705.0 | 7988.2 | 7860.8 | 7367.5 | 7845.6 | 8000.4 | 7899.4 |
| Fulchers To | 142.8 | 129.5 | 115.8 | 145.7 | 140.2 | 124.4 | 125.6 | 123.5 |
| 200 P Temperature (° C.) | 1587 | 1545 | 1581 | 1585 | 1547 | 1575 | 1599 | 1561 |
| 35000 P Temperature (° C.) | 1170 | 1132 | 1154 | 1166 | 1125 | 1150 | 1168 | 1144 |
| 200000 P Temperature (° C.) | 1079 | 1042 | 1061 | 1075 | 1035 | 1057 | 1075 | 1053 |
| Liquidus Viscosity (kP) | 42 | 52 | 49 | 51 | 38 | 59 | 52 | 65 |
| $K_{1C}$ (CN) | — | — | — | — | — | — | — | — |
| Standard Deviation (CN) | — | — | — | — | — | — | — | — |
| SOC (nm/mm/MPa) | 3.004 | 3.07 | 3.05 | 3.02 | 3.08 | 3.06 | 3.04 | 3.095 |
| Refractive index | 1.5131 | 1.5122 | 1.5125 | 1.5124 | 1.5125 | 1.5123 | 1.5126 | 1.5110 |
| Young's Modulus (GPa) | 79.5 | 77.3 | 78.5 | 79.0 | 77.4 | 78.2 | 79.2 | 76.80 |
| Shear modulus (GPa) | 32.6 | 31.7 | 32.0 | 32.5 | 31.6 | 32.1 | 32.4 | 31.40 |
| Poisson's ratio | 0.220 | 0.22 | 0.225 | 0.215 | 0.224 | 0.218 | 0.222 | 0.224 |

| Example | 89 | 90 | 91 | 92 | 93 | 94 | 95 | 96 |
|---|---|---|---|---|---|---|---|---|
| $SiO_2$ | 63.60 | 64.55 | 62.65 | 63.59 | 64.59 | 63.64 | 64.57 | 65.48 |
| $Al_2O_3$ | 16.04 | 16.05 | 16.06 | 16.07 | 16.05 | 15.05 | 15.04 | 15.02 |
| $P_2O_5$ | 0.98 | 0.99 | 0.99 | 0.99 | 0.98 | 0.99 | 0.99 | 0.98 |
| $B_2O_3$ | 3.99 | 2.99 | 4.93 | 3.95 | 3.01 | 4.94 | 4.01 | 3.08 |
| MgO | 0.95 | 0.95 | 0.96 | 0.95 | 0.96 | 0.96 | 0.96 | 0.95 |
| CaO | 0.02 | 0.02 | 0.02 | 0.02 | 0.02 | 0.02 | 0.02 | 0.02 |
| SrO | 2.02 | 2.03 | 2.02 | 2.03 | 2.02 | 2.02 | 2.02 | 2.04 |
| ZnO | 0.00 | 0.00 | 0.00 | 0.00 | 0.00 | 0.00 | 0.00 | 0.00 |
| $Li_2O$ | 7.60 | 7.58 | 7.81 | 7.79 | 7.79 | 7.55 | 7.57 | 7.61 |
| $Na_2O$ | 4.54 | 4.57 | 4.30 | 4.32 | 4.31 | 4.55 | 4.55 | 4.55 |
| $K_2O$ | 0.21 | 0.21 | 0.21 | 0.21 | 0.21 | 0.21 | 0.21 | 0.21 |
| $TiO_2$ | 0.01 | 0.01 | 0.01 | 0.01 | 0.01 | 0.01 | 0.01 | 0.01 |
| $SnO_2$ | 0.04 | 0.04 | 0.04 | 0.04 | 0.04 | 0.04 | 0.05 | 0.04 |
| $Fe2O_3$ | 0.00 | 0.00 | 0.00 | 0.00 | 0.00 | 0.00 | 0.00 | 0.00 |
| $ZrO_2$ | 0.00 | 0.00 | 0.00 | 0.00 | 0.00 | 0.00 | 0.00 | 0.00 |
| RO | 2.99 | 3.00 | 3.00 | 3.00 | 3.00 | 3.00 | 3.00 | 3.01 |
| $R_2O$ | 12.35 | 12.36 | 12.32 | 12.32 | 12.31 | 12.31 | 12.33 | 12.37 |
| $Al_2O_3 + R_2O$ | 28.39 | 28.41 | 28.38 | 28.39 | 28.36 | 27.36 | 27.37 | 27.39 |
| $Al_2O_3 + R_2O + B_2O_3$ | 32.38 | 31.40 | 33.31 | 32.34 | 31.37 | 32.30 | 31.38 | 30.47 |
| $(Al_2O_3 − (R_2O + RO))/Li_2O$ | 0.09 | 0.09 | 0.09 | 0.10 | 0.09 | −0.03 | −0.04 | −0.05 |
| $B_2O_3 + P_2O_5 + Al_2O_3)/SiO_2$ | 0.33 | 0.31 | 0.35 | 0.33 | 0.31 | 0.33 | 0.31 | 0.29 |
| Density (g/cm³) | 2.424 | 2.429 | 2.420 | 2.423 | 2.428 | 2.414 | 2.418 | 2.422 |
| CTE (ppm)(fiber) | — | — | — | — | — | — | — | — |
| Strain Pt. (fiber) | — | — | — | — | — | — | — | — |
| Anneal Pt. (fiber) | — | — | — | — | — | — | — | — |
| Softening Pt. (fiber) | — | — | — | — | — | — | — | — |
| 10^11 Poises | — | — | — | — | — | — | — | — |
| Strain Pt. (° C.) | 573.4 | 586.5 | 564.1 | 573.8 | 587.6 | 543.7 | 558.8 | 574.2 |
| Anneal Pt. (° C.) | 624.3 | 637.9 | 614.3 | 624.9 | 638.6 | 594.4 | 609.4 | 625.0 |
| Softening Pt. (° C.) | 864.9 | 884.5 | 852.2 | 868.0 | 880.5 | 837.5 | 857.2 | 873.7 |
| CTE at 500° C. cooling (ppm) | — | — | — | — | — | — | — | — |
| CTE at 300° C. cooling (ppm) | — | — | — | — | — | — | — | — |
| CTE at 50° C. cooling (ppm | — | — | — | — | — | — | — | — |
| Fulchers A | −3.27 | −3.411 | −2.987 | −3.219 | −3.204 | −3.106 | −3.463 | −3.414 |
| Fulchers B | 8145.8 | 8361.2 | 7358.5 | 7949.6 | 8043.9 | 7917.5 | 8839.2 | 8801.6 |
| Fulchers To | 117.2 | 117.3 | 155.5 | 131.8 | 136.9 | 100.7 | 57 | 73.1 |
| 200 P Temperature (° C.) | 1579 | 1581 | 1547 | 1572 | 1598 | 1565 | 1591 | 1613 |
| 35000 P Temperature (° C.) | 1160 | 1168 | 1133 | 1156 | 1175 | 1136 | 1161 | 1179 |
| 200000 P Temperature (° C.) | 1068 | 1077 | 1043 | 1065 | 1083 | 1042 | 1066 | 1083 |
| Liquidus Viscosity (kP) | 59 | 53 | 48 | 51 | 42 | 60 | 65 | 57 |
| $K_{1C}$ (CN) | — | — | — | — | — | — | — | — |
| Standard Deviation (CN) | — | — | — | — | — | — | — | — |
| SOC (nm/mm/MPa) | 3.064 | 3.049 | 3.113 | 3.077 | 3.022 | 3.110 | 3.084 | 3.069 |
| Refractive index | 1.5108 | 1.5109 | 1.5113 | 1.5110 | 1.5113 | 1.5094 | 1.5097 | 1.5094 |
| Young's Modulus (GPa) | 76.80 | 78.60 | 77.00 | 77.70 | 78.70 | 76.3 | 76.9 | 77.9 |
| Shear modulus (GPa) | 31.40 | 32.20 | 31.40 | 31.90 | 32.30 | 31.2 | 31.5 | 32.0 |
| Poisson's ratio | 0.223 | 0.220 | 0.224 | 0.219 | 0.219 | 0.224 | 0.22 | 0.218 |

| Example | 97 | 98 | 99 | 100 | 101 | 102 | 103 | 104 |
|---|---|---|---|---|---|---|---|---|
| $SiO_2$ | 63.60 | 64.62 | 65.51 | 59.72 | 58.63 | 59.71 | 59.31 | 60.04 |
| $Al_2O_3$ | 15.08 | 15.05 | 15.05 | 17.65 | 18.08 | 18.12 | 17.81 | 17.46 |
| $P_2O_5$ | 1.00 | 0.99 | 0.99 | 0.00 | 0.48 | 0.49 | 1.90 | 1.78 |
| $B_2O_3$ | 4.94 | 3.94 | 3.04 | 4.52 | 4.60 | 4.42 | 3.65 | 2.90 |
| MgO | 0.97 | 0.96 | 0.96 | 0.97 | 0.97 | 0.04 | 0.02 | 0.62 |

TABLE 1-continued

| | | | | | | | | |
|---|---|---|---|---|---|---|---|---|
| CaO | 0.02 | 0.02 | 0.02 | 0.99 | 0.99 | 1.00 | 0.19 | 0.06 |
| SrO | 2.02 | 2.03 | 2.02 | 1.03 | 1.03 | 1.03 | 0.00 | 0.00 |
| ZnO | 0.00 | 0.00 | 0.00 | 0.00 | 0.00 | 0.00 | 0.00 | 0.00 |
| $Li_2O$ | 7.81 | 7.84 | 7.83 | 6.89 | 6.46 | 6.94 | 8.74 | 8.53 |
| $Na_2O$ | 4.30 | 4.29 | 4.32 | 7.72 | 8.26 | 7.74 | 8.04 | 7.90 |
| $K_2O$ | 0.21 | 0.21 | 0.21 | 0.44 | 0.45 | 0.44 | 0.27 | 0.48 |
| $TiO_2$ | 0.01 | 0.01 | 0.01 | 0.01 | 0.00 | 0.01 | 0.00 | 0.17 |
| $SnO_2$ | 0.04 | 0.05 | 0.05 | 0.04 | 0.05 | 0.05 | 0.05 | 0.04 |
| $Fe2O_3$ | 0.00 | 0.00 | 0.00 | 0.01 | 0.01 | 0.01 | 0.02 | 0.02 |
| $ZrO_2$ | 0.00 | 0.00 | 0.00 | 0.00 | 0.00 | 0.00 | 0.01 | 0.01 |
| RO | 3.01 | 3.01 | 3.00 | 2.99 | 2.99 | 2.07 | 0.21 | 0.68 |
| $R_2O$ | 12.32 | 12.34 | 12.36 | 15.05 | 15.17 | 15.12 | 17.05 | 16.91 |
| $Al_2O_3 + R_2O$ | 27.40 | 27.39 | 27.41 | 32.70 | 33.25 | 33.24 | 34.86 | 34.37 |
| $Al_2O_3 + R_2O + B_2O_3$ | 32.34 | 31.33 | 30.45 | 37.22 | 37.85 | 37.66 | 38.51 | 37.27 |
| $(Al_2O_3 - (R_2O + RO))/Li_2O$ | −0.03 | −0.04 | −0.04 | −0.06 | −0.01 | 0.13 | 0.06 | −0.02 |
| $B_2O_3 + P_2O_5 + Al_2O_3)/SiO_2$ | 0.33 | 0.31 | 0.29 | 0.37 | 0.40 | 0.39 | 0.39 | 0.37 |
| Density (g/cm$^3$) | 2.414 | 2.417 | 2.422 | 2.440 | 2.441 | 2.431 | 2.400 | 2.400 |
| CTE (ppm)(fiber) | — | — | — | — | — | — | 7.40 | 7.40 |
| Strain Pt. (fiber) | — | — | — | — | — | — | 546.0 | 550.0 |
| Anneal Pt. (fiber) | — | — | — | — | — | — | 596.0 | 599.0 |
| Softening Pt. (fiber) | — | — | — | — | — | — | 837.0 | 843.9 |
| 10^11 Poises | — | — | — | 670 | 680 | 695 | 678 | 681 |
| Strain Pt. (° C.) | 548.5 | 559.0 | 573.9 | 547.2 | 555.6 | 569.5 | 543.4 | 546.8 |
| Anneal Pt. (° C.) | 598.4 | 609.5 | 624.6 | 595.1 | 604.2 | 619.1 | 592.9 | 597.1 |
| Softening Pt. (° C.) | 837.7 | 853.5 | 871.8 | 828.1 | 837.3 | 852.1 | 833.3 | 843.3 |
| CTE at 500° C. cooling (ppm) | — | — | — | 7.85 | 7.90 | 7.71 | 8.28 | 8.21 |
| CTE at 300° C. cooling (ppm) | — | — | — | 7.24 | 7.30 | 7.16 | 7.77 | 7.59 |
| CTE at 50° C. cooling (ppm | — | — | — | 6.3 | 6.33 | 6.23 | 6.88 | 6.70 |
| Fulchers A | −3.139 | −3.324 | −3.224 | −3.606 | −2.981 | −3.189 | −3.263 | −3.370 |
| Fulchers B | 7850.8 | 8461.5 | 8272.0 | 8640.4 | 7138.9 | 7658.2 | 8028.0 | 8309.0 |
| Fulchers To | 112 | 82.9 | 105.2 | 43.2 | 162 | 129.6 | 94.8 | 76.6 |
| 200 P Temperature (° C.) | 1555 | 1587 | 1602 | 1506 | 1514 | 1525 | 1538 | 1542 |
| 35000 P Temperature (° C.) | 1134 | 1158 | 1170 | 1103 | 1111 | 1120 | 1123 | 1127 |
| 200000 P Temperature (° C.) | 1042 | 1064 | 1076 | 1013 | 1024 | 1032 | 1032 | 1035 |
| Liquidus Viscosity (kP) | 45 | 48 | 45 | — | — | — | 64 | 67 |
| $K_{1C}$ (CN) | — | — | — | — | — | — | 0.76 | 0.746 |
| Standard Deviation (CN) | — | — | — | — | — | — | 0.016 | 0.016 |
| SOC (nm/mm/MPa) | 3.104 | 3.099 | 3.063 | 2.984 | 2.990 | 3.037 | 3.05 | 3.03 |
| Refractive index | 1.5102 | 1.5096 | 1.5099 | 1.5157 | 1.5146 | 1.5133 | 1.5089 | 1.5097 |
| Young's Modulus (GPa) | 76.1 | 77.0 | 78.1 | 78.1 | 77.5 | 76.9 | 75.9 | 71.2 |
| Shear modulus (GPa) | 31.2 | 31.6 | 32.1 | 31.9 | 31.5 | 31.4 | 31.0 | 29.2 |
| Poisson's ratio | 0.22 | 0.217 | 0.218 | 0.225 | 0.229 | 0.225 | 0.223 | 0.219 |

| Example | 105 | 106 | 107 | 108 | 109 | 110 | 111 | 112 |
|---|---|---|---|---|---|---|---|---|
| $SiO_2$ | 58.89 | 57.75 | 62.08 | 62.36 | 62.50 | 58.49 | 58.72 | 59.16 |
| $Al_2O_3$ | 17.35 | 18.03 | 16.27 | 15.66 | 15.20 | 18.02 | 18.22 | 17.90 |
| $P_2O_5$ | 0.78 | 1.04 | 0.70 | 0.87 | 1.01 | 1.47 | 2.05 | 1.88 |
| $B_2O_3$ | 4.56 | 4.73 | 5.02 | 5.47 | 5.86 | 4.22 | 3.12 | 3.61 |
| MgO | 1.76 | 1.70 | 0.07 | 0.58 | 0.96 | 1.19 | 1.06 | 0.03 |
| CaO | 0.29 | 0.05 | 3.07 | 1.46 | 0.23 | 0.04 | 0.13 | 0.16 |
| SrO | 0.72 | 0.97 | 0.01 | 1.08 | 1.86 | 0.00 | 0.00 | 0.00 |
| ZnO | 0.00 | 0.00 | 0.00 | 0.00 | 0.00 | 0.00 | 0.00 | 0.00 |
| $Li_2O$ | 6.33 | 6.46 | 7.63 | 7.22 | 6.87 | 7.90 | 8.51 | 8.93 |
| $Na_2O$ | 8.95 | 8.99 | 4.69 | 4.86 | 5.06 | 8.52 | 7.86 | 7.99 |
| $K_2O$ | 0.13 | 0.05 | 0.21 | 0.21 | 0.22 | 0.07 | 0.27 | 0.26 |
| $TiO_2$ | 0.18 | 0.18 | 0.17 | 0.17 | 0.17 | 0.01 | 0.01 | 0.00 |
| $SnO_2$ | 0.04 | 0.03 | 0.05 | 0.04 | 0.05 | 0.05 | 0.05 | 0.06 |
| $Fe2O_3$ | 0.01 | 0.01 | 0.02 | 0.02 | 0.01 | 0.01 | 0.01 | 0.02 |
| $ZrO_2$ | 0.01 | 0.01 | 0.01 | 0.01 | 0.01 | 0.01 | 0.00 | 0.00 |
| RO | 2.77 | 2.72 | 3.15 | 3.12 | 3.05 | 1.23 | 1.19 | 0.19 |
| $R_2O$ | 15.41 | 15.50 | 12.53 | 12.29 | 12.15 | 16.49 | 16.64 | 17.18 |
| $Al_2O_3 + R_2O$ | 32.76 | 33.53 | 28.80 | 27.95 | 27.35 | 34.51 | 34.86 | 35.08 |
| $Al_2O_3 + R_2O + B_2O_3$ | 37.32 | 38.26 | 33.82 | 33.42 | 33.21 | 38.73 | 37.98 | 38.69 |
| $(Al_2O_3 - (R_2O + RO))/Li_2O$ | −0.13 | −0.03 | 0.08 | 0.03 | 0.00 | 0.04 | 0.05 | 0.06 |
| $B_2O_3 + P_2O_5 + Al_2O_3)/SiO_2$ | 0.39 | 0.41 | 0.35 | 0.35 | 0.35 | 0.41 | 0.40 | 0.40 |
| Density (g/cm$^3$) | 2.424 | 2.428 | 2.397 | 2.402 | 2.406 | 2.401 | 2.42 | 2.40 |
| CTE (ppm)(fiber) | — | 7.00 | 5.90 | 5.90 | 5.90 | 7.20 | — | — |
| Strain Pt. (fiber) | 542.0 | 549.0 | 561.0 | 549.0 | 539.0 | 547.0 | — | — |
| Anneal Pt. (fiber) | 589.0 | 596.0 | 610.0 | 598.0 | 588.0 | 596.0 | — | — |
| Softening Pt. (fiber) | 821.0 | 829.9 | 842.5 | 836.1 | 831.5 | 829.3 | — | — |
| 10^11 Poises | 667 | 675 | 690 | 679 | 670 | 676 | 705 | 686 |
| Strain Pt. (° C.) | — | 542.9 | 557.6 | 544.1 | 537.7 | 543.2 | 575.3 | 555.0 |
| Anneal Pt. (° C.) | — | 591.8 | 606.8 | 593.2 | 587.2 | 592.0 | 624.3 | 604.2 |
| Softening Pt. (° C.) | — | 825.5 | 839.2 | 832.3 | 823.4 | 827.9 | 858.8 | 843.8 |
| CTE at 500° C. cooling (ppm) | — | 7.93 | 6.67 | — | 7.05 | 8.00 | 7.91 | 8.12 |
| CTE at 300° C. cooling (ppm) | — | 7.28 | 6.15 | — | 6.38 | 7.36 | 7.44 | 7.60 |
| CTE at 50° C. cooling (ppm | — | 6.47 | 5.44 | — | 5.56 | 6.50 | 6.62 | 6.77 |
| Fulchers A | −3.261 | −3.262 | −2.975 | −3.274 | −3.298 | −3.263 | −2.912 | −3.213 |
| Fulchers B | 7924.5 | 7779.1 | 7211.6 | 8173.3 | 8317.3 | 7886.2 | 7076.6 | 7873.9 |

TABLE 1-continued

| | | | | | | | | |
|---|---|---|---|---|---|---|---|---|
| Fulchers To | 89.4 | 99.9 | 158.0 | 77.6 | 59.2 | 94.8 | 185.4 | 108.4 |
| 200 P Temperature (° C.) | 1514 | 1498 | 1525 | 1544 | 1545 | 1512 | 1543 | 1536 |
| 35000 P Temperature (° C.) | 1105 | 1096 | 1117 | 1123 | 1120 | 1105 | 1135 | 1123 |
| 200000 P Temperature (° C.) | 1015 | 1008 | 1029 | 1031 | 1026 | 1016 | 1047 | 1033 |
| Liquidus Viscosity (kP) | 162 | 43 | 44 | 83 | 152 | 89 | 29 | 59 |
| $K_{1C}$ (CN) | — | 0.753 | 0.759 | — | 0.747 | 0.71 | 0.722 | 0.736 |
| Standard Deviation (CN) | — | 0.006 | 0.01 | — | 0.005 | 0.007 | 0.022 | 0.024 |
| SOC (nm/mm/MPa) | — | 3.01 | 3.05 | 3.10 | 3.15 | 3.05 | 2.98 | 3.02 |
| Refractive index | — | 1.5136 | 1.5145 | 1.5117 | 1.5103 | 1.5106 | 1.5103 | 1.5092 |
| Young's Modulus (GPa) | — | 77.1 | 78.3 | — | 75.6 | 76.9 | 78.3 | 76.4 |
| Shear modulus (GPa) | — | 31.6 | 31.9 | — | 30.9 | 31.4 | 32.1 | 31.4 |
| Poisson's ratio | — | 0.222 | 0.225 | — | 0.223 | 0.223 | 0.218 | 0.218 |

| Example | 113 | 114 | 115 | Comp. 1-4 | Comp. 5-16 |
|---|---|---|---|---|---|
| $SiO_2$ | 62.48 | 58.20 | 62.68 | 63.65 | 63.03 |
| $Al_2O_3$ | 16.28 | 17.93 | 15.39 | 16.19 | 15.28 |
| $P_2O_5$ | 0.71 | 1.03 | 0.96 | 2.67 | 0.02 |
| $B_2O_3$ | 4.78 | 4.68 | 5.88 | 0.38 | 6.76 |
| MgO | 0.08 | 1.72 | 1.03 | 0.33 | 1.01 |
| CaO | 3.03 | 0.03 | 0.04 | 0.00 | 1.55 |
| SrO | 0.00 | 0.96 | 1.91 | 0.00 | 1.02 |
| ZnO | 0.00 | 0.00 | 0.00 | 0.00 | 0.00 |
| $Li_2O$ | 7.60 | 6.30 | 6.59 | 8.07 | 6.89 |
| $Na_2O$ | 4.77 | 9.05 | 5.28 | 8.11 | 4.35 |
| $K_2O$ | 0.21 | 0.03 | 0.18 | 0.52 | 0.03 |
| $TiO_2$ | 0.01 | 0.00 | 0.00 | 0.00 | 0.01 |
| $SnO_2$ | 0.05 | 0.06 | 0.05 | 0.05 | 0.04 |
| $Fe2O_3$ | 0.01 | 0.01 | 0.01 | 0.02 | 0.02 |
| $ZrO_2$ | 0.00 | 0.00 | 0.00 | 0.00 | 0.00 |
| RO | 3.11 | 2.71 | 2.98 | 0.33 | 3.58 |
| $R_2O$ | 12.58 | 15.38 | 12.05 | 16.70 | 11.27 |
| $Al_2O_3 + R_2O$ | 28.86 | 33.31 | 27.44 | 32.89 | 26.55 |
| $Al_2O_3 + R_2O + B_2O_3$ | 33.64 | 37.99 | 33.32 | 33.27 | 33.31 |
| $(Al_2O_3 - (R_2O + RO))/Li_2O$ | 0.08 | −0.03 | 0.05 | −0.10 | 0.06 |
| $B_2O_3 + P_2O_5 + Al_2O_3)/SiO_2$ | 0.35 | 0.41 | 0.35 | 0.30 | 0.35 |
| Density (g/cm³) | 2.40 | 2.44 | 2.41 | — | — |
| CTE (ppm)(fiber) | — | — | — | — | — |
| Strain Pt. (fiber) | — | — | — | — | — |
| Anneal Pt. (fiber) | — | — | — | — | — |
| Softening Pt. (fiber) | — | — | — | — | — |
| 10^11 Poises | 701 | 670 | 686 | — | — |
| Strain Pt. (° C.) | 571.1 | 544.3 | 551.7 | — | — |
| Anneal Pt. (° C.) | 620.5 | 591.9 | 602.4 | — | — |
| Softening Pt. (° C.) | 852.6 | 817.7 | 849.1 | — | — |
| CTE at 500° C. cooling (ppm) | 6.57 | 8.08 | 6.50 | — | — |
| CTE at 300° C. cooling (ppm) | 6.13 | 7.51 | 6.07 | — | — |
| CTE at 50° C. cooling (ppm | 5.39 | 6.57 | 5.47 | — | — |
| Fulchers A | −2.885 | −3.110 | −3.263 | — | — |
| Fulchers B | 7042.5 | 7431.6 | 8170.5 | — | — |
| Fulchers To | 188.6 | 117.6 | 85.7 | — | — |
| 200 P Temperature (° C.) | 1547 | 1491 | 1554 | — | — |
| 35000 P Temperature (° C.) | 1137 | 1089 | 1132 | — | — |
| 200000 P Temperature (° C.) | 1049 | 1001 | 1040 | — | — |
| Liquidus Viscosity (kP) | 77 | 120 | 109 | — | — |
| $K_{1C}$ (CN) | 0.776 | 0.74 | 0.754 | — | — |
| Standard Deviation (CN) | 0.014 | 0.051 | 0.018 | — | — |
| SOC (nm/mm/MPa) | 3.06 | 3.00 | 3.15 | — | — |
| Refractive index | 1.5128 | 1.5132 | 1.5091 | — | — |
| Young's Modulus (GPa) | 77.9 | 77.5 | 75.6 | — | — |
| Shear modulus (GPa) | 31.9 | 31.5 | 31.0 | — | — |
| Poisson's ratio | 0.220 | 0.229 | 0.221 | — | — |

TABLE 2

| Example | Comp. 1 | Comp. 2 | Comp. 3 | Comp. 4 | 1 | 2 | 3 | 4 |
|---|---|---|---|---|---|---|---|---|
| CS (MPa) | 700 | 682 | 849 | 850 | 728 | 745 | 737 | 727 |
| DOL (μm) | 9.9 | 9.1 | 10.6 | 10.7 | 9.4 | 8.7 | 7.3 | 7.1 |
| CT (MPa) | 67.0 | 65.0 | 52.5 | 50.7 | 86.0 | 82.0 | 78.0 | 74.0 |

TABLE 2-continued

| Example | 5 | 6 | 7 | 8 | 9 | 10 | 100 | 101 |
|---|---|---|---|---|---|---|---|---|
| CS (MPa) | 707 | 703 | — | — | — | — | — | — |
| DOL (μm) | 6.9 | 6.7 | — | — | — | — | — | — |
| CT (MPa) | 68.0 | 64.0 | 70.0 | 69.0 | 72.0 | 71.0 | 38.2 | 36.0 |

| Example | 102 |
|---|---|
| CS (MPa) | — |
| DOL (μm) | — |
| CT (MPa) | 43.2 |

TABLE 3

| Example | Comp. 1 | Comp. 2 | 1 | 2 | 3 | 4 | 5 | 6 |
|---|---|---|---|---|---|---|---|---|
| CS (MPa) | 628 | 675 | 640 | 652 | 652 | 634 | 633 | 630 |
| DOL (μm) | 10.5 | 11.9 | 9.8 | 9.3 | 7.7 | 7.6 | 7.3 | 7.1 |
| CT (MPa) | 75.0 | 75.0 | 93.0 | 90.0 | 87.0 | 86.0 | 76.0 | 74.0 |

| Example | 7 | 8 | 9 | 10 |
|---|---|---|---|---|
| CS (MPa) | 718 | 726 | 738 | 749 |
| DOL (μm) | 6.9 | 6.8 | 6.5 | 6.4 |
| CT (MPa) | 83.0 | 83.0 | 85.0 | 83.0 |

TABLE 4

| Example | Comp. 1 | Comp. 2 | Comp. 3 | Comp. 4 | 1 | 2 | 3 | 4 |
|---|---|---|---|---|---|---|---|---|
| CS (MPa) | 614 | 667 | 843 | 835 | 626 | 649 | 649 | 623 |
| DOL (μm) | 12.4 | 12.6 | 15.1 | 13.8 | 10.9 | 10.3 | 9.7 | 9.4 |
| CT (MPa) | 79.0 | 77.0 | 59.1 | 56.1 | 97.0 | 97.0 | 93.0 | 90.0 |

| Example | 5 | 6 | 7 | 8 | 9 | 10 | 100 | 101 |
|---|---|---|---|---|---|---|---|---|
| CS (MPa) | 614 | 611 | 702 | 715 | 713 | 718 | — | 893 |
| DOL (μm) | 7.9 | 7.7 | 7.7 | 7.4 | 7.4 | 7.2 | — | 5.5 |
| CT (MPa) | 84.0 | 81.0 | 88.0 | 90.0 | 94.0 | 94.0 | 46.0 | 43.0 |

| Example | 102 |
|---|---|
| CS (MPa) | 870 |
| DOL (μm) | 6.0 |
| CT (MPa) | 52.7 |

TABLE 5

| Example | Comp. 3 | Comp. 4 | 100 | 101 | 102 |
|---|---|---|---|---|---|
| CS (MPa) | 835 | 828 | 892 | 886 | 848 |
| DOL (μm) | 18.5 | 17.8 | 6.0 | 6.4 | 7.8 |
| CT (MPa) | 58.6 | 56.1 | 55.9 | 54.0 | 64.9 |

TABLE 6

| Example | Comp. 5. | Comp. 6. | Comp. 7 | Comp. 8 | Comp. 9 | Comp. 10 | Comp. 11 | Comp. 12 |
|---|---|---|---|---|---|---|---|---|
| CS (MPa) | 599 | — | 571 | 584 | 588 | 590 | 582 | 582 |
| DOL (μm) | 6.4 | — | 6.5 | 6.4 | 6.7 | 6.4 | 6.4 | 6.4 |
| CT (MPa) | 77.4 | 76.7 | 76.7 | 83.0 | 79.9 | 77.6 | 77.6 | 78.0 |

| Example | Comp. 13 | Comp. 14 | Comp. 15 | Comp. 16 | 29 | 30 | 31 | 32 |
|---|---|---|---|---|---|---|---|---|
| CS (MPa) | 594 | 588 | 588 | 587 | 572 | 586 | 576 | 569 |
| DOL (μm) | 6.3 | 6.4 | 6.3 | 6.3 | 10.2 | 9.7 | 10.4 | 11.7 |
| CT (MPa) | 78.2 | 79.2 | 79.6 | 78.2 | 79.1 | 73.9 | 78.7 | 74.5 |

TABLE 6-continued

| Example | 33 | 34 | 37 | 38 | 39 | 40 | 41 | 42 |
|---|---|---|---|---|---|---|---|---|
| CS (MPa) | 580 | 604 | — | — | — | 553 | 557 | 543 |
| DOL (μm) | 8.8 | 7.2 | — | — | — | 9.5 | 9.3 | 9.6 |
| CT (MPa) | 75.2 | 82.7 | 84.8 | 78.3 | 79.5 | 77.0 | 86.5 | 84.5 |

| Example | 43 | 44 | 45 | 46 | 47 | 48 | 49 | 50 |
|---|---|---|---|---|---|---|---|---|
| CS (MPa) | 550 | 537 | 538 | 573 | 576 | 584 | 564 | 570 |
| DOL (μm) | 9.2 | 9.5 | 8.4 | 9.2 | 8.3 | 7.8 | 9.7 | 9.4 |
| CT (MPa) | 90.3 | 81.5 | 86.4 | 75.1 | 77.6 | 86.9 | 72.2 | 74.0 |

| Example | 51 | 52 | 53 | 54 | 55 | 56 | 57 | 58 |
|---|---|---|---|---|---|---|---|---|
| CS (MPa) | 572 | 571 | 570 | 578 | 563 | 576 | 576 | 563 |
| DOL (μm) | 8.9 | 9.7 | 9.4 | 8.8 | 9.8 | 9.6 | 9.4 | 9.3 |
| CT (MPa) | 79.2 | 77.3 | 78.3 | 79.0 | 76.6 | 71.8 | 77.4 | 72.9 |

| Example | 59 | 60 | 61 | 62 | 63 | 64 | 65 | 66 |
|---|---|---|---|---|---|---|---|---|
| CS (MPa) | 573 | 571 | 549 | 557 | 567 | 561 | 552 | 573 |
| DOL (μm) | 7.9 | 9.1 | 9.4 | 9.4 | 8.9 | 9.1 | 9.4 | 8.9 |
| CT (MPa) | 76.0 | 72.7 | 70.6 | 74.5 | 74.2 | 78.0 | 75.1 | 78.0 |

| Example | 67 | 68 | 69 | 70 | 71 | 72 | 73 | 74 |
|---|---|---|---|---|---|---|---|---|
| CS (MPa) | 540 | 547 | 556 | 572 | 558 | 570 | 570 | 581 |
| DOL (μm) | 9.9 | 9.4 | 9.1 | 9.4 | 8.9 | 9.0 | 8.2 | 8.2 |
| CT (MPa) | 71.0 | 73.3 | 76.0 | 81.6 | 77.3 | 77.1 | 88.2 | 90.2 |

| Example | 75 | 76 | 77 | 78 | 79 | 80 | 81 | 82 |
|---|---|---|---|---|---|---|---|---|
| CS (MPa) | 578 | 589 | 580 | 606 | 600 | 600 | 612 | 590 |
| DOL (μm) | 8.3 | 7.7 | 7.7 | 7.5 | 7.8 | 7.7 | 7.7 | 8.0 |
| CT (MPa) | 91.4 | 94.8 | 102.8 | 100.4 | 97.0 | 104.2 | 102.8 | 94.5 |

| Example | 83 | 84 | 85 | 86 | 87 | 88 | 89 | 90 |
|---|---|---|---|---|---|---|---|---|
| CS (MPa) | 598 | 604 | 587 | 609 | 610 | 616 | 628 | 628 |
| DOL (μm) | 8.1 | 9.2 | 8.8 | 8.7 | 8.1 | 7.6 | 7.9 | 9.0 |
| CT (MPa) | 95.6 | 99.0 | 91.8 | 96.7 | 103.8 | 87.3 | 88.2 | 94.1 |

| Example | 91 | 92 | 93 | 94 | 95 | 96 | 97 | 98 |
|---|---|---|---|---|---|---|---|---|
| CS (MPa) | 619 | 636 | 621 | 575 | 580 | 581 | 567 | 576 |
| DOL (μm) | 7.5 | 7.6 | 7.9 | 9.4 | 9.7 | 10.0 | 9.2 | 9.3 |
| CT (MPa) | 87.6 | 97.3 | 100.2 | 85.3 | 89.6 | 90.2 | 91.3 | 94.3 |

| Example | 99 |
|---|---|
| CS (MPa) | 595 |
| DOL (μm) | 9.7 |
| CT (MPa) | 96.2 |

TABLE 7

| Example | Comp. 5 | Comp. 6 | Comp. 7 | Comp. 8 | Comp. 9 | Comp. 10 | Comp. 11 | Comp. 12 |
|---|---|---|---|---|---|---|---|---|
| CS (MPa) | 552 | 538 | 521 | 543 | 532 | 536 | 542 | 539 |
| DOL (μm) | 8.3 | 8.4 | 8.2 | 8.0 | 9.2 | 8.1 | 9.1 | 8.3 |
| CT (MPa) | 85.1 | 85.7 | 81.8 | 90.3 | 88.2 | 84.8 | 82.1 | 85.8 |

| Example | Comp. 13 | Comp. 14 | Comp. 15 | Comp. 16 | 29 | 30 | 31 | 32 |
|---|---|---|---|---|---|---|---|---|
| CS (MPa) | 547 | 538 | 545 | 544 | 541 | 547 | 548 | 531 |
| DOL (μm) | 8.2 | 9.2 | 8.2 | 9.1 | 13.7 | 13.0 | 14.0 | 15.6 |
| CT (MPa) | 87.3 | 86.2 | 88.8 | 84.4 | 71.4 | 75.9 | 73.9 | 70.2 |

| Example | 33 | 34 | 37 | 38 | 39 | 40 | 41 | 42 |
|---|---|---|---|---|---|---|---|---|
| CS (MPa) | 544 | 557 | 527 | 527 | 525 | 514 | 522 | 510 |
| DOL (μm) | 11.6 | 10.7 | 11.3 | 11.5 | 11.0 | 13.4 | 11.1 | 13.2 |
| CT (MPa) | 76.9 | 94.9 | 91.1 | 78.7 | 85.5 | 74.1 | 88.7 | 79.0 |

TABLE 7-continued

| Example | 43 | 44 | 45 | 46 | 47 | 48 | 49 | 50 |
|---|---|---|---|---|---|---|---|---|
| CS (MPa) | 512 | 501 | 506 | 540 | 543 | 562 | 537 | 536 |
| DOL (µm) | 12.6 | 13.1 | 12.7 | 13.0 | 11.5 | 12.0 | 12.7 | 12.7 |
| CT (MPa) | 85.7 | 74.7 | 82.3 | 75.9 | 79.3 | 80.0 | 71.3 | 75.7 |

| Example | 51 | 52 | 53 | 54 | 55 | 56 | 57 | 58 |
|---|---|---|---|---|---|---|---|---|
| CS (MPa) | 544 | 530 | 552 | 549 | 525 | 541 | 545 | 532 |
| DOL (µm) | 12.5 | 13.1 | 12.9 | 12.4 | 13.4 | 13.5 | 12.9 | 12.8 |
| CT (MPa) | 84.1 | 73.8 | 76.6 | 80.0 | 71.0 | 78.1 | 76.2 | 70.2 |

| Example | 59 | 60 | 61 | 62 | 63 | 64 | 65 | 66 |
|---|---|---|---|---|---|---|---|---|
| CS (MPa) | 538 | 540 | 520 | 529 | 533 | 527 | 532 | 540 |
| DOL (µm) | 11.5 | 11.1 | 13.2 | 12.8 | 11.5 | 12.6 | 12.7 | 10.9 |
| CT (MPa) | 74.9 | 77.1 | 68.4 | 70.9 | 74.9 | 71.0 | 75.7 | 77.9 |

| Example | 67 | 68 | 69 | 70 | 71 | 72 | 73 | 74 |
|---|---|---|---|---|---|---|---|---|
| CS (MPa) | 510 | 501 | 527 | 533 | 534 | 540 | 534 | 544 |
| DOL (µm) | 13.3 | 13.1 | 11.5 | 11.1 | 12.1 | 11.0 | 11.0 | 10.7 |
| CT (MPa) | 68.6 | 66.0 | 71.0 | 78.6 | 80.3 | 81.0 | 85.0 | 87.9 |

| Example | 75 | 76 | 77 | 78 | 79 | 80 | 81 | 82 |
|---|---|---|---|---|---|---|---|---|
| CS (MPa) | 540 | 547 | 552 | 572 | 569 | 560 | 568 | 557 |
| DOL (µm) | 10.7 | 11.2 | 11.4 | 10.8 | 12.2 | 11.2 | 12.4 | 11.9 |
| CT (MPa) | 93.9 | 87.3 | 85.9 | 97.2 | 88.7 | 91.4 | 85.5 | 89.6 |

| Example | 83 | 84 | 85 | 86 | 87 | 88 | 89 | 90 |
|---|---|---|---|---|---|---|---|---|
| CS (MPa) | 555 | 558 | 558 | 577 | 567 | 578 | 590 | 597 |
| DOL (µm) | 12.5 | 12.8 | 11.8 | 11.8 | 12.4 | 11.2 | 12.6 | 13.0 |
| CT (MPa) | 84.8 | 84.3 | 93.1 | 94.6 | 88.7 | 89.9 | 89.1 | 86.2 |

| Example | 91 | 92 | 93 | 94 | 95 | 96 | 97 | 98 |
|---|---|---|---|---|---|---|---|---|
| CS (MPa) | 577 | 590 | 607 | 533 | 545 | 539 | 531 | 544 |
| DOL (µm) | 11.1 | 11.4 | 12.5 | 13.6 | 13.6 | 13.7 | 12.9 | 13.0 |
| CT (MPa) | 90.8 | 91.0 | 92.2 | 75.7 | 76.2 | 73.0 | 69.4 | 77.9 |

| Example | 99 |
|---|---|
| CS (MPa) | 554 |
| DOL (µm) | 13.4 |
| CT (MPa) | 80.6 |

TABLE 8

| Example | Comp. 5 | Comp. 6 | Comp. 7 | Comp. 8 | Comp. 9 | Comp. 10 | Comp. 11 | Comp. 12 |
|---|---|---|---|---|---|---|---|---|
| CS (MPa) | 523 | 527 | 496 | 515 | 512 | 513 | 513 | 513 |
| DOL (µm) | 10.6 | 10.6 | 10.8 | 10.6 | 10.8 | 10.6 | 10.6 | 10.7 |
| CT (MPa) | 78.6 | 76.6 | — | 80.7 | 80.7 | 78.6 | 76.3 | 78.3 |

| Example | Comp. 13 | Comp. 14 | Comp. 15 | Comp. 16 | 29 | 30 | 31 | 32 |
|---|---|---|---|---|---|---|---|---|
| CS (MPa) | 512 | 512 | 513 | 525 | 515 | 526 | 514 | 503 |
| DOL (µm) | 10.8 | 10.8 | 10.8 | 10.8 | 16.7 | 16.7 | 16.9 | 19.4 |
| CT (MPa) | 78.1 | 79.2 | 79.4 | 75.9 | 59.7 | 65.8 | 60.7 | 57.5 |

| Example | 33 | 34 | 37 | 38 | 39 | 40 | 41 | 42 |
|---|---|---|---|---|---|---|---|---|
| CS (MPa) | 538 | 536 | 524 | 510 | 503 | 509 | 517 | 525 |
| DOL (µm) | 14.6 | 13.2 | 14.1 | 14.4 | 13.7 | 15.2 | 14.5 | 14.2 |
| CT (MPa) | 76.1 | 84.5 | 77.5 | 65.7 | 75.2 | 70.2 | 73.3 | 72.7 |

| Example | 43 | 44 | 45 | 46 | 47 | 48 | 49 | 50 |
|---|---|---|---|---|---|---|---|---|
| CS (MPa) | 483 | 475 | 474 | 509 | 517 | 525 | 506 | 521 |
| DOL (µm) | 14.6 | 16.2 | 14.6 | 15.2 | 14.5 | 14.2 | 14.8 | 14.7 |
| CT (MPa) | — | — | — | 70.2 | 73.3 | 72.7 | 65.4 | 70.6 |

TABLE 8-continued

| Example | 51 | 52 | 53 | 54 | 55 | 56 | 57 | 58 |
|---|---|---|---|---|---|---|---|---|
| CS (MPa) | 520 | 509 | 521 | 518 | 503 | 513 | 522 | 506 |
| DOL (μm) | 14.5 | 16.3 | 15.8 | 14.1 | 16.8 | 16.1 | 16.1 | 14.7 |
| CT (MPa) | 64.1 | 63.9 | 68.5 | 72.2 | 63.1 | 67.9 | 66.1 | 63.5 |
| Example | 59 | 60 | 61 | 62 | 63 | 64 | 65 | 66 |
| CS (MPa) | 523 | 520 | 496 | 505 | 514 | 501 | 505 | 514 |
| DOL (μm) | 14.2 | 13.7 | 16.3 | 15.7 | 14.3 | 15.7 | 15.5 | 13.8 |
| CT (MPa) | 66.6 | 66.1 | 62.6 | 60.0 | 64.4 | 58.6 | 63.3 | 69.9 |
| Example | 67 | 68 | 69 | 70 | 71 | 72 | 73 | 74 |
| CS (MPa) | 484 | 488 | 498 | 506 | 501 | 512 | 504 | 519 |
| DOL (μm) | 16.3 | 15.9 | 14.4 | 14.1 | 14.0 | 13.8 | 13.3 | 13.7 |
| CT (MPa) | 57.5 | 58.2 | 63.1 | 68.2 | 69.1 | 69.2 | 75.6 | 75.0 |
| Example | 75 | 76 | 77 | 78 | 79 | 80 | 81 | 82 |
| CS (MPa) | 515 | 508 | 516 | 536 | 533 | 519 | 531 | 531 |
| DOL (μm) | 13.0 | 14.1 | 15.4 | 13.9 | 15.4 | 14.1 | 15.5 | 14.1 |
| CT (MPa) | 84.5 | 69.4 | 67.5 | 79.7 | 72.5 | 73.7 | 72.1 | 76.1 |
| Example | 83 | 84 | 85 | 86 | 87 | 88 | 89 | 90 |
| CS (MPa) | 528 | 534 | 529 | 547 | 535 | 542 | 554 | 560 |
| DOL (μm) | 14.5 | 16.2 | 14.0 | 14.5 | 15.4 | 14.3 | 15.8 | 16.2 |
| CT (MPa) | 73.2 | 68.2 | 77.9 | 82.2 | 72.7 | 74.6 | 75.9 | 70.1 |
| Example | 91 | 92 | 93 | 94 | 95 | 96 | 97 | 98 |
| CS (MPa) | 559 | 548 | 559 | 507 | 511 | 515 | 497 | 505 |
| DOL (μm) | 14.1 | 15.4 | 15.7 | 16.6 | 17.0 | 18.5 | 16.2 | 16.7 |
| CT (MPa) | 68.8 | 80.5 | 79.2 | 62.0 | 59.4 | 58.1 | 60.2 | 62.3 |

| Example | 99 |
|---|---|
| CS (MPa) | 523 |
| DOL (μm) | 16.8 |
| CT (MPa) | 62.4 |

Table 9 shows the Knoop Scratch threshold data for glass articles made from example glass composition 110 and comparative example 1. As shown, glass articles made from example glass composition 110 has a higher Knoop Scratch threshold than comparative example 1.

TABLE 9

| Sample | Sample Number | Knoop Scratch Threshold Per Sample (N) | Knoop Scratch Threshold For All Samples (N) |
|---|---|---|---|
| Example Composition 110 | 1 | >10 ≤ 12 | >9 ≤ 12 |
| | 2 | >10 ≤ 12 | |
| | 3 | >9 ≤ 10 | |
| Comparative Example 1 | 1 | >3 ≤ 4 | >3 ≤ 5 |
| | 2 | >3 ≤ 4 | |
| | 3 | >4 ≤ 5 | |

Figure 7:
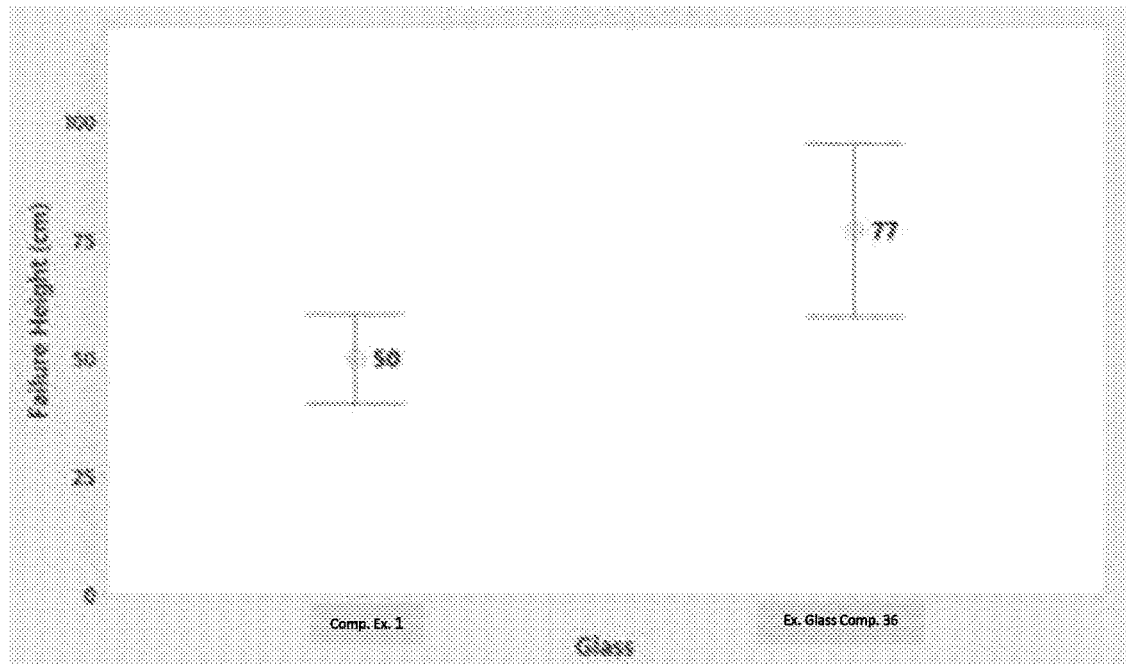
FIG. 7 is a plot of the failure height of an example glass composition versus a comparative glass composition.

FIG. 7 shows the average failure height of articles made from example glass composition 110 and articles made from comparative example 1 having a thickness of 0.5 mm and dropped on 180 grit sandpaper. As shown in FIG. 7, the articles made from example glass composition 110 had failure heights ranging from 50.0 cm to 100.0 cm with an average of 77.0 cm. The articles made from comparative example 1 had failure heights ranging from 35.0 cm to 65.0 cm with an average of 50.0 cm.

Figure 8:
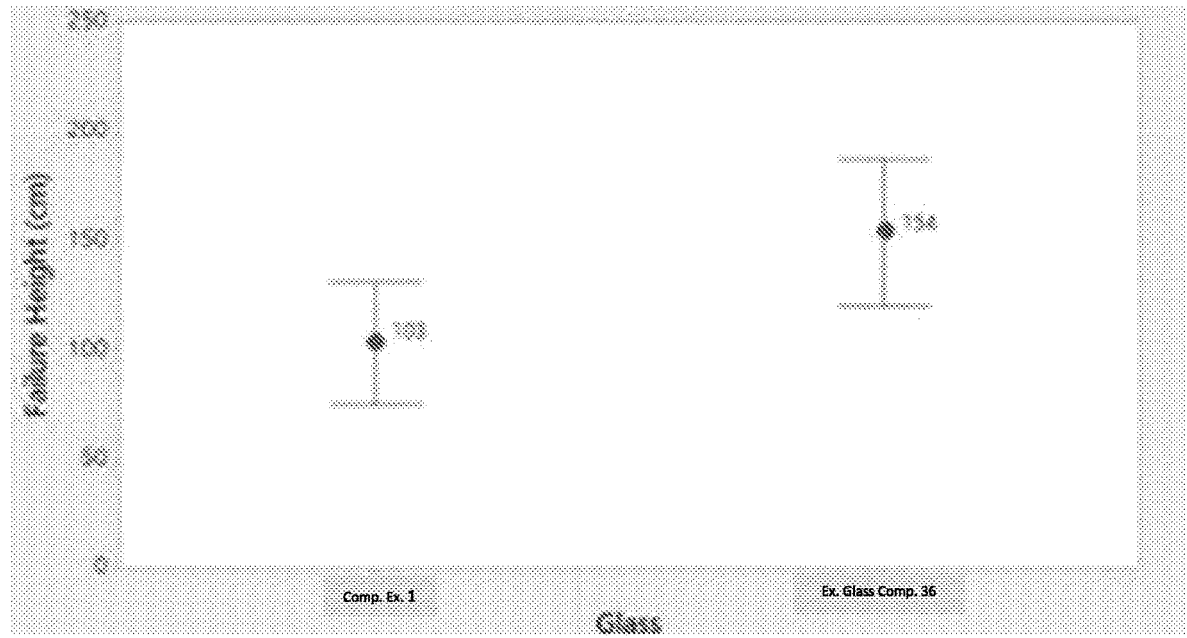
FIG. 8 is another plot of the failure height of an example glass composition versus a comparative glass composition.

FIG. 8 shows the average failure height of articles made from example glass composition 110 and articles made from comparative example 1 having a thickness of 0.6 mm and dropped on 180 grit sandpaper. As shown in FIG. 8, the articles made from example glass composition 110 had failure heights ranging from 125.0 cm to 175.0 cm with an average of 154.0 cm. The articles made from comparative example 1 had failure heights ranging from 60.0 cm to 125.0 cm with an average of 108.0 cm.

Figure 9:
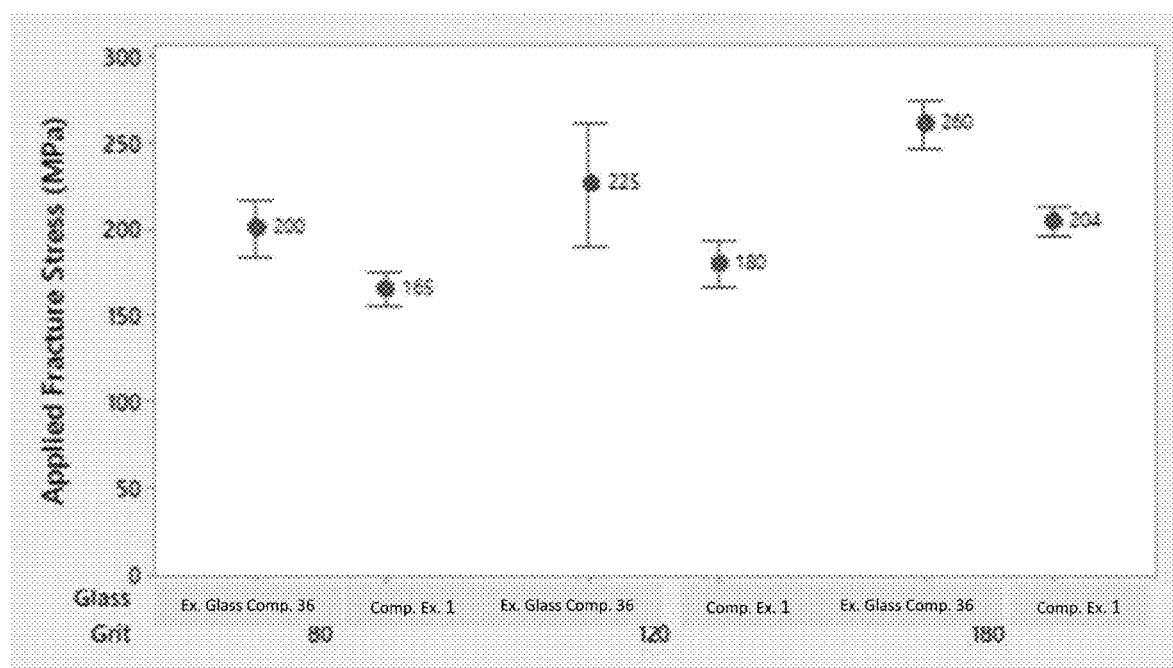
FIG. 9 is a plot of the retained strength of an example glass composition versus a comparative glass composition.

FIG. 9 shows the retained strength of articles made from example glass composition 110 and articles made from comparative example 1. As shown in FIG. 9, the articles made from example glass composition 110 had retained strengths ranging from 175.0 MPa to 225.0 MPa when impacted with 80 grit sandpaper with a force of 500.0 N. The articles made from comparative example 1 had retained strengths ranging from 150.0 MPa to 170.0 MPa when impacted with 80 grit sandpaper with a force of 500.0 N. The articles made from example glass composition 110 had retained strengths ranging from 175.0 MPa to 275.0 MPa when impacted with 120 grit sandpaper with a force of 500.0 N. The articles made from comparative example 1 had retained strengths ranging from 170.0 MPa to 190.0 MPa when impacted with 120 grit sandpaper with a force of 500.0 N. The articles made from example glass composition 110 had retained strengths ranging from 250.0 MPa to 270.0 MPa when impacted with 180 grit sandpaper with a force of 500.0 N. The articles made from comparative example 1 had retained strengths ranging from 2000.0 MPa to 208.0 MPa when impacted with 180 grit sandpaper with a force of 500.0 N.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass-based article comprising:
a composition comprising a lithium-based aluminosilicate having a non-zero amount of $B_2O_3$;
first and second opposing surfaces defining a thickness (t) of the glass-based article, wherein the thickness of the glass-based article is greater than or equal to 100 μm and less than or equal to 1000 μm;
a failure height of greater than or equal to 100 cm as measured according to Drop Test Method on 180 grit sandpaper; and
a Knoop Scratch threshold of greater than or equal to 6.0 N and less than or equal to 12.0 N.

2. The glass-based article of claim 1, wherein the thickness of the glass-based article is greater than or equal to 400 μm and less than or equal to 800 μm.

3. The glass-based article of claim 1, wherein the thickness of the glass-based article is greater than or equal to 400 μm and less than or equal to 700 μm.

4. The glass-based article of claim 1, wherein the failure height of the glass-based article is greater than or equal to 150 cm as measured according to Drop Test Method on 180 grit sandpaper.

5. The glass-based article of claim 1, wherein the failure height of the glass-based article is greater than or equal to 180 cm as measured according to Drop Test Method on 180 grit sandpaper.

6. The glass-based article of claim 1, wherein the glass-based article has a Knoop scratch threshold of greater than or equal to 6.0 N and less than or equal to 12.0 N.

7. The glass-based article of claim 1, wherein the glass-based article has a Knoop scratch threshold of greater than or equal to 7.0 N and less than or equal to 12.0 N.

8. The glass-based article of claim 1, wherein the glass-based article has a softening point of greater than or equal to 650° C. and less than or equal to 950° C.

9. The glass-based article of claim 1, wherein the glass-based article has a softening point of greater than or equal to 650° C. and less than or equal to 800° C.

10. The glass-based article of claim 1, wherein the glass-based article has a $K_{1C}$ fracture toughness as measured by a chevron notch short bar method of greater than or equal to 0.70.

11. The glass-based article of claim 1, wherein the glass-based article has a composition comprising:
greater than 0.0 mol % and less than or equal to 5.0 mol % $P_2O_5$; and
greater than 0.0 mol % and less than or equal to 1.0 mol % $K_2O$.

12. The glass-based article of claim 1, where the glass-based article is a strengthened glass-based article and has a depth of compression greater than or equal to 0.15t.

13. The glass-based article of claim 1, wherein the glass-based article has a composition comprising:
greater than or equal to 50.0 mol % and less than or equal to 70.0 mol % $SiO_2$;
greater than or equal to 10.0 mol % and less than or equal to 25.0 mol % $Al_2O_3$;
greater than or equal to 0.0 mol % and less than or equal to 5.0 mol % $P_2O_5$;
greater than 0.0 mol % and less than or equal to 10.0 mol % $B_2O_3$;
greater than or equal to 5.0 mol % and less than or equal to 15.0 mol % $Li_2O$;
greater than or equal to 1.0 mol % and less than or equal to 15.0 mol % $Na_2O$; and
greater than or equal to 0.0 mol % and less than or equal to 1.0 mol % $K_2O$.

14. The glass-based article of claim 13, wherein
$R_2O$ is greater than or equal to 11.0 mol % and less than or equal to 23.0 mol %, wherein $R_2O$ the sum of alkali metal oxides present in the glass-based article in mol %;
$Al_2O_3+R_2O$ is greater than or equal to 26.0 mol % and less than or equal to 40.0 mol %; and
$-0.1 \leq (Al_2O_3-(R_2O+RO))/Li_2O \leq 0.3$, wherein RO is the sum of alkaline earth metal oxides present in the glass-based article in mol %.

15. The glass-based article of claim 14, wherein $R_2O$ is greater than or equal to 15.0 mol % and less than or equal to 19.0 mol %.

16. The glass-based article of claim 14, wherein $Al_2O_3+R_2O$ is greater than or equal to 28.0 mol % and less than or equal to 36.0 mol %.

17. The glass-based article of claim 14, wherein $0.0 \leq (Al_2O_3-(R_2O+RO))/Li_2O \leq 0.1$.

18. The glass-based article of claim 12, wherein the strengthened glass-based article has a compressive stress of greater than or equal to 600 MPa.

19. The glass-based article of claim 12, wherein the strengthened glass-based article has a maximum central tension of greater than or equal to 20.0 MPa.

20. The glass-based article of claim 12, wherein the strengthened glass-based article has a depth of layer of greater than or equal to 5.0 μm.

* * * * *